US010942972B2

(12) United States Patent
Oh et al.

(10) Patent No.: US 10,942,972 B2
(45) Date of Patent: Mar. 9, 2021

(54) QUERY PROCESSING METHOD, ELECTRONIC DEVICE, AND SERVER

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Hyung-Rai Oh, Yongin-si (KR); Myoung-Ho Kim, Daejeon (KR); Jun-Su Kim, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1112 days.

(21) Appl. No.: 15/318,797

(22) PCT Filed: Jun. 16, 2015

(86) PCT No.: PCT/KR2015/006082
§ 371 (c)(1),
(2) Date: Dec. 14, 2016

(87) PCT Pub. No.: WO2016/104891
PCT Pub. Date: Jun. 30, 2016

(65) Prior Publication Data
US 2017/0140068 A1    May 18, 2017

(30) Foreign Application Priority Data

Dec. 26, 2014   (KR) ........................ 10-2014-0190720

(51) Int. Cl.
*G06F 16/903* (2019.01)
*G06F 16/901* (2019.01)
*G06F 16/9038* (2019.01)

(52) U.S. Cl.
CPC .... *G06F 16/90335* (2019.01); *G06F 16/9024* (2019.01); *G06F 16/9038* (2019.01)

(58) Field of Classification Search
CPC ........... G06F 16/90335; G06F 16/9038; G06F 16/9024
See application file for complete search history.

(56) References Cited

U.S. PATENT DOCUMENTS 5,724,568 A    3/1998  Bhargava et al.
6,556,983 B1*  4/2003  Altschuler ........... G06K 9/6296
                                                       706/55
(Continued)

FOREIGN PATENT DOCUMENTS

KR        10-1048546        7/2011
KR        10-1150099        5/2012
KR    10-2013-0104881       9/2013

OTHER PUBLICATIONS

Xu et al., "LogGP: A Log-based Dynamic Graph Partitioning Method," In: Proceedings of the VLDB Endowment VLDB Endowment Homepage archive, vol. 7, No. 14, pp. 1917-1928.

(Continued)

*Primary Examiner* — Van H Oberly
(74) *Attorney, Agent, or Firm* — Nixon & Vanderhye, P.C.

(57) ABSTRACT

A query processing method is disclosed. A query processing method according to an embodiment may comprise the steps of: displaying a first object and a second object; acquiring a user input indicating a relationship between the first object and the second object; displaying a first relationship structure between the first object and the second object on the (Continued)

basis of the user input; and transmitting, to the server, a query including a second relationship structure between at least one first node corresponding to the first object and at least one second node corresponding to the second object, which corresponds to the first relationship structure.

8 Claims, 40 Drawing Sheets

(56) References Cited

U.S. PATENT DOCUMENTS

| | | |
|---|---|---|
| 2006/0074870 A1 | 4/2006 | Brill et al. |
| 2006/0271884 A1 | 11/2006 | Hurst |
| 2011/0153635 A1 | 6/2011 | Figueroa et al. |
| 2013/0212131 A1* | 8/2013 | Reddy ............... G06F 16/9024 |
| | | 707/798 |
| 2014/0074888 A1 | 3/2014 | Potter et al. |

OTHER PUBLICATIONS

Catarci et al, A graph-basA hypergraph-based framework for visual interaction with databases, Journal of Visual Languages and Computing, 6, 1995, pp. 135-166.

Poulovassilis et al., Hyperlog: A graph-based system for database browsing, querying, and update, 2001, 32 pages.

* cited by examiner

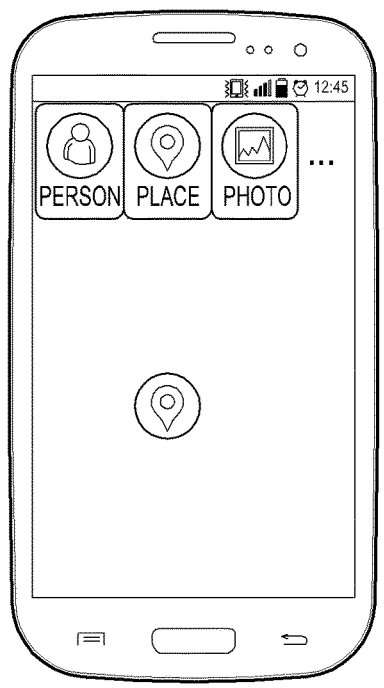 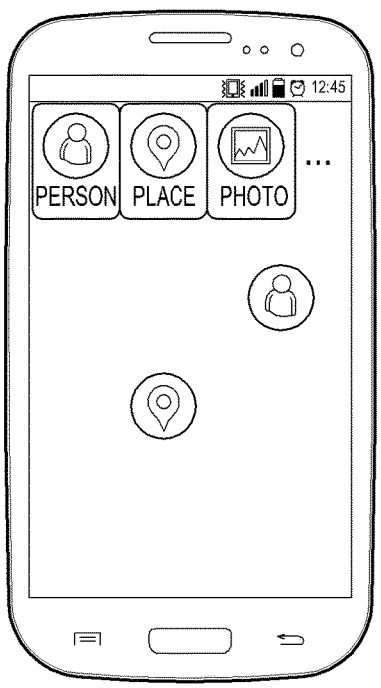 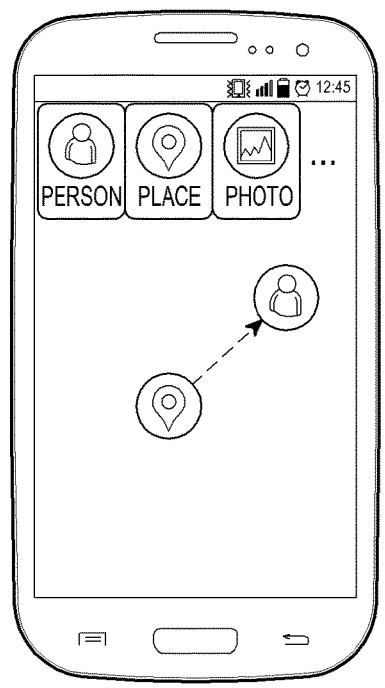
FIG.12A   FIG.12B   FIG.12C
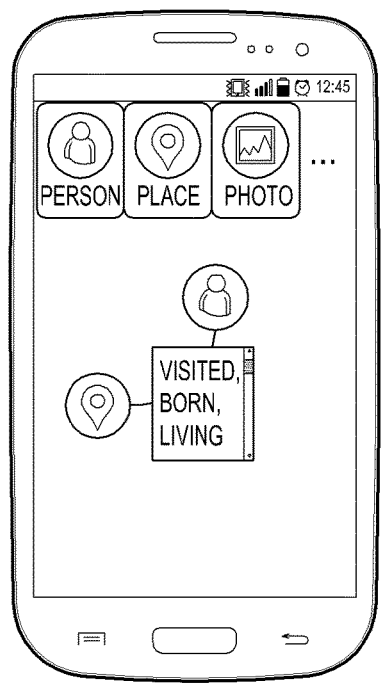 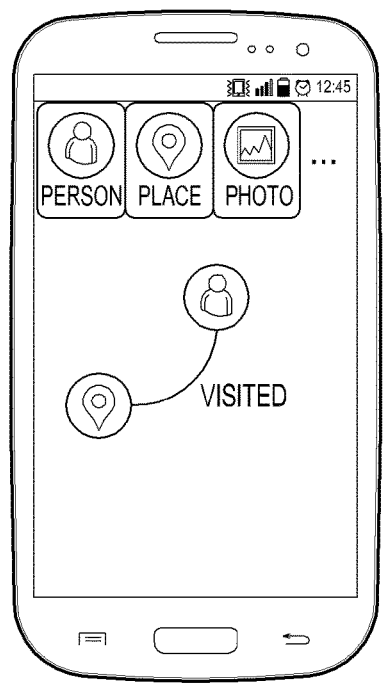
FIG.12D   FIG.12E

FIG.18B

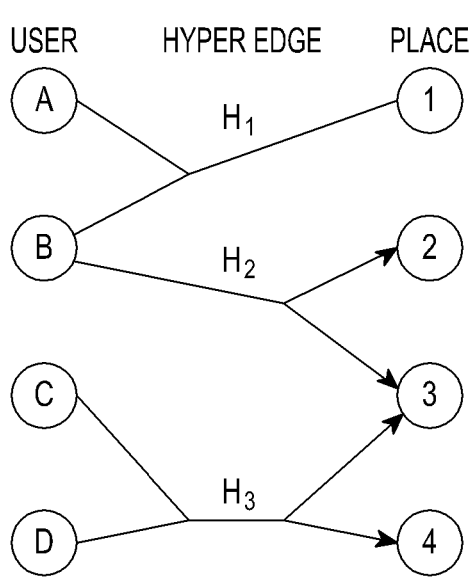
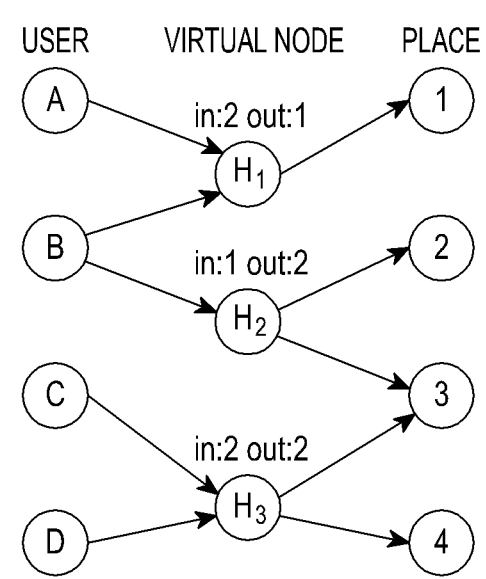
FIG.23A  FIG.23B
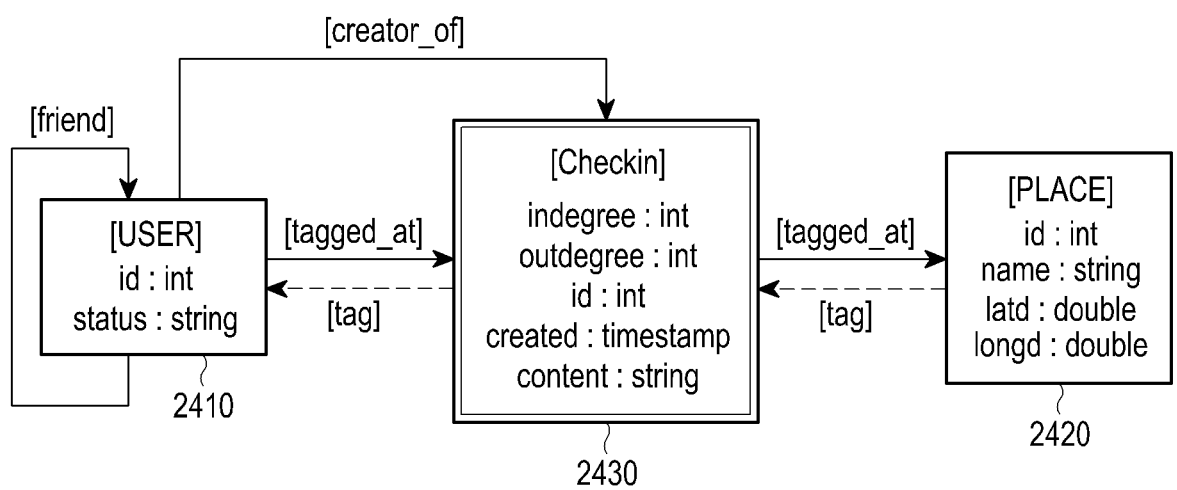
FIG.24

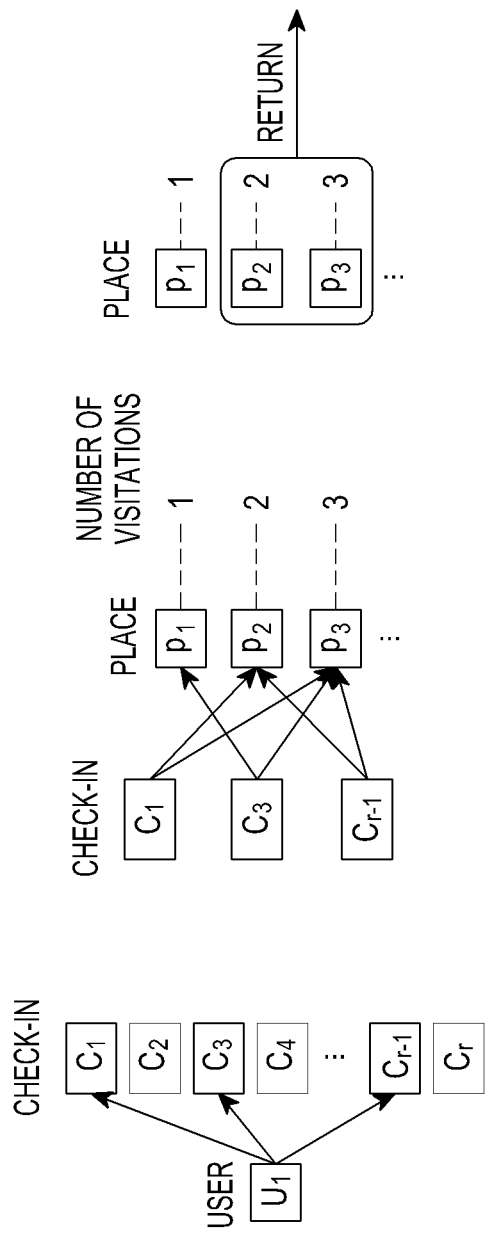

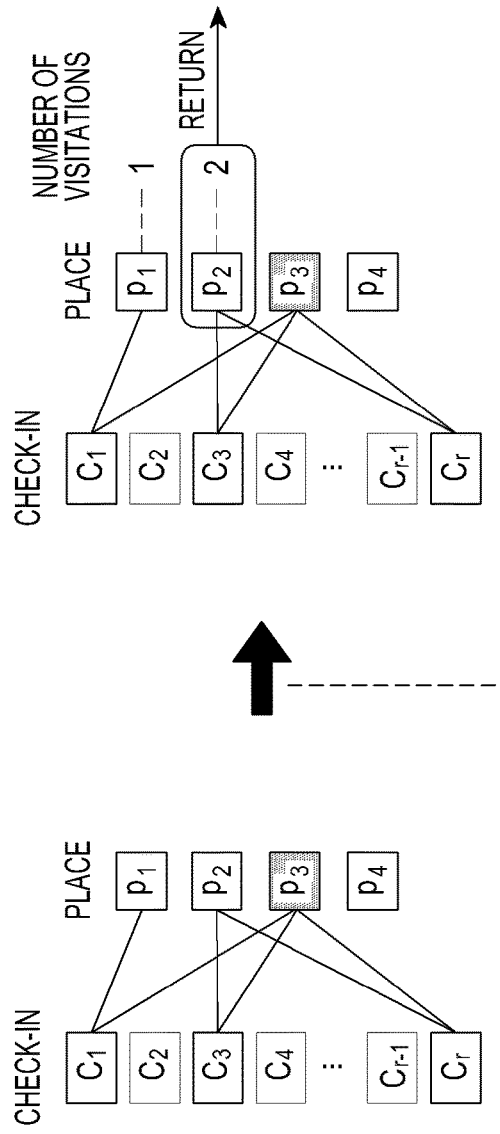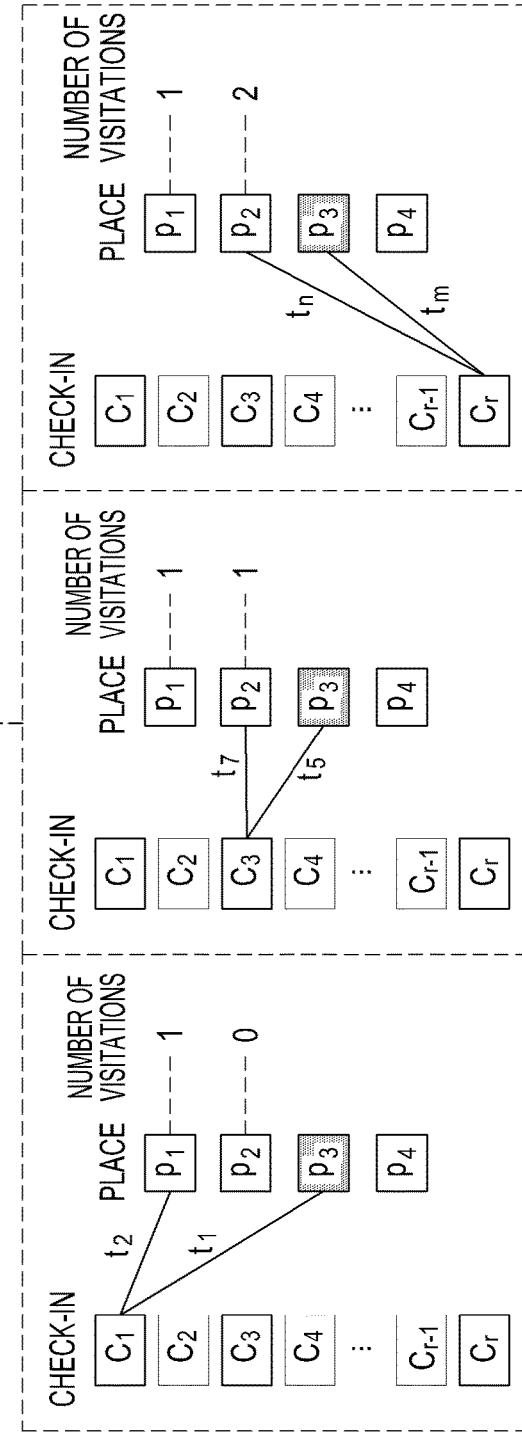

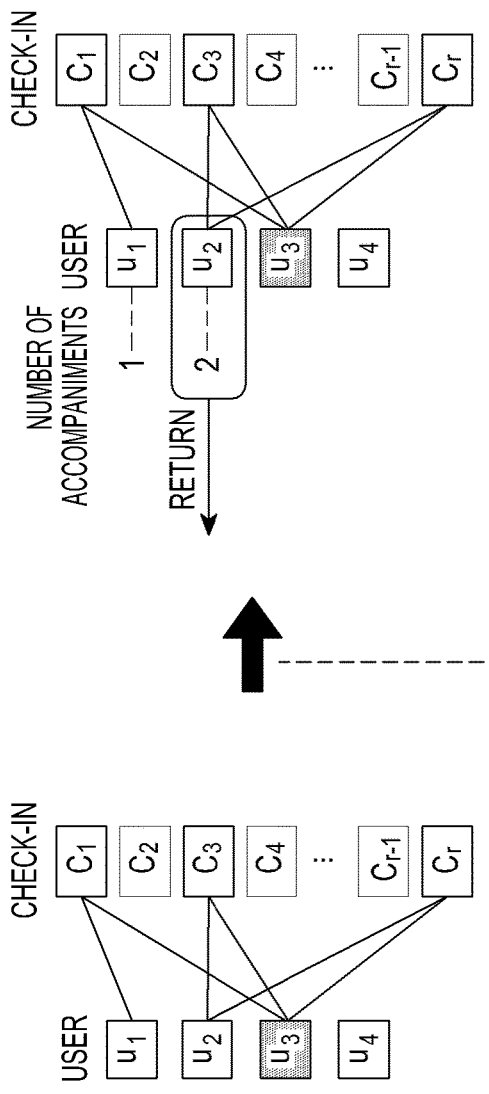
FIG.37A
FIG.37E
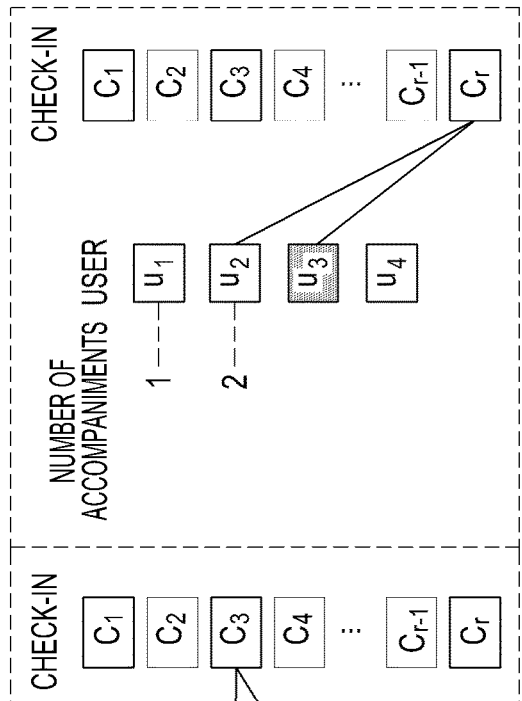
FIG.37D
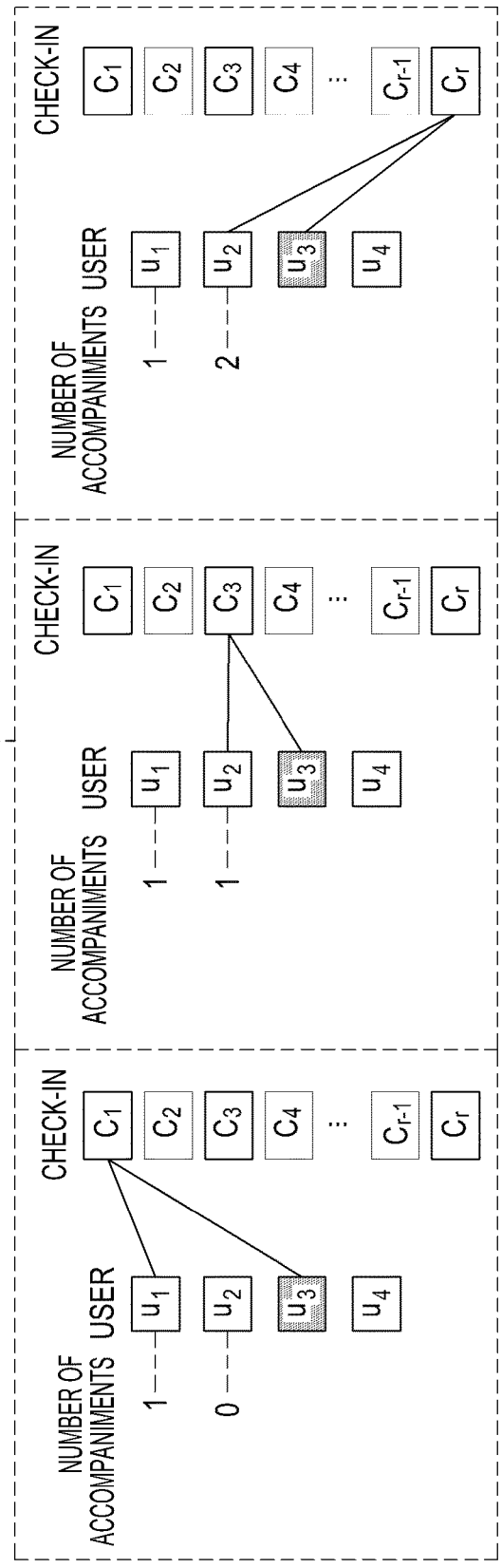
FIG.37C
FIG.37B

QUERY PROCESSING METHOD, ELECTRONIC DEVICE, AND SERVER

CROSS-REFERENCE TO RELATED APPLICATIONS

This application is the U.S. national phase of International Application No. PCT/KR2015/006082 filed Jun. 16, 2015, which designated the United States and claims priority to KR Patent Application No. 10-2014-0190720, filed Dec. 26, 2014. The entire contents of each of these applications are incorporated herein.

TECHNICAL FIELD

The present invention relates to a query processing method and, more particularly to, a query processing method of processing a query based on an acquired input.

BACKGROUND ART

A user searches for a document existing in a database through a query based on a condition which the user desires and acquires a found result. Recently, as a method of processing the query, a graph database is used. The graph database corresponds to a database that hierarchically defines a correlation between data by using a graph structure. As described above, the graph database is a database that may implement a graph concept.

A visual graph query interface is a means for providing convenience to make a query based on the graph database, and the user may make a query by drawing a graph form to directly make the query through the interface instead of making a query sentence using a particular query language. When the query graph made by the user is the same as a graph within the actual graph database and thus it is determined that the graphs match each other, a result thereof may be acquired.

DETAILED DESCRIPTION OF THE INVENTION

Technical Problem

In the conventional art, it was expected that the user makes a query, which matches a graph within a graph database, and the user may acquire a result only when a graph made by the user matches the graph within the graph database through a comparison therebetween. Accordingly, as the form of stored graph data has a complex structure, a query graph, which the user should make, also has a complex structure. Such a problem becomes more serious when the form of the graph has a complex form such as a hyper graph.

Further, a database, which supports the hyper graph among the graph databases, may have a lower performance compared to a simple edge-based graph database.

Technical Solution

According to an embodiment of the present invention, a method of processing a query by an electronic device is provided. The method includes: displaying a first object and a second object; acquiring a user input indicating a relationship between the first object and the second object; displaying a first relationship structure between the first object and the second object based on the user input; and transmitting a query including a second relationship structure between at least one first node corresponding to the first object and at least one second node corresponding to the second object to a server, the second relationship structure corresponding to the first relationship structure.

According to an embodiment of the present invention, an electronic device for processing a query is provided. The electronic device includes: a display that displays a first object and a second object; and a controller that makes a control to acquire a user input indicating a relationship between the first object and the second object, to display a first relationship structure between the first object and the second object based on the user input, and to transmit a query including a second relationship structure between at least one first node corresponding to the first object and at least one second node corresponding to the second object to a server, the second relationship structure corresponding to the first relationship structure.

According to an embodiment of the present invention, a method of operating a server for processing a query is provided. The method includes; receiving a query including a first relationship structure between a first object and a second object, at least one of the first object and the second object corresponding to a plurality of nodes in a parallel relationship; generating a second relationship structure between at least one first node corresponding to the first object and at least one second node corresponding to the second object, the second relationship structure corresponding to the first relationship structure; generating a third relationship structure in which a hyper edge included in the second relationship structure is converted into a virtual node and a plurality of simple edges; and transmitting a query result that matches the query based on the third relationship structure.

According to an embodiment of the present invention, a server for processing a query is provided. The server includes: a communication module that receives a query including a first relationship structure between a first object and a second object, at least one of the first object and the second object corresponding to a plurality of nodes in a parallel relationship; and a controller that makes a control to generate a second relationship structure between at least one first node corresponding to the first object and at least one second node corresponding to the second object, the second relationship structure corresponding to the first relationship structure, to generate a third relationship structure in which a hyper edge included in the second relationship structure is converted into a virtual node and a plurality of simple edges, and to transmit a query result that matches the query through the communication module.

According to an embodiment of the present invention, a method of processing a query by an electronic device is provided. The method includes a process of displaying a plurality of objects, each of which includes at least one node, each object being for processing a different query; a process of selecting at least two objects among the plurality of objects; a process of forming a query through which nodes corresponding to the at least two selected objects are associated; and a process of making a request for result data according to the formed query.

According to an embodiment of the present invention, a method of processing a query by an electronic device is provided. The method includes: a process of displaying a first object and a second object; a process of acquiring a user input indicating a relationship between the first object and the second object; a process of transmitting a query including a first relationship structure between the first object and the second object to a server based on the user input; and a process of acquiring a query result that matches the query from the server and displaying the query result.

Effects of the Invention

According to various embodiments of the present invention, the user can acquire a graph having a complex structure as a matching result by only making an intuitive and simple conceptual relationship structure (for example, a query pattern).

Further, according to various embodiments of the present invention, it is possible to efficiently process queries provided by a plurality of people by modeling a hyper graph in a simple edge-based graph database.

BRIEF DESCRIPTION OF THE DRAWINGS

FIGS. 12A, 12B, 12C, 12D and 12E illustrate a process of making a relationship structure through an interface for making a relationship structure according to an embodiment;

FIGS. 18A, 18B and 18C illustrate interface screens for storing data in a server according to an embodiment;

FIGS. 23A and 23B illustrate a method by which a server converts a hyper edge according to an embodiment;

FIG. 24 illustrates a part of a schema of a graph database designed using a hyper edge modeling method according to an embodiment;

FIGS. 34A, 34B, 34C, 35A, 35B, 35C, 36A, 36B, 36C, 36D, 36E, 37A, 37B, 37C, 37D and 37E illustrate a query processing process using a frequent pattern according to a comparative example;

MODE FOR CARRYING OUT THE INVENTION

Figure 1:
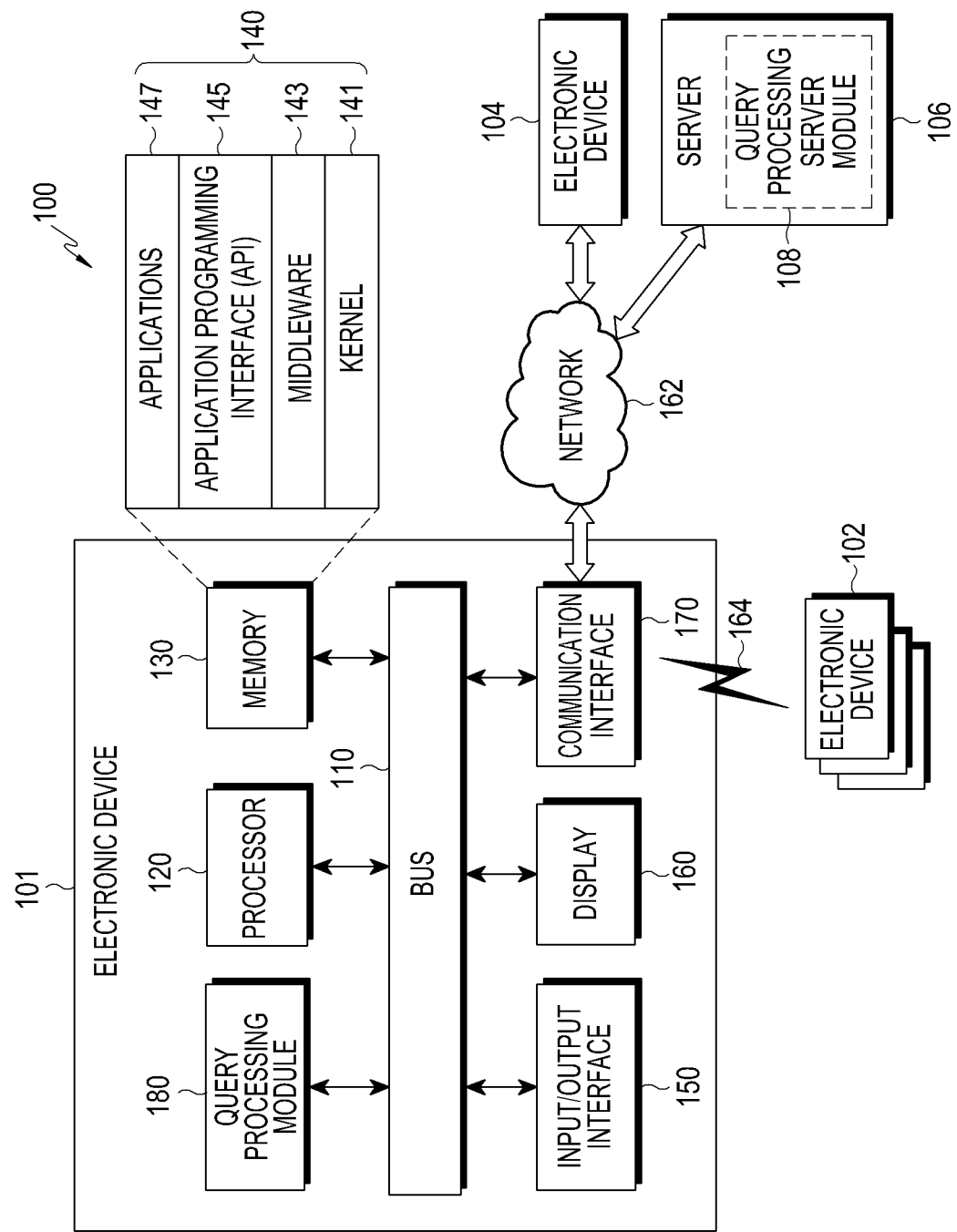
FIG. 1 illustrates a network environment including an electronic device according to various embodiments of the present invention.

Hereinafter, various embodiments of the present invention will be described with reference to the accompanying drawings. However, it should be understood that there is no intent to limit the present invention to the particular forms disclosed herein; rather, the present invention should be construed to cover various modifications, equivalents, and/or alternatives of embodiments of the present invention. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments, may modify various elements irrespective of order and/or importance thereof and do not limit the corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present invention.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present invention pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present invention should not be interpreted to exclude embodiments of the present invention.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

In some embodiments, an electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present invention is not limited to the aforementioned devices, and may include a new electronic device according to the development of technology Hereinafter, an electronic device according to various embodiments will be described with reference to the accompanying drawings. In the present invention, the term "user" may indicate a person using an electronic device or a device (e.g., an artificial intelligence electronic device) using an electronic device.

An electronic device 101 within a network environment 100 according to various embodiments is described with reference to FIG. 1. The electronic device 101 may include a bus 110, a processor 120, a memory 130, an input/output interface 150, a display 160, a communication interface 170, and a query processing module 180. In some embodiments, the electronic device 101 may omit at least some of the above elements or further include other elements.

The bus 110 may include a circuit for connecting the elements 120 to 180 and transferring communication between the elements (for example, control messages and/or data).

The processor 120 may include one or more of a Central Processing Unit (CPU), an Application Processor (AP), and a Communication Processor (CP). The processor 120 may control, for example, one or more other elements of the electronic device 101 and/or may carry out operations or data processing that is associated with communication. The processor 120 may be referred to as a controller, or may include the controller as a part thereof.

The memory 130 may include a volatile memory and/or a non-volatile memory. The memory 130 may store, for example, commands or data related to at least one other element of the electronic device 101. According to an embodiment, the memory 130 may store software and/or a program 140. The program 140 may include a kernel 141, middleware 143, an Application Programming Interface (API) 145, and/or an application program (or "application") 147. At least some of the kernel 141, the middle 143, and the API 145 may be referred to as an Operating System (OS).

The kernel 141 may control or manage, for example, system resources (for example, the bus 110, the processor 120, the memory 130, or the like) used for executing an operation or function implemented by the other programs (for example, the middleware 143, the API 145, or the application program 147). Furthermore, the kernel 141 may provide an interface through which the middleware 143, the API 145, or the application program 147 may access individual elements of the electronic device 101 to control or manage system resources.

The middleware 143 may serve as, for example, an intermediary such that the API 145 or the application programs 147 communicate with the kernel 141 to transmit/receive data. Furthermore, in regard to task requests received from the application program 147, the middleware 143 may perform a control (for example, scheduling or load balancing) for the task requests by using, for example, a method of assigning at least one application a priority for using the system resources (for example, the bus 110, the processor 120, or the memory 130) of the electronic device 101.

The API 145 is an interface by which the applications 147 control functions provided from the kernel 141 or the middleware 143, and may include, for example, at least one interface or function (for example, instructions) for file control, window control, image processing, or text control.

In the specification, the applications may be referred to as application programs.

The input/output interface 150 may serve as, for example, an interface which may transmit commands or data input from the user or another external device to other element(s) of the electronic device 101. Further, the input/output interface 150 may output commands or data received from another element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen and receive, for example, a touch input, a gesture input, a proximity input, or a hovering input using an electronic pen or a user's body part.

The communication interface 170 may establish communication between, for example, the electronic device 101 and an external device (for example, the first external electronic device 102, the second external electronic device 104, or the server 106). For example, the communication interface 170 may be connected to a network 162 through wireless or wired communication to communicate with the external device (for example, the external electronic device 104 or the server 106).

The first external electronic device 102 may be, for example, a beacon. The first external electronic device 102 may transmit/receive a beacon signal 164 at a preset time interval. The first external electronic device 102 may transmit/receive the beacon signal 164 based on various communication protocols such as Bluetooth, Wi-Fi, ANT, and the like.

Alternatively, the wireless communication may use, for example, at least one of LTE, LTE-A, CDMA, WCDMA, UMTS, WiBro, GSM, and the like for example, as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a LAN or a WAN), the Internet, and a telephone network.

Each of the first and second external electronic devices 102 and 104 may be a device which is the same as or different from the electronic device 101. According to an embodiment, the server 106 may include a group of one or more servers. According to various embodiments, all or some of the operations performed by the electronic device 101 may be performed by another electronic device or a plurality of electronic devices (for example, the electronic device 102 or 104 or the server 106). According to an embodiment, when the electronic device 101 should perform some functions or services automatically or by request, the electronic device 101 may make a request for performing at least some of the functions related to the functions or services to another device (for example, the electronic device 102 or 104 or the server 106) instead of performing the functions or services by itself. Another electronic device (for example, the electronic device 102 or 104 or the server 106) may execute the requested functions or additional functions, and transmit a result thereof to the electronic device 101. The electronic device 101 may provide the requested functions or services based on the received result or after additionally processing the received result. To this end, for example, cloud computing, distributed computing, or client-server computing technology may be used.

According to an embodiment, the query processing module 180 may support driving of the electronic device 101 by performing at least one of the operations (or functions) implemented by the electronic device 101. For example, the server 106 may include a query processing server module 108 capable of supporting the query processing module 180 implemented in the electronic device 101. For example, the query processing server module 108 may include at least one element of the query processing module 180 and may perform at least one of the operations performed by the query processing module 108 (for example, on behalf of the query processing module 108).

The query processing module 180 may process at least some of the information obtained from other elements (for example, at least one of the processor 120, the memory 130, the input/output interface 150, and the communication interface 170) and utilize the same in various manners. For example, the query processing module 180 may control at least some functions of the electronic device 101 by using the processor 120 or independently therefrom so that the electronic device 101 may interwork with other electronic devices (for example, the electronic device 102 or 104 or the server 106). The query processing module 180 may be integrated into the processor 120 or the communication interface 170. According to an embodiment, at least one element of the query processing module 180 may be included in the server 106 (for example, the query processing server module 108) and receive at least one operation, which is performed by the query processing module 180, from the server 106.

Figure 2:
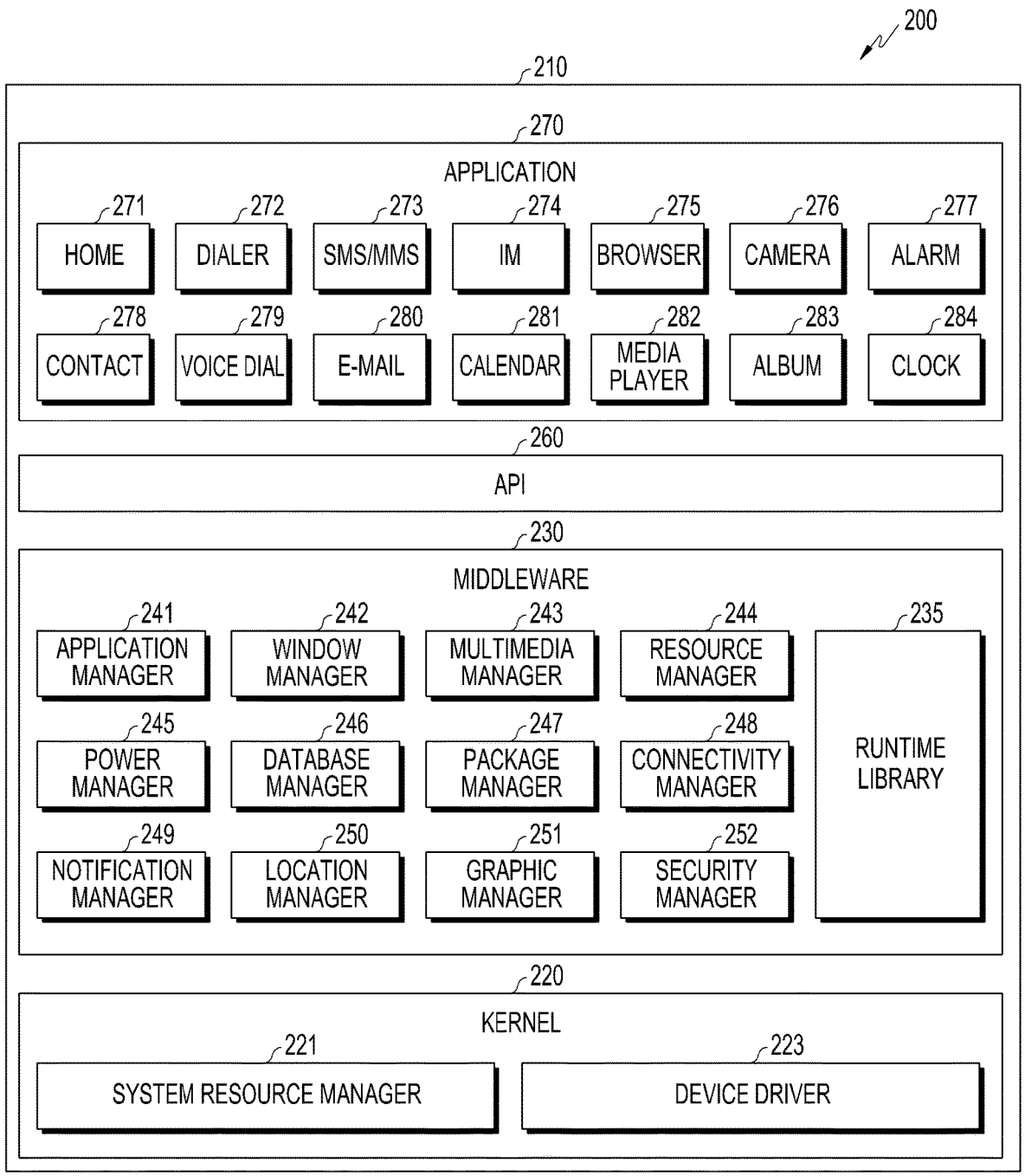
FIG. 2 is a block diagram of a program module according to various embodiments of the present invention.

FIG. 2 is a block diagram 200 of a program module 210 according to various embodiments of the present invention. According to an embodiment, the program module 210 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 210 may include a kernel 220, middleware 230, an Application Programming Interface (API) 260, and/or applications 270. At least some of the program module 210 may be preloaded in the electronic device or downloaded in the server (for example, the server 106).

The kernel 220 (for example, the kernel 141 of FIG. 1) may include, for example, a system resource manager 221 or a device driver 223. The system resource manager 221 may control, allocate, or collect the system resources. According to an embodiment, the system resource manager 221 may include a process manager, a memory manager, or a file system manager. The device driver 223 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 230 may provide, for example, a function required by the applications 270 in common, or may provide various functions to the applications 270 through the API 260 so that the applications 270 can efficiently use the limited system resources in the electronic device. According to an embodiment, the middleware 230 (for example, the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 are executed. The runtime library 235 may perform input/output management, memory management, or a function for an arithmetic function.

The application manager 241 may manage, for example, a life cycle of at least one application among the applications 270. The window manager 242 may manage a GUI resource used on the screen. The multimedia manager 243 may detect a format required for reproducing various media files and encode or decode a media file using a codec appropriate for the corresponding format. The resource manager 244 may manage resources such as a source code, a memory or a storage space of at least one application among the applications 270.

The power manager 245 may operate together with a Basic Input/Output System (BIOS) to manage a battery or power and may provide power information required for the operation of the electronic device. The database manager 246 may generate, search for, or change a database to be used by at least one of the applications 270. The package manager 247 may manage the installation or the updating of applications distributed in the form of package file.

The connectivity manager 248 may manage, for example, wireless connections, such as Wi-Fi or Bluetooth. The notification manager 249 may display or notify of an event such as a received message, an appointment, and a proximity notification to a user without disturbance. The location manager 250 may manage location information of the electronic device. The graphic manager 251 may manage graphic effects to be provided to a user and user interfaces related to the graphic effects. The security manager 252 may provide various security functions required for system security or user authentication. According to an embodiment, when the electronic device (for example, electronic device 101) has a call function, the middleware 230 may further include a telephony manager for managing a voice call function or a video call function of the electronic device.

The middleware 230 may include a middleware module for forming a combination of various functions of the aforementioned elements. The middleware 230 may provide modules specialized according to types of operating systems in order to provide differentiated functions. In addition, the middleware 230 may dynamically omit some existing elements or add new elements.

The API 260 (for example, the API 145), which is a set of API programming functions, may include different configurations according to operating systems. For example, in the case of Android or iOS, one API set may be provided for each platform, and in the case of Tizen, two or more API sets may be provided for each platform.

The applications 270 (for example, the application program 147) may include, for example, one or more applications which can provide functions such as home 271, dialer 272, SMS/MMS 273, Instant Message (IM) 274, browser 275, camera 276, alarm 277, contacts 278, voice dial 279, email 280, calendar 281, media player 282, album 283, clock 284, health care (for example, measure exercise quantity or blood sugar), or environment information (for example, atmospheric pressure, humidity, or temperature information).

According to an embodiment, the applications 270 may include an application (hereinafter, referred to as an "information exchange application" for convenience of the description) supporting information exchange between the electronic device (for example, the electronic device 101) and an external electronic device (for example, the electronic device 102 or 104). The information exchange application may include, for example, a notification relay application for transmitting specific information to the external electronic device, or a device management application for managing the external electronic device.

For example, the notification relay application may include a function of transferring, to the external electronic device (for example, the electronic device 102 or 104), notification information generated from other applications of the electronic device (for example, an SMS/MMS application, an e-mail application, a health management application, or an environmental information application). Further, the notification relay application may receive notification information from, for example, the external electronic device and provide the received notification information to the user. The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 270 may include an application (for example, health management application) designated according to attributes (for example, attributes of the electronic device such as the type of electronic device which corresponds to a mobile medical device) of the external electronic device (for example, the electronic device 102 or 104). According to an embodiment, the applications 270 may include an application received from the external electronic device (for example, the server 106, or the electronic device 102 or 104). According to an embodiment, the applications 270 may include a preloaded application or a third party application which can be downloaded from the server. Names of the elements of the program module 210, according to the above-described embodiments of the present invention, may change depending on the type of OS.

According to various embodiments, at least some of the program module 210 may be implemented in software, firmware, hardware, or a combination of two or more thereof. At least some of the program module 210 may be implemented (for example, executed) by, for example, the processor (for example, the AP 210). At least some of the program module 210 may include, for example, a module, program, routine, sets of instructions, or process for performing one or more functions.

Figure 3B:
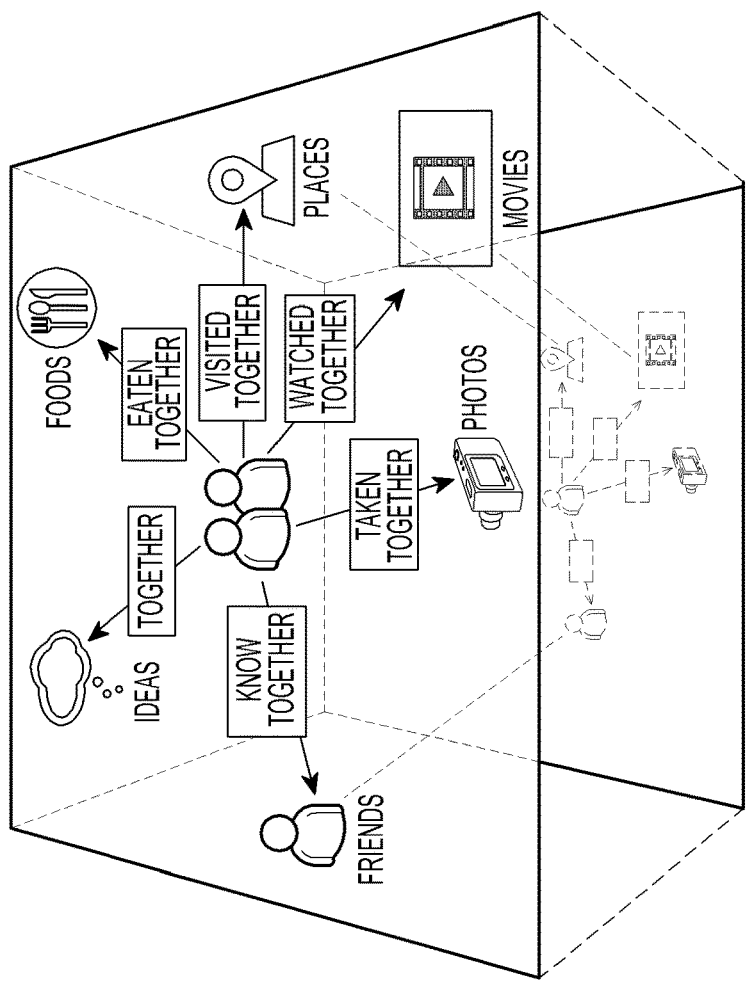
FIGS. 3A and 3B illustrate a data model to which a query processing method is applied according to an embodiment.
Figure 3A:
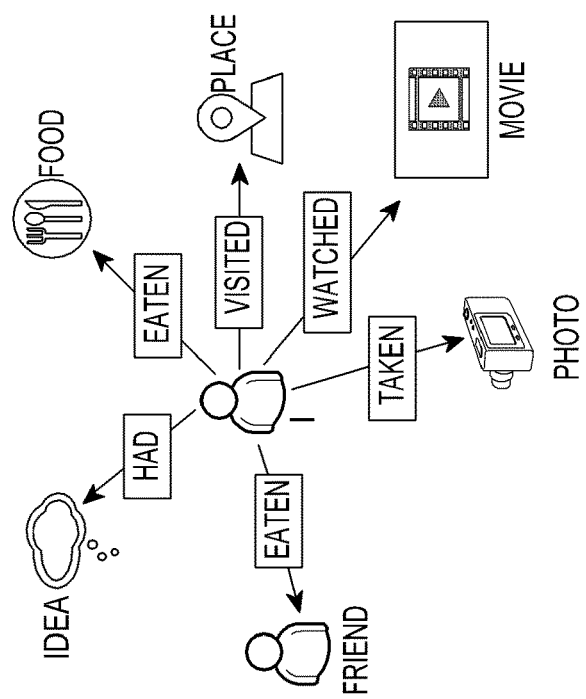

FIGS. 3A and 3B illustrate a data model to which a query processing method is applied according to an embodiment.

A query processing method according to an embodiment may be applied to query processing through a Social Network Service (SNS). The SNS refers to a service that provides free communication between users through the Internet and allows the users to share idea, experience, and feelings, and, accordingly, generates and enhances a social relation. A Location-Based Social Network service (LBSN), which is one type of the SNS, has shown marked growth according to the supply of smart phones, and the user may make a record to inform of a visitation to a particular place through check-in and useful information related to the user's location may be shared.

The SNS provides functions of generating, sharing, and searching for contents while focusing on "what I did" based on I who am the user as illustrated in FIG. 3A. However, "who I was with" is as meaningful as "what I did" in the real world. When generating contents (notices), some services may provide an interface for adding "people who I were with" and express "who I was with". However, corresponding information is not handled as the basic unit of calculations, so that supporting of a query using the corresponding information is not effectively conducted.

According to an embodiment of the present invention, a data model layer indicating a user group such as "who I was with" may be overlaid on a data model layer indicating "what I did" as illustrated in FIG. 3B. Further, data such as a place, a photo, and the like may be expressed as groups. Accordingly, it is possible to effectively express and inquire about not only "what I did" but also "who I was with and what I did".

Although FIGS. 3A and 3B illustrate the SNS as one example to which the query processing method is applied, the present invention is not limited thereto. The above described data modeling may be applied to another field for performing query processing on a group as well as query processing on one target.

Figure 4A:
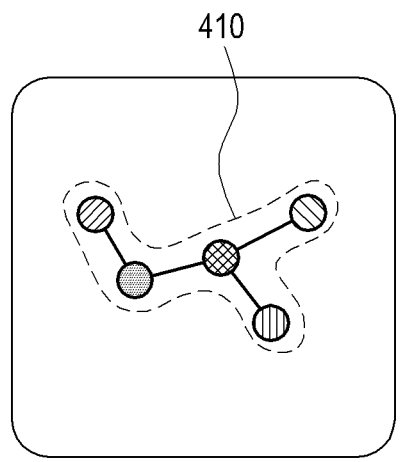
FIGS. 4A and 4B illustrate a visual graph query interface.
Figure 4B:
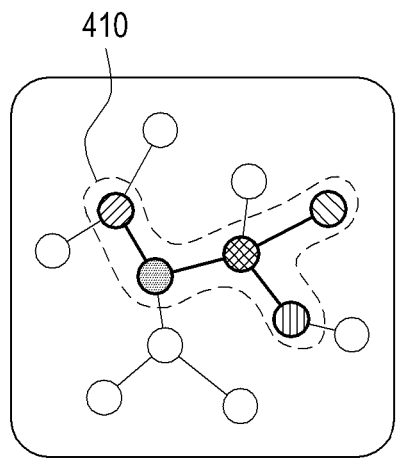

FIGS. 4A and 4B illustrate a visual graph query interface.

The visual graph query interface is a means that provides convenience to make a query based on a graph database supporting a graph concept. Through the interface, the user may make a query by drawing a relationship structure such as a graph form to be directly queried instead of making a query sentence using a particular query language.

In general, the making of the query graph may be performed by selecting a node and an edge to add or remove the selected node and edge to or from the graph drawn up to now. Further, a condition may be added or removed to or from the node or the edge as necessary.

FIG. 4A illustrates a query graph 410 made by the user. As illustrated in FIG. 4A, the user may directly make the query graph 410 instead of making a query sentence to perform query processing.

FIG. 4B illustrates a result graph that matches the query graph 410 made in FIG. 4A. The result graph that at least partially matches the query graph 410 may be acquired as a result of the query processing.

Figure 5:
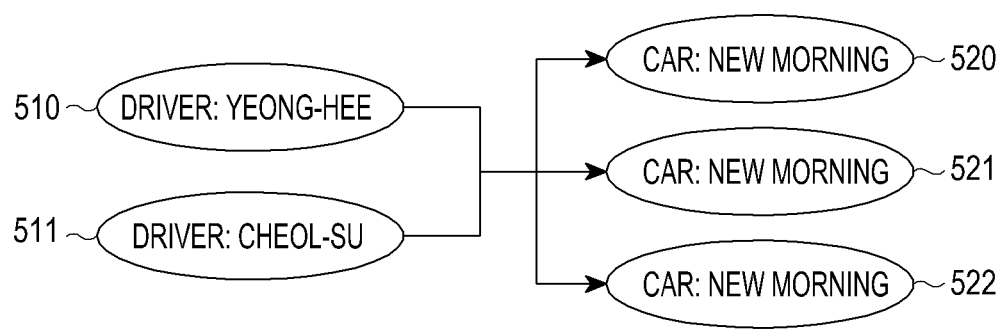
FIG. 5 illustrates a hyper edge according to an embodiment.

FIG. 5 illustrates hyper edges according to an embodiment.

A hyper graph generalizes a simple graph and corresponds to a graph using a hyper edge. The simple graph may refer to a graph using a simple edge corresponding to an edge that connects between two nodes, and the hyper edge may refer to an edge that connects a predetermined number of nodes. A hyper graph using a directional hyper edge is as shown in equation (1).

$$H=<N,A> \quad (1)$$

In equation (1), H denotes the hyper graph, N denotes a set of nodes, and A denotes a set of hyper edges, wherein the set A of hyper edges may be shown in equation (2).

$$A=<S,D> \quad (2)$$

In equation (2), S denotes a start node and S may be included in the set of nodes. D denotes a destination node and the destination node may also be included in the set of nodes.

In FIG. 5, directional hyper edges of the hyper graph are used, and FIG. 5 illustrates a case where driver Yeong-hee and driver Cheol-su jointly own a New Morning car, a K5 car, and a Sorento car. A Yeong-hee node 510 and a Cheol-su node 511 have a parallel relationship, and a New Morning node 520, a K5 node 521, and a Sorento node 522 also have a parallel relationship.

When a relationship structure illustrated in FIG. 5 is expressed by simple edges, the Yeong-hee node 510 is connected to each of the New Morning node 520, the K5 node 521, and the Sorento node 522 through separate edges and the Cheol-su node 511 is connected to each of the New Morning node 520, the K5 node 521, and the Sorento node 522 through separate edges, and thus the relationship structure may become complex. In contrast, when the relationship structure is expressed by a hyper edge, one hyper edge may have parallel start nodes and parallel destination nodes, and thus the relationship structure may be expressed through only one hyper edge.

FIGS. 6A, 6B, 6C and 6D illustrate check-in data modeling using the hyper edge according to an embodiment.

FIGS. 6A, 6B, 6C, and 6D illustrate a method of effectively storing check-in data in which activities corresponding to a user's visitation to a place are recorded in a graph database in the SNS described in FIGS. 3A and 3B and modeling data using a hyper edge to make a query.

Figures 6A, 6B:
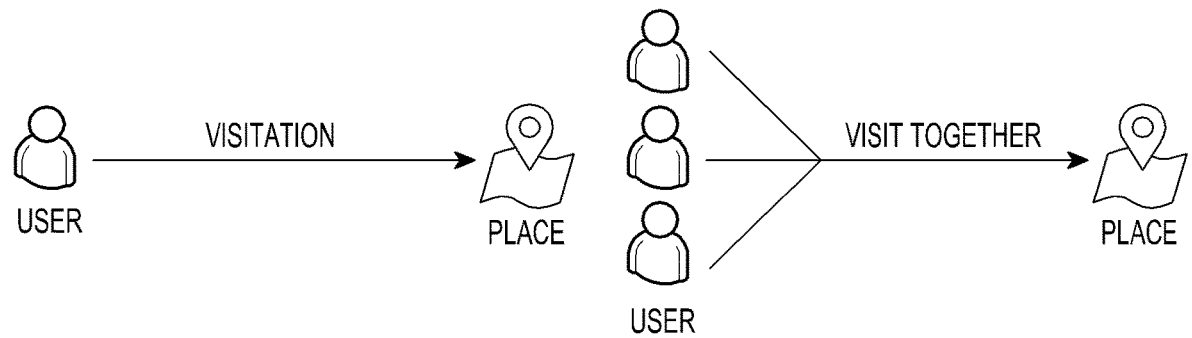
FIGS. 6A, 6B, 6C and 6D illustrate check-in data modeling using a hyper edge according to an embodiment.

FIG. 6A illustrates first check-in data when a single user visits a single place. The first check-in data may be modeled by a hyper edge having one start node and one destination node. Further, the hyper edge may additionally have an attribute of the relationship corresponding to "visited". The first check-in data may be expressed to be the same as modeling by the simple edges.

FIG. 6B illustrates second check-in data when a plurality of users visit a single place. The second check-in data may be modeled by a hyper edge having a plurality of start nodes and one destination node. Further, the hyper edge may additionally have information on a relationship corresponding to "visited".

Figures 6C, 6D:
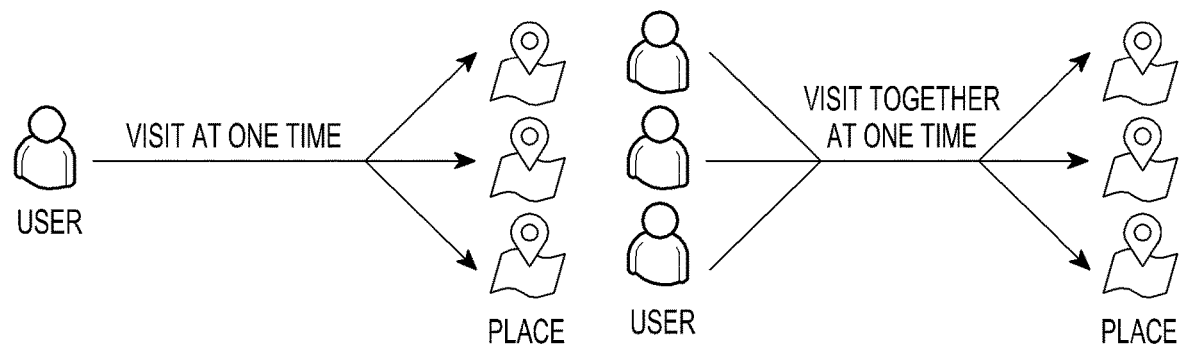

FIG. 6C illustrates third check-in data when a single user visits a plurality of places. The third check-in data may be modeled by a hyper edge having one start node and a plurality of destination nodes. Further, the hyper edge may additionally have information on a relationship corresponding to "visited".

FIG. 6D illustrates fourth check-in data when a plurality of users visit a plurality of places. The fourth check-in data may be modeled by a hyper edge having a plurality of start nodes and a plurality of destination nodes. Further, the hyper edge may additionally have information on a relationship corresponding to "visited".

As described above, the check-in data recorded by the user may be modeled by the hyper edge based on user information and place information additionally input when the check-in data is recorded. Accordingly, the check-in data can be efficiently stored, and a query for at least one user or at least one place can be effectively processed using the check-in data in a query processing process.

Figures 7, 8:
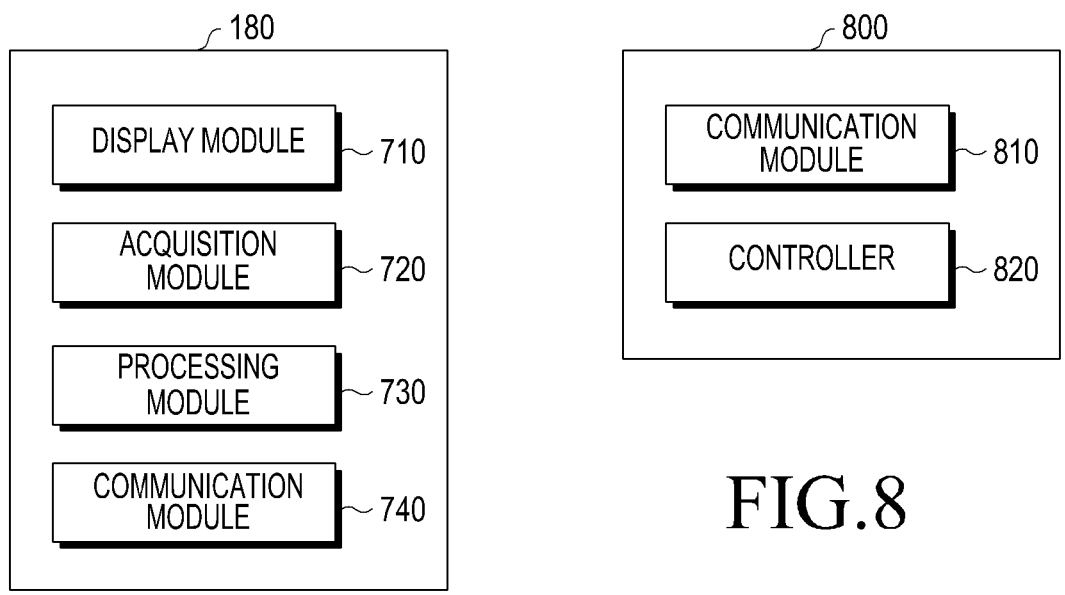
FIG. 7 is a block diagram illustrating a query processing module of an electronic device according to various embodiments of the present invention.
FIG. 8 is a block diagram illustrating a server according to various embodiments of the present invention.

FIG. 7 is a block diagram illustrating a query processing module of the electronic device according to various embodiments of the present invention.

Referring to FIG. 7, the query processing module 180 may include a display module 710, an acquisition module 720, a communication module 740, and a processing module 730. The query processing module 180 may be provided separately from the processor (for example, the processor 120) or may be entirely or partially integrated into the processor.

The display module 710 according to various embodiments of the present invention may display a first object and a second object on the display (for example, the display 160) of the electronic device 101. The first object and the second object may be selected by an acquired user's input from a plurality of objects displayed on the display by the display module 710. For example, the first object and the second object may be displayed in an area spaced apart from the area where the plurality of objects are displayed on the display by a user's drag input. The plurality of objects may correspond to categories of a plurality of nodes of a graph database included in a server 800, respectively.

The acquisition module 720 according to various embodiments of the present invention may acquire a user input indicating a relationship between the first object and the second object through the input/output interface (for example, the input/output interface 150) of the electronic device 101. The user input may include various types of inputs supported by the electronic device 101 such as a touch input, a gesture input, a voice input, and the like.

The display module 710 according to various embodiments of the present invention may display a first relationship structure between the first object and the second object on the display based on the user input. The relationship structure may include all structure types for indicating the relationship between the objects. For example, the relationship structure may include a graph structure including a plurality of nodes and edges that connect the plurality of nodes.

The processing module 730 according to various embodiments of the present invention may form the first relationship structure based on the user input. The first relationship structure may be a structure simplified from the relationship structure processed in the graph database. Accordingly, the user may acquire a query processing result through the graph database based on the more simplified first relationship structure without directly making the relationship structure processed in the graph database. The processing module 730 may control the display module 710 to display the formed first relationship structure.

The communication module 740 according to various embodiments of the present invention may transmit a query including a second relationship structure between at least one first node corresponding to the first object and at least one second node corresponding to the second object to a server (800), the second relationship structure corresponding to the first relationship structure.

The processing module 730 according to various embodiments of the present invention may convert the first relationship structure into the second relationship structure based on the relationship structure processed in the graph database. The second relationship structure may correspond to the type of the relationship structure processed in the graph database. As described above, the processing module 730 may process the query through the graph database by converting the first relationship structure, which is a simpler relationship structure, into the second relationship structure. The processing module 730 may transmit the query including the second relationship structure to the server 800 through the communication module 740.

According to an embodiment, a process in which the processing module 730 converts the first relationship structure into the second relationship structure may be performed by the server 800. In order to reduce calculations performed by the electronic device, the server 800 may perform the process of converting the first relationship structure into the second relationship structure.

According to an embodiment, the processing module 730 may select a first relationship between the first object and the second object corresponding to a user input indicting the relationship between the first object and the second object. The first relationship may be one of the preset relationships between a plurality of nodes included in the graph database of the server 800.

According to an embodiment, the processing module 730 may connect the first object and the second object through the selected first relationship. Accordingly, the form of the first relationship structure may be constructed.

According to an embodiment, the processing module 730 may set an object type for each of the first object and the second object. The object type may include at least one of a single object type corresponding to a single node, a group object type corresponding to a plurality of nodes in a parallel relationship, and a chaining object type corresponding to a plurality of nodes in a serial relationship.

According to an embodiment, the processing module 730 may set information on each of at least one first node and at least one second node for query processing based on the set object type. For the query processing, information on the first node and the second node corresponding to the first object and the second object, respectively, may be set.

For example, when the object type of the first object corresponds to the single type, information on the single node may be set. According to an embodiment, the information on the single node may be preset according to at least one of an attribute and a kind of the single node. Further, when the object type of the first object corresponds to the group object type, information on the plurality of nodes in the parallel relationship corresponding to the first object may be set. In addition, when the object type of the first object corresponds to the chaining object type, information on a connection condition of the plurality of nodes in the serial relationship corresponding to the first object and a start node of the connections according to the connection condition in the plurality of nodes in the serial relationship may be set.

According to an embodiment, the processing module 730 may form the first relationship structure by setting an object which is a query processing target between the first object and the second object. Based on a user input, an object between the first object and the second object acquired as a query result corresponding to the query processing may be selected.

According to an embodiment, the processing module 730 may determine the number of at least one first node and the number of at least one second node based on the set object type. For example, when the type of the first object corresponds to the single object type, the number of first nodes corresponding to the first object may be one. When the type of the first object corresponds to the group object type, the number of first nodes corresponding to the first object may be the number of a plurality of nodes in a parallel relationship corresponding to the first object. When the type of the first object corresponds to the chaining object type, the number of first nodes corresponding to the first object may be the number of a plurality of nodes in a serial relationship corresponding to the first object.

According to an embodiment, when at least one of the object types of the first object and the second object corresponds to the group object type, each of at least one first node and at least one second node may be connected by the hyper edge. As described above, the hyper edge may have a plurality of start nodes and a plurality of destination nodes. Further, when the object type corresponds to the group object type, the object may correspond to a plurality of nodes in a parallel relationship. In this case, each of at least one first node and at least one second node may be connected by the hyper edge.

According to an embodiment, the communication module 740 may acquire a query result that matches the query from the server 800 and display the query result on the display through the display module 710. Accordingly, the user may acquire the query result through the simplified first relationship structure.

FIG. 8 is a block diagram illustrating the server according to various embodiments of the present invention.

The server 800 may include a communication module 810 and a controller 820. Further, the server 800 may include a graph database (not shown) that supports a graph concept. According to an embodiment, the graph database may be a simple edge-based graph database which does not support the hyper database.

According to various embodiments of the present invention, the communication module 810 may receive a query including the first relationship structure between the first object and the second object. At least one of the first object and the second object may correspond to a plurality of nodes in a parallel relationship. The process of converting the first relationship structure into the second relationship structure may be performed by the electronic device 101 as illustrated in FIG. 7, but may be performed by the server 800 to reduce calculations of the electronic device 101. In this case, the communication module 810 may receive the query including the first relationship structure.

According to an embodiment, the communication module 810 may receive a query including the second relationship structure including the hyper edge. The relationship structure may correspond to the second relationship structure converted from the first relationship structure formed based on a user input in the electronic device 101. When the electronic device 101 performs the process of converting the first relationship structure into the second relationship structure, the communication module 810 may receive the query including the second relationship structure. In this case, the communication module 810 may not receive the query including the first relationship structure.

According to various embodiments of the present invention, the controller 820 may generate a second relationship structure between at least one first node corresponding to the first object and at least one second node corresponding to the second object, the second relationship structure corresponding to the first relationship structure. The second relationship structure may correspond to the type of the relationship structure processed in the graph database.

According to various embodiments of the present invention, the controller 820 may generate a third relationship structure in which the hyper edge included in the second relationship structure is converted into a virtual node and a plurality of simple edges. As described above, when the graph database does not support the relationship structure including the hyper edge, a process of modeling the relationship structure to a relationship structure including the hyper edge may be needed. Accordingly, the controller 820 may convert the hyper edge into the virtual node and the plurality of simple edges.

According to various embodiments of the present invention, the communication module 810 may transmit the query result that matches the query to the electronic device 101 based on the third relationship structure.

According to an embodiment, the controller 820 may determine the number of at least one first node and the number of at least one second node based on at least one of object types of the first object and the second object and information on the first object and the second object.

Further, the controller 820 may connect at least one first node and at least one second node through the hyper edge. Since at least one of the first object and the second object corresponds to a plurality of nodes in a parallel relationship, the controller 820 may connect at least one first node and at least one second node through the hyper edge.

According to an embodiment, the controller 820 may generate the virtual node corresponding to the hyper edge. Further, the controller 820 may generate a third relationship structure in which at least one start node of the hyper edge, the virtual node, and at least one destination node of the hyper edge are connected through the simple edges. Accordingly, the second relationship structure including the hyper edge may be converted into the simple edge-based third relationship structure. A detailed method thereof will be described below.

Figure 9:
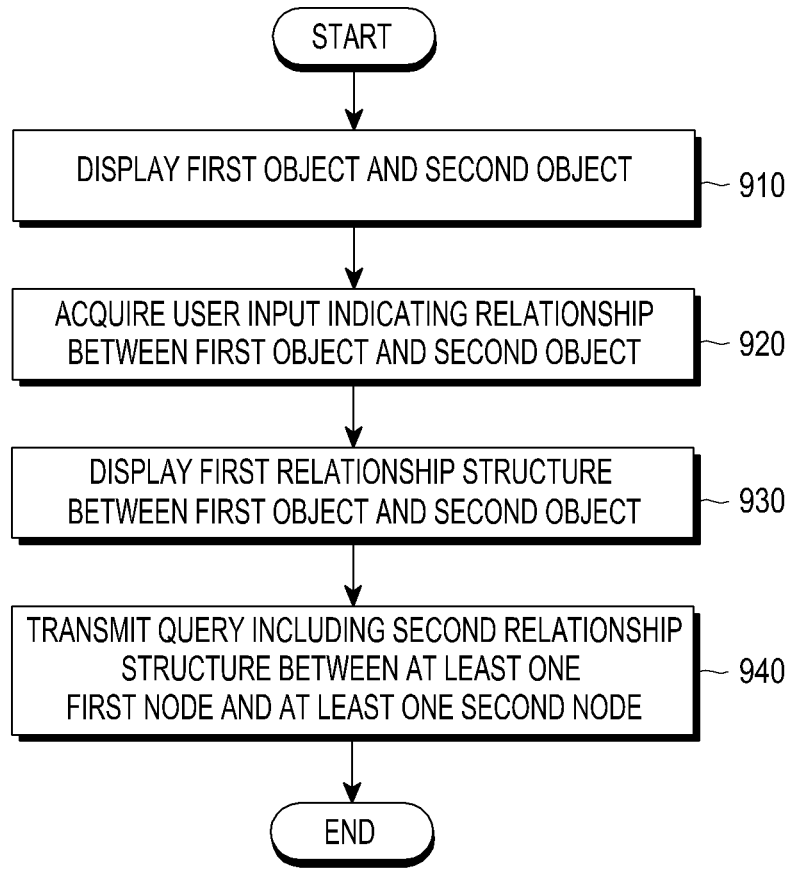
FIG. 9 is a flowchart illustrating a query processing method of an electronic device according to various embodiments of the present invention.

FIG. 9 is a flowchart illustrating a query processing method by an electronic device according to various embodiments of the present invention.

In process 910, the electronic device 101 may display a first object and a second object. The first object and the second object may be selected by an acquired user's input from a plurality of objects displayed on the display of the electronic device 101. The plurality of objects may correspond to categories of a plurality of nodes of a graph database included in the server 800, respectively.

In process 920, the electronic device 101 may acquire a user input indicating a relationship between the first object and the second object. The first relationship may be one of the preset relationships between a plurality of nodes included in the graph database of the server 800. The preset relationship may be set based on a user's selection or categories of the plurality of nodes in a process for storing the graph database.

In process 930, the electronic device 101 may display a first relationship structure between the first object and the second object based on the user's input. The first relationship structure may be a structure simplified from the relationship structure processed in the graph database.

In process 940, the electronic device 101 may transmit a query including a second relationship structure between at least one node corresponding to the first object and at least one second node corresponding to the second object to the server 800. The second relationship structure may correspond to the type of the relationship structure processed in the graph database. The query may be processed through the graph database by converting the first relationship structure into the second relationship structure. Process 940 may be performed by the server 800 to reduce calculations performed by the electronic device 101.

Figure 10:
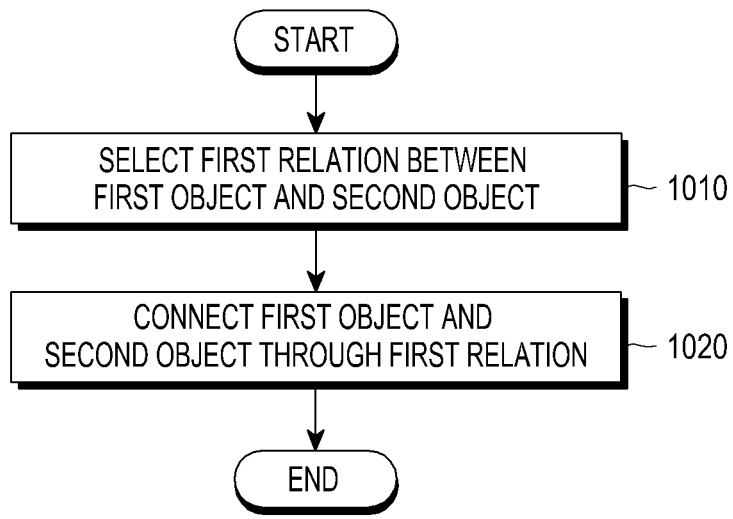
FIG. 10 is a flowchart illustrating a process of displaying a first relationship structure according to an embodiment.

FIG. 10 is a flowchart illustrating a process of displaying the first relationship structure according to an embodiment.

In process 1010, the electronic device 101 may select a first relationship between the first object and the second object. As described above, the first relationship may be one of the preset relationships between a plurality of nodes included in the graph database.

In process 1020, the electronic device 101 may connect the first object and the second object through the first relationship. As the relationship between the first object and the second object is formed through the first relationship, the form of the first relation structure may be constructed.

A detailed method of forming the first relationship structure will be described in detail through FIGS. 11 to 13.

Figure 11A:
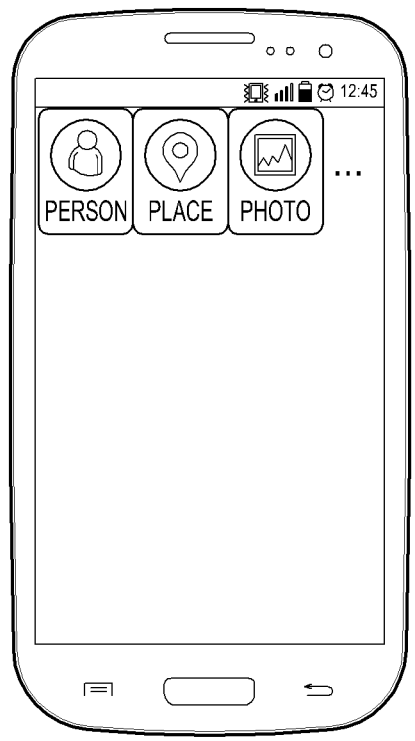
FIGS. 11A and 11B illustrate an interface screen for forming a relationship structure according to an embodiment.
Figure 11B:
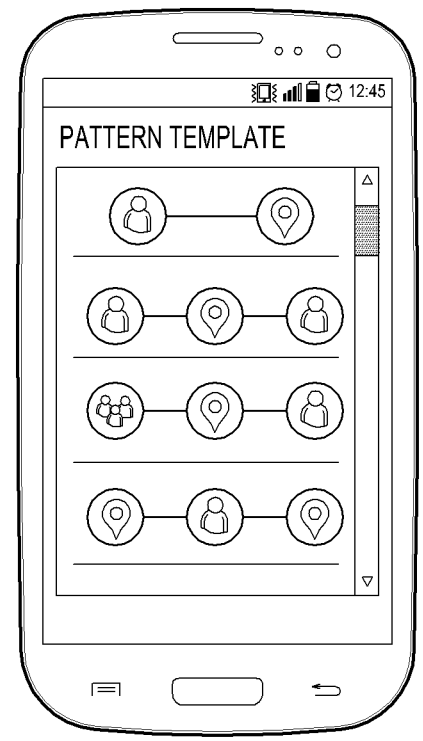

FIGS. 11A and 11B illustrate an interface screen for forming a relationship structure according to an embodiment.

Through the interface screen illustrated in FIGS. 11A and 11B, the user may make the first relationship structure. The user may make the first relationship structure through the interface and acquire a query result corresponding to the first relationship structure.

As illustrated in FIG. 11A, the electronic device 101 may display a plurality of objects which can be used to form the first relationship structure through the interface. The plurality of objects may correspond to categories for a plurality of nodes of the graph database, respectively. For example, when a person, a place, a photo, and the like are included in the categories of the plurality of nodes of the graph database, the plurality of objects may include a person object, a place object, a photo object, and the like. Each of the plurality of objects may be expressed in an icon form which the user can intuitively recognize according to attributes of the categories and may directly display names of the categories.

The user may make the first relationship structure by selecting at least two objects from the plurality of objects displayed as illustrated in FIG. 11A. Further, the user may make the first relationship structure by using a pattern template for the preset first relationship structure as illustrated in FIG. 11B. The pattern template may include the form of at least one first relationship structure frequently used. Further, the form of the first relationship structure included in the pattern template may be directly set by the user. When at least one first relationship structure included in the pattern template is used, the user may make the first relationship structure by setting information on at least one node corresponding to each object alone.

The first relationship structure may include a relationship between objects. The user may set at least two objects included in the first relationship structure and a relationship between the objects in order to construct the first relationship structure through the interface. FIGS. 12A, 12B, 12C, 12D and 12E and FIGS. 13A, 13B, 13C and 13D describe in detail a method by which the user directly makes the first relationship structure through the interface. The description of FIGS. 12A to 12E and 13A to 13D is made based on a person object, a place object, and a photo object, and relationships which can be established between the objects mainly used in the LBSN. However, the objects and the relationship which can be established between the objects may be variously defined according to a character of a field using the query processing method according to an embodiment of the present invention.

FIGS. 12A to 12E illustrate a process of making a relationship structure through an interface for making a relationship structure according to an embodiment.

FIGS. 12A to 12E describe a method of making a first relationship structure by selecting at least two objects from a plurality of displayed objects.

As illustrated in FIG. 12A, the electronic device 101 may display a place object among the plurality of displayed objects based on a user's input. The selected place object in an icon form may be displayed in an area spaced apart from the area where the plurality of objects are displayed.

In FIG. 12B, the electronic device 101 may display a selected person object based on a user's input. The person object may be displayed in an area spaced apart from the area where the plurality of objects are displayed.

FIG. 12C illustrates a process of connecting two selected objects. When the place object and the person object are connected to establish a relationship, the user may select one of the place object and the person object to be connected to each other and then drag or slide the selected object to the other one, so as to select the other object.

FIG. 12D illustrates a screen on which relationships that can be established between the place object and the person object having the established relationship therebetween are displayed through a window. The relationships displayed through the window may be one of the preset relationships between a plurality of nodes included in the graph database.

FIG. 12E illustrates a first relationship structure in which the place object and the person object are connected through a relationship of "visited" which is the relationship selected by the user in FIG. 12D.

Through the way described in FIGS. 12A to 12E, the user may expand the first relationship structure until the first relationship structure has the form which the user desires.

FIGS. 13A to 13D illustrates a process of making a relationship structure through an interface for making a relationship structure according to an embodiment.

FIGS. 13A to 13D describe a method of selecting one of a plurality of displayed objects and expanding the selected one object, so as to make the first relationship structure.

Figure 13D:
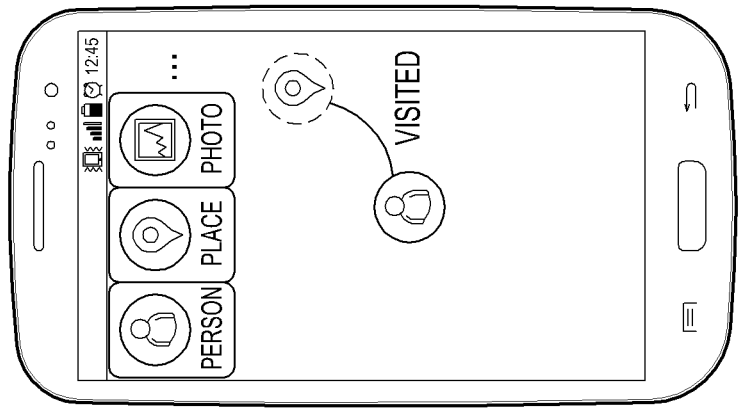
FIGS. 13A, 13B, 13C and 13D illustrate a process of making a relationship structure through an interface for making a relationship structure according to an embodiment.
Figure 13C:
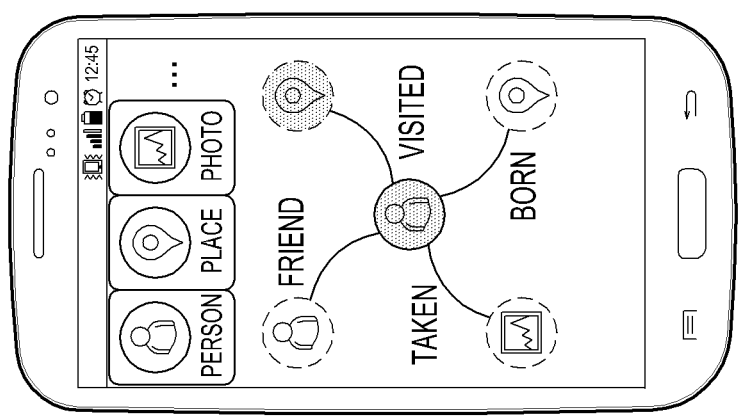
Figure 13B:
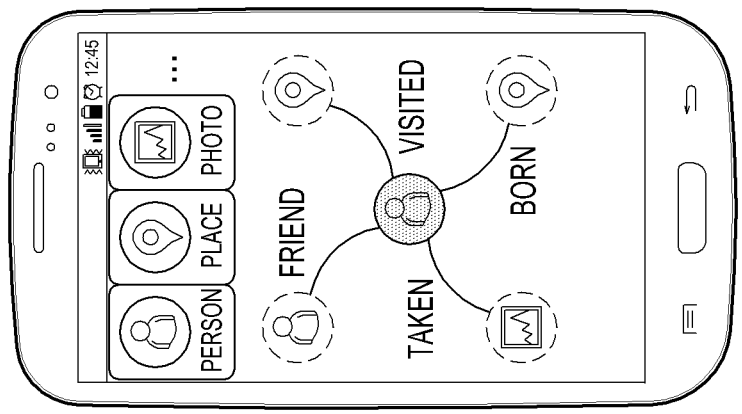
Figure 13A:
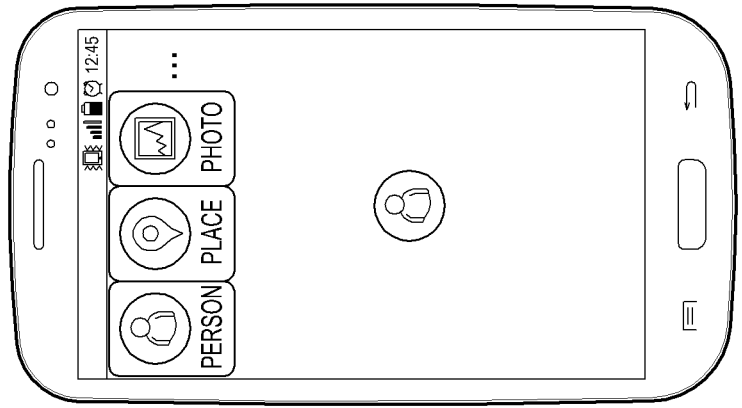

As illustrated in FIG. 13A, the electronic device 101 may display a person object which is one of the plurality of displayed objects based on a user's input. The selected person object in an icon form may be displayed in an area spaced apart from the area where the plurality of objects are displayed.

FIG. 13B illustrates a screen on which at least one object which can be connected to the person object through a relationship is displayed. For example, as illustrated in FIG. 13B, a person object, which can be connected to the person object through a "friend" relationship, a place object, which can be connected to the person object through a "visited" relationship, a place object, which can be connected to the person object through a "born" relationship, and a photo object, which can be connected to the person object through a "taken" relationship may be displayed through the electronic device 101.

In FIG. 13C, the user may select one of at least one object displayed in FIG. 13B. FIG. 13C illustrates an interface screen displayed when the place object which can be connected to the person object through the "visited" relationship is selected based on the user's input.

FIG. 13D illustrates a first relationship structure including the place object connected to the person object selected by the user through the "visited" relationship.

Through the way described in FIGS. 13A to 13D, the user may expand the first relationship structure until the first relationship structure has the form which the user desires.

Figure 14:
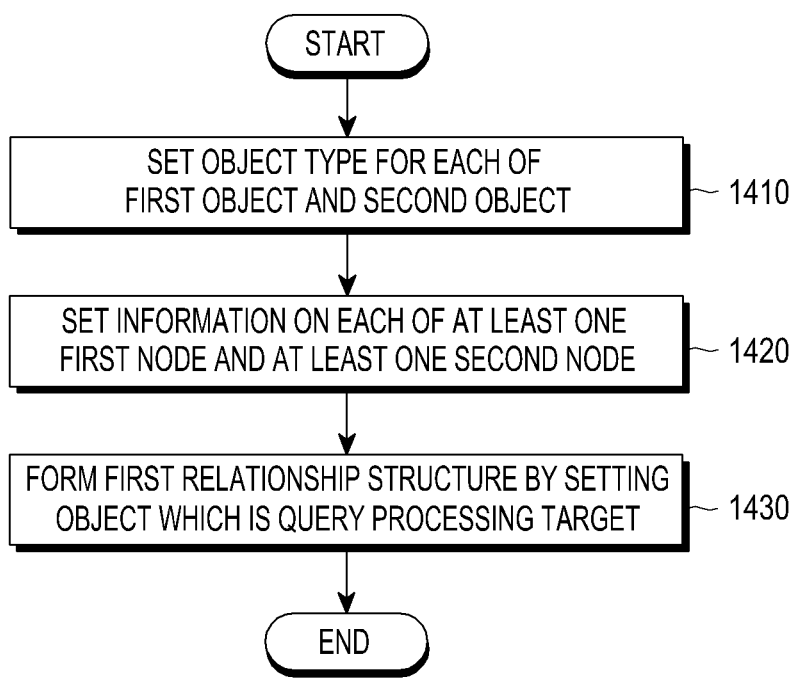
FIG. 14 is a flowchart illustrating a process of displaying a first relationship structure.

FIG. 14 is a flowchart illustrating a process of displaying the first relationship structure.

In process 1410, the electronic device 101 may set an object type for each of the first object and the second object. The electronic device 101 may set the object type for each of the first object and the second object as one of a single object type, a group object type, and a chaining object type based on a user's input.

In process 1420, the electronic device 101 may set information on each of at least one first node and at least one second node for query processing based on the set object type. As described above, the first object and the second object may correspond to one of node categories included in the graph database. Accordingly, in order to match the objects with each of the plurality of nodes included in the graph database, information on each of at least one first node and at least one second node may be set.

In process 1430, the electronic device 101 may form the first relationship structure by setting an object which is a query processing target between the first object and the second object. The user may select one object included in the first relationship structure to receive a query result which the user desires through the first relationship structure.

Figure 15:
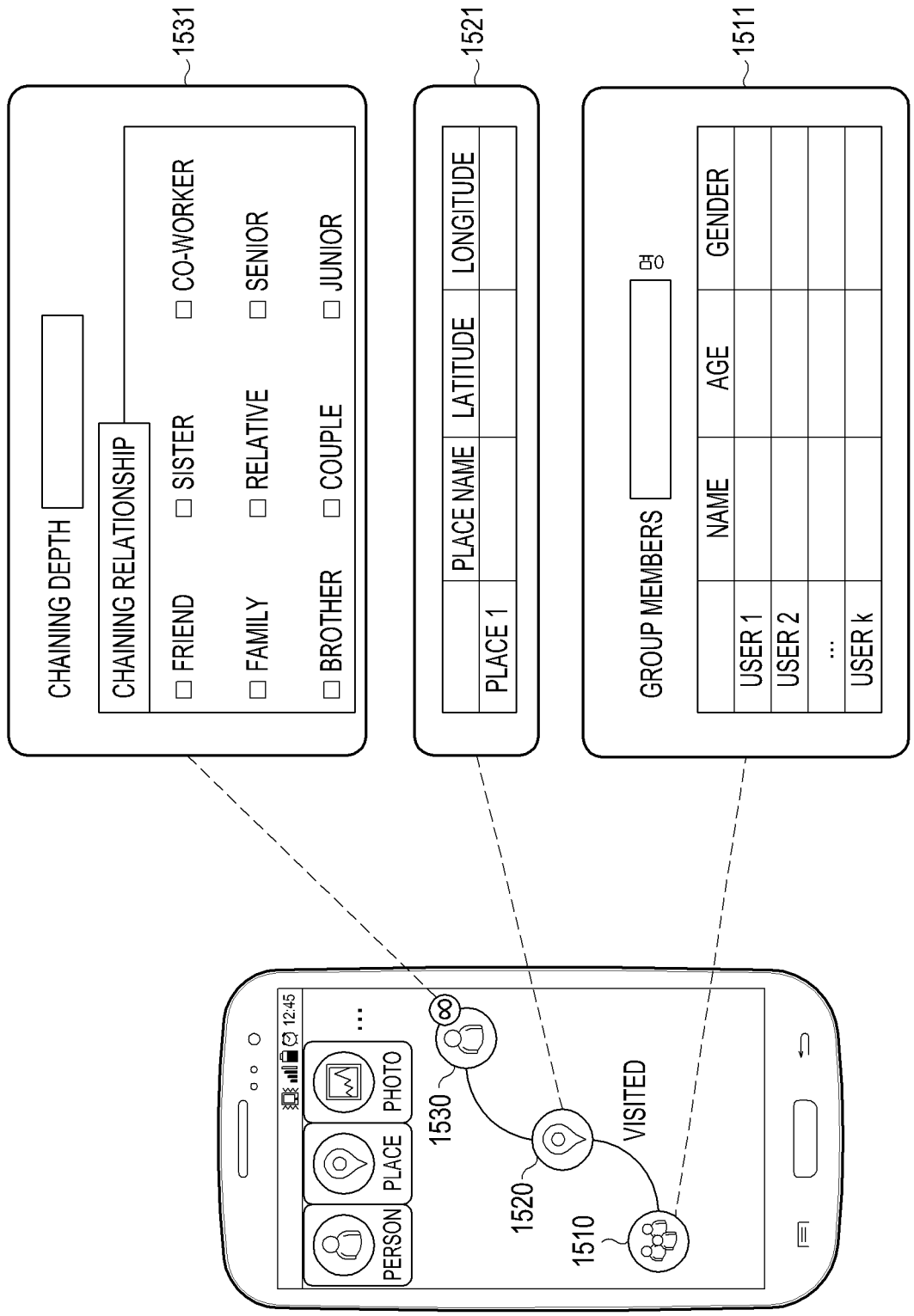
FIG. 15 illustrates a screen on which information on a node corresponding to each object is set through an interface for making a relationship structure according to an embodiment.

FIG. 15 illustrates a screen on which information on a node corresponding to each object is set through an interface for making a relationship structure according to an embodiment.

As illustrated in FIG. 15, after the object type for each of the objects included in the first relationship structure has been set, the electronic device 101 may set information on the node corresponding to each object based on the set object type. The electronic device 101 may acquire a query result that matches the query within the graph database based on the set information on the node.

Referring to FIG. 15, the first relationship structure includes a group object-type person object 1510, a simple object-type place object 1520, and a chaining object-type person object 1530. The information on the node which can be set may vary depending on each object type.

For example, the group object-type person object 1510 may correspond to a plurality of nodes in a parallel relationship. Accordingly, an information setting screen 1511 of the nodes corresponding to the group object-type person object 1510 may be displayed to set information on each of the plurality of nodes in a parallel relationship. More specifically, the number of the plurality of nodes in the parallel relationship corresponding to the group object-type person object 1510 and detailed information on each of the plurality of nodes in the parallel relationship (for example, name, age, gender, and the like) may be set.

The simple object-type place object 1520 may correspond to a single node. Accordingly, an information setting screen 1521 of the nodes corresponding to the simple object-type place object 1520 may be displayed to set information on the single node (for example, place name, latitude, longitude, and the like). Further, according to an embodiment, the simple object-type object may include preset node information and thus may not perform a separate node information setting process.

The chaining object-type person object 1530 may correspond to a plurality of nodes in a serial relationship. The plurality of nodes in the serial relationship may be connected to each other in the serial relationship based on a preset chaining relationship. Accordingly, an information setting screen 1531 of the nodes corresponding to the chaining object-type person object 1530 may be displayed to set a connection condition of the plurality of nodes in the serial relationship and information on a start node of the connection according to the connection condition among the plurality of nodes in the serial relationship. The connection condition may include a connection relationship (chaining relationship) and a connection depth (chaining depth). The connection relationship may be set as one of at least one relationship which can be set in the start node. Further, in consideration of the connection depth, the number of a plurality of nodes in a serial relationship corresponding to the chaining object type person object 1530 may be determined. For example, when the connection depth is 1, nodes of a first depth connected to the start node through the connection relationship may correspond to the chaining type person object 1530. Further, when the connection depth is 2, nodes of a second depth connected to the nodes of the first depth through the connection relationship may correspond to the chaining type person object 1530.

As described above, based on the object type of each object included in the first relationship structure and types or attributes of the objects, information on at least one node corresponding to each object may be set.

Figure 16:
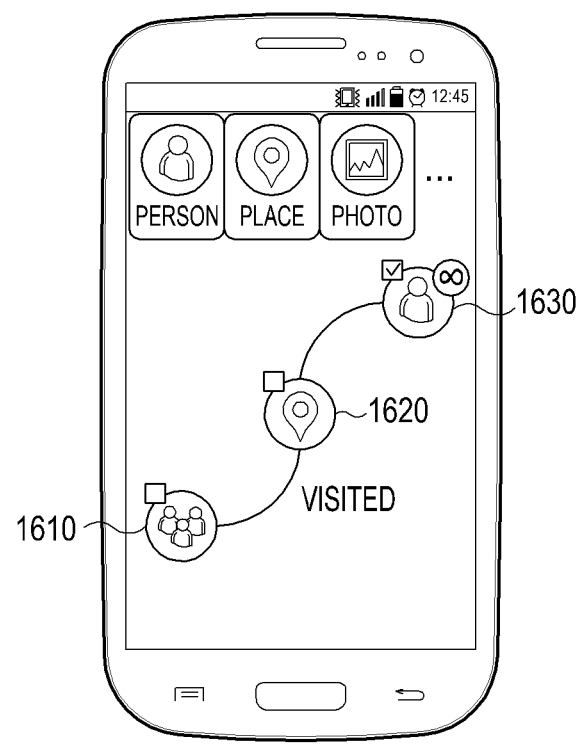
FIG. 16 illustrates a screen for selecting an object which is a query processing target through an interface for making a relationship structure according to an embodiment.

FIG. 16 illustrates a screen for selecting an object which is a query processing target through an interface for making a relationship structure according to an embodiment.

As illustrated in FIG. 16, the electronic device 101 may set an object which the query processing targets among objects included in the first relationship structure. The first relationship structure illustrated in FIG. 16 includes a group object-type person object 1610, a simple object-type place object 1620, and a chaining object-type person object 1630. The user may select the object which is the query processing target from the objects and acquire a query result for the selected object. For example, when the chaining object-type person object 1630 is selected as illustrated in FIG. 16, the electronic device 101 may acquire and display a query result for the chaining object-type person object 1630.

Figure 17A:
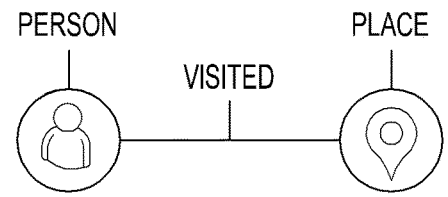
FIGS. 17A, 17B and 17C illustrate a relationship structure made through an interface for making a relationship structure according to an embodiment.
Figure 17B:
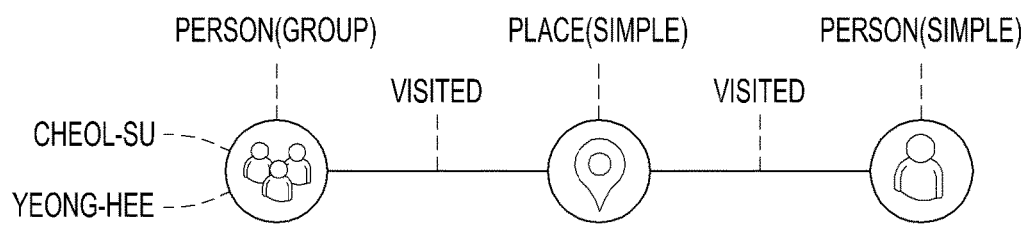
Figure 17C:
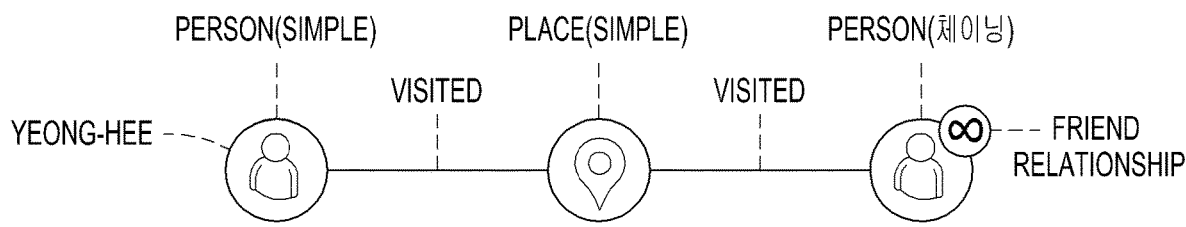

FIGS. 17A, 17B and 17C illustrate a relationship structure made through an interface for making a relationship structure according to an embodiment.

FIGS. 17A to 17C describe a meaning of a query corresponding to the made first relationship structure.

FIG. 17A illustrates the first relationship structure in which a person object and a place object are connected to each other through a "visited" relationship. In FIG. 17A, node information on each of the person object and the place object is not set. Accordingly, the first relationship structure illustrated in FIG. 17A may have a meaning that a "person" "visits" a "place".

FIG. 17B illustrates the first relationship structure in which the group object-type person object is connected to the simple object-type place object through a "visited" relationship and the place object is connected to the simple object-type person object through a "visited" relationship. Further, information on "Cheol-su" and "Yeong-hee" is set as information on nodes corresponding to the group object-type person object, and it is assumed that an object which is the query processing target is the simple object-type person object. In this case, the first relationship structure illustrated in FIG. 17B may have a meaning of finding a person who has visited a place along with "Cheol-su" and "Yeong-hee".

FIG. 17C illustrates the first relationship structure in which the simple object-type person object is connected to the simple object-type place object through a "visited" relationship and the place object is connected to the chaining object-type person object through a "visited" relationship. Further, information on "Cheol-su" is set as information on the node corresponding to the simple object-type person object and it is assumed that an object which is the query processing target is the chaining object-type person object and a chaining condition included in the chaining object-type object is a "friend" relationship. In this case, the first relationship structure illustrated in FIG. 17C may have a meaning of finding all people who have visited the place where "Cheol-su" has visited and friends of the people.

According to the formed first relationship structure, queries having different meanings may be generated.

Figure 18A:
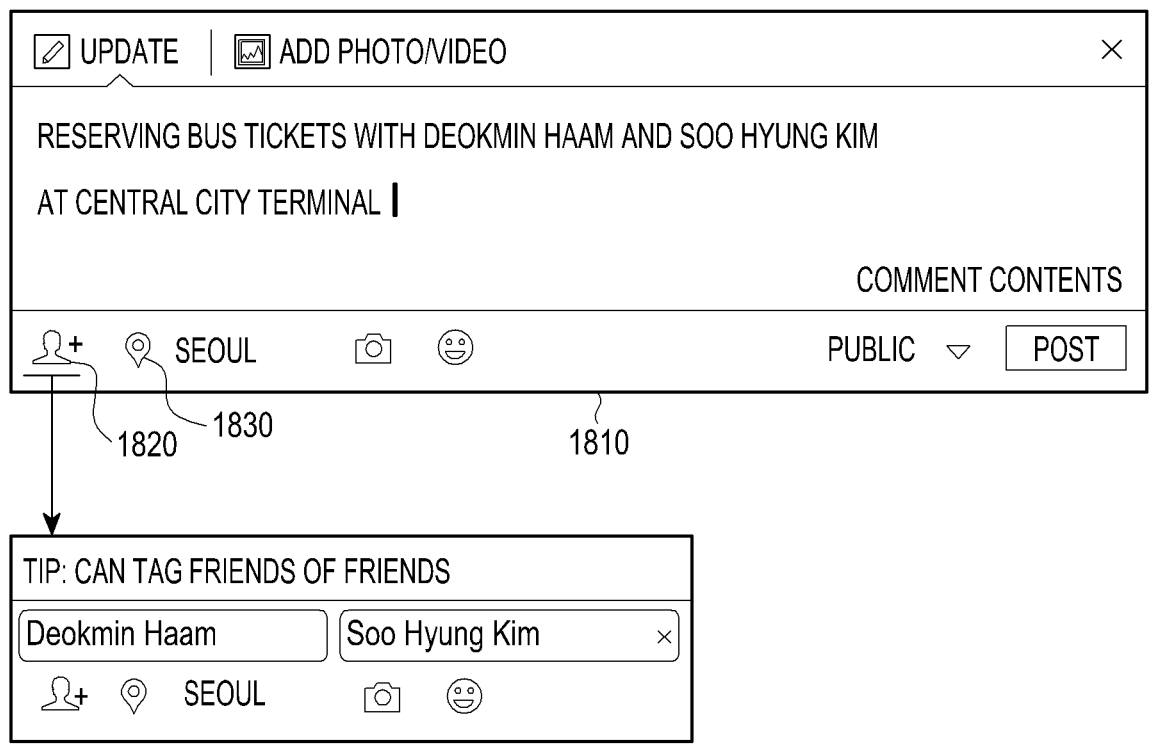
Figure 18B:
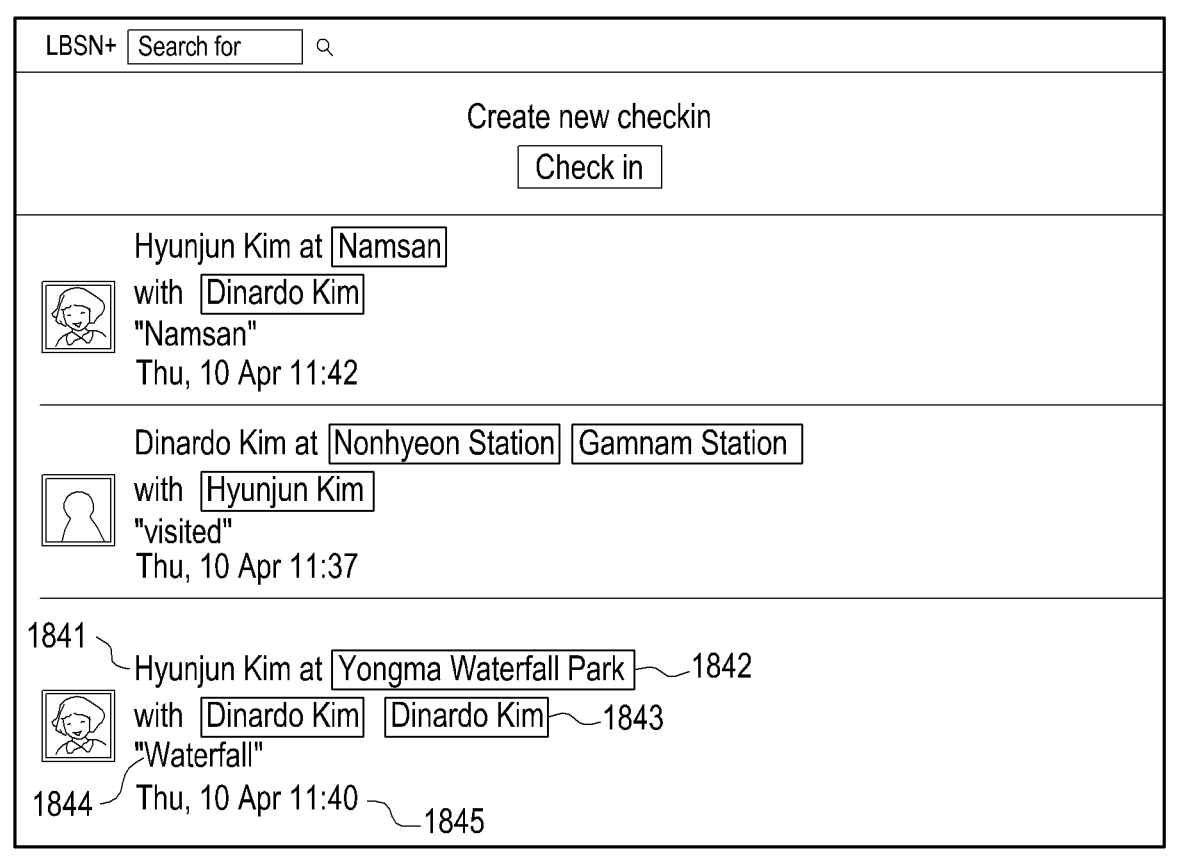
Figure 18C:
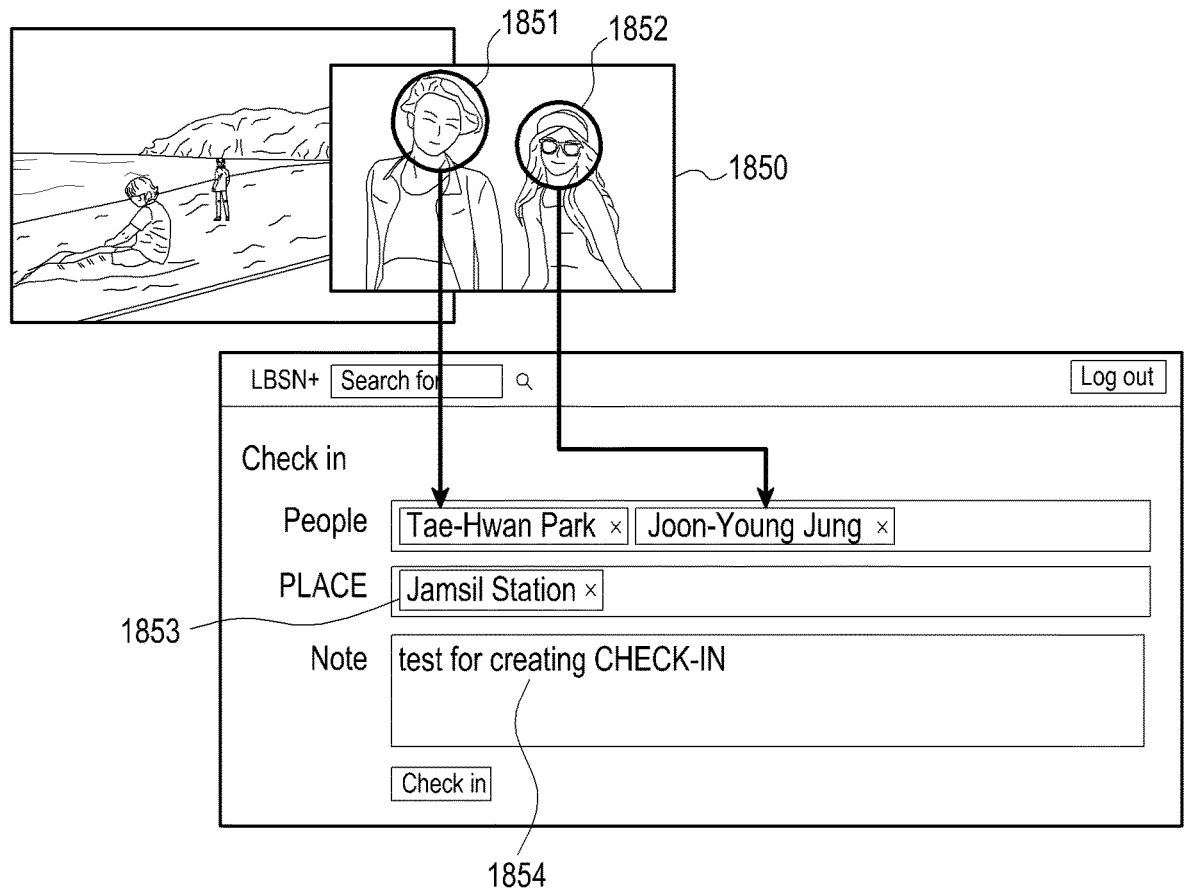

FIGS. 18A to 18C illustrate interface screens for storing data in a server according to an embodiment.

FIG. 18A illustrates an interface screen on which messages used for generating check-in data are displayed. As illustrated in FIG. 18A, the server 800 may store data in a graph database based on a message 1810 written by the user. In order to store the data in the graph database, the interface for writing the message 1810 may provide an interface for inputting relevant information. For example, as illustrated in FIG. 18A, when writing the message 1810, the user may input information on another person involved in the message 1810 through a person icon 1820 and input information on a place involved in the message 1810 through a place icon 1830. The server 800 may set a "visited" relationship for the information on the other person involved in the message 1810 and the place information and store the information involved in the message 1810 in the graph database.

FIG. 18B illustrates an interface screen for generating check-in. As illustrated in FIG. 18B, through the interface for generating the check-in, the user may identify a recently written check-in of the user or a check-in of other people having a friend relationship with the user. More specifically, the check-in may include information 1841 on a writer, information 1842 on a visited place, information 1843 on people who have visited a place along with the user, comment contents 1844, and information 1845 on a visiting time.

FIG. 18C illustrates a screen for generating check-in through an interface for generating the check-in. The user may generate check-in while uploading a travel photo 1850. For example, the user may input information 1851 and 1852 on people included in the travel photo 1850, input a place 1853 corresponding to a background of the travel photo 1850, and input comments 1854 for the travel photo 1850. Based on the input information, the server 800 may set a "visited" relationship for the information 1851 and 1852 on the people and the place information 1853 and store the information in the graph database.

As described above, the server 800 may set a relationship for information input into a social network service used by the user and store the input information in the graph database.

Figure 19:
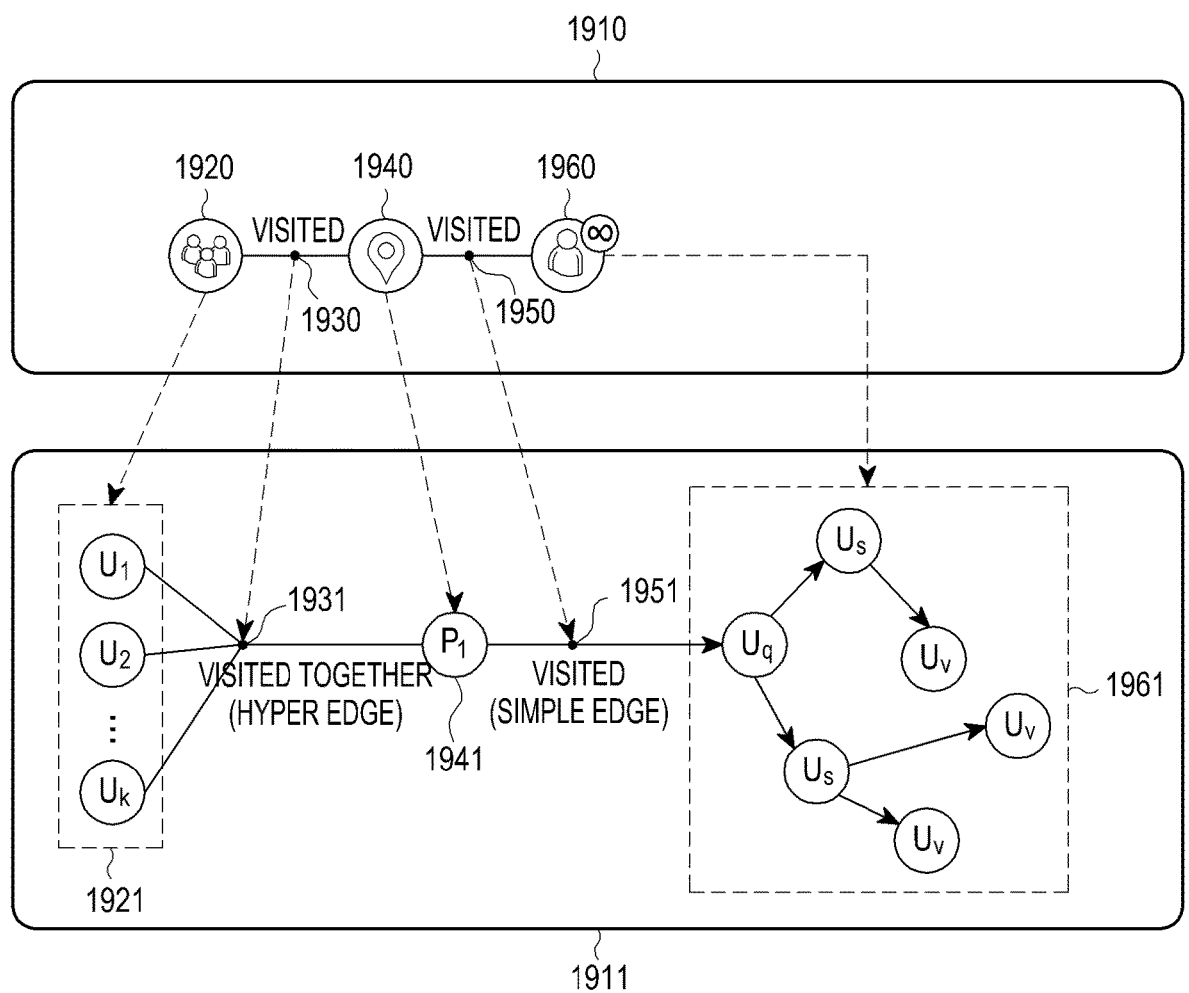
FIG. 19 illustrates a corresponding relationship between a first relationship structure and a second relationship structure according to an embodiment.

FIG. 19 illustrates a corresponding relationship between the first relationship structure and the second relationship structure according to an embodiment.

FIG. 19 illustrates a relationship between a first relationship structure 1910 made based on a user's input and a second relationship structure 1911 corresponding to a type of a relationship structure processed in the graph database.

The first relationship structure 1910 may include a group object-type person object 1920, a simple object-type place type 1940, and a chaining object-type person object 1960. The group object-type person object 1920 and the simple object-type place object 1940 may be connected through a "visited" relationship 1930, and the simple object-type place object 1940 and the chaining object-type person object 1960 may be connected through a "visited" relationship 1950.

The group object-type person object 1920 may match a plurality of person nodes 1921 in a parallel relationship and the simple object-type place object 1940 may match a single place node 1941. Further, the chaining object-type person object 1960 may match a sub graph including a person node (Uq) connected to the simple place node 1941 through the "visited" relationship 1950 and person nodes (Us and Uv) reached by repeatedly applying the "friend" relationship corresponding to the chaining relationship. The person nodes (Uq, Us, and Uv) may have a serial relationship.

Further, the "visited" relationship 1930 may match the hyper edge having a plurality of person nodes 1921 in a parallel relationship as start nodes and having the simple place node 1941 as a destination node. The "visited" relationship 1950 may be connected by the simple edge having the simple place node 1941 as the start node and the person node (Uq) as the destination node.

As described above, at least one corresponding node may be determined according to the type of each object included in the first relationship structure 1910. Further, when the object type of at least one of the first object and the second object is the group object type, the first object and the second object may be connected through the hyper edge. A corresponding relation between the object and the relationship included in the first relationship structure and the node, the edge, and the hyper edge included in the second relationship structure is as shown in Table 1.

TABLE 1

| First relationship structure | Second relationship structure |
| --- | --- |
| Simple object | Single node |
| Relationship between single objects | Simple edge |
| Group object | Plurality of nodes in parallel relationship |
| Relationship of connection with one or more group objects | Hyper edge |
| Chaining object | Plurality of nodes in serial relationship (sub graph) |

Figure 20A:
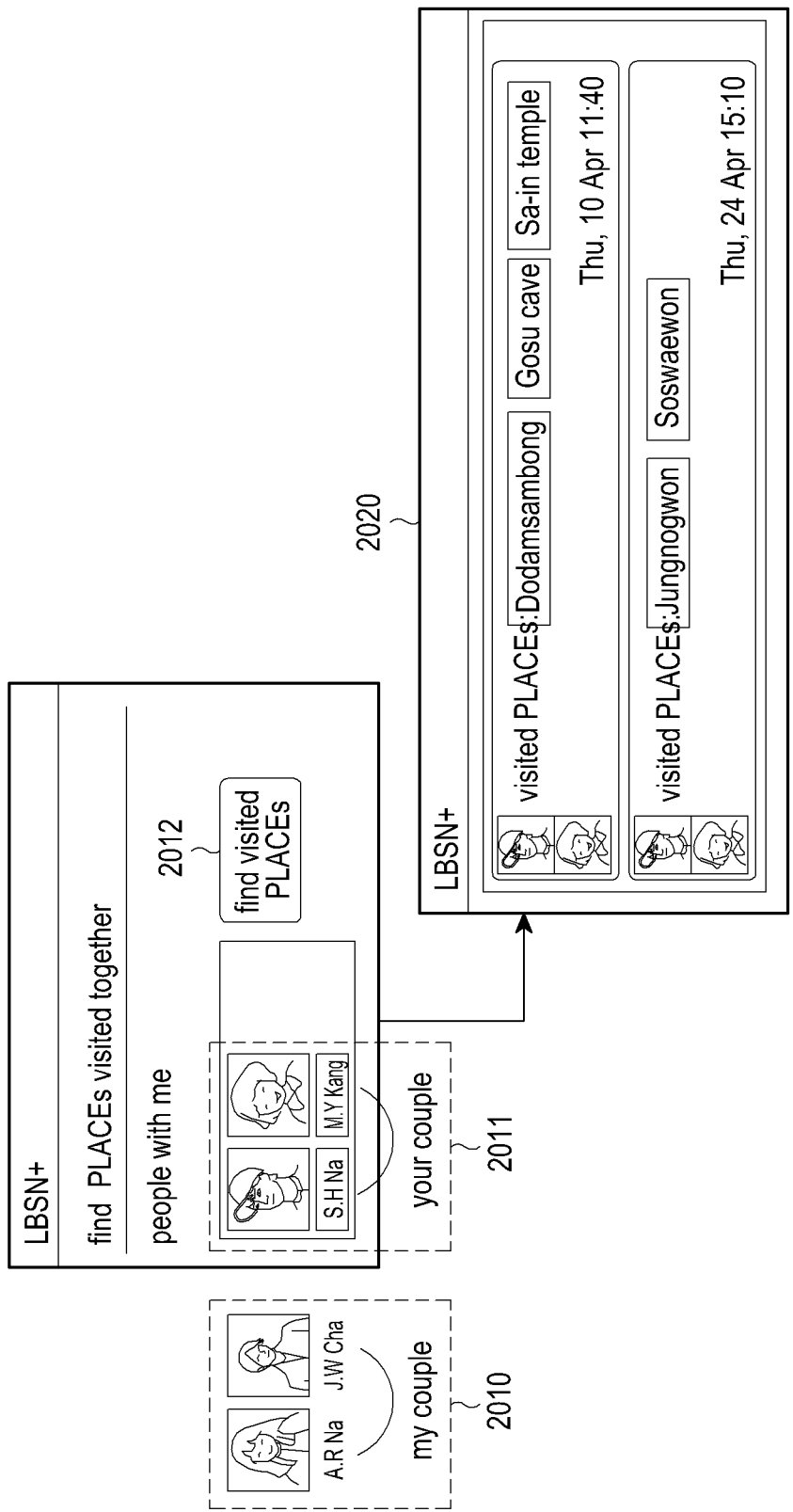
FIGS. 20A and 20B illustrate screens that display a query result according to an embodiment.
Figure 20B:
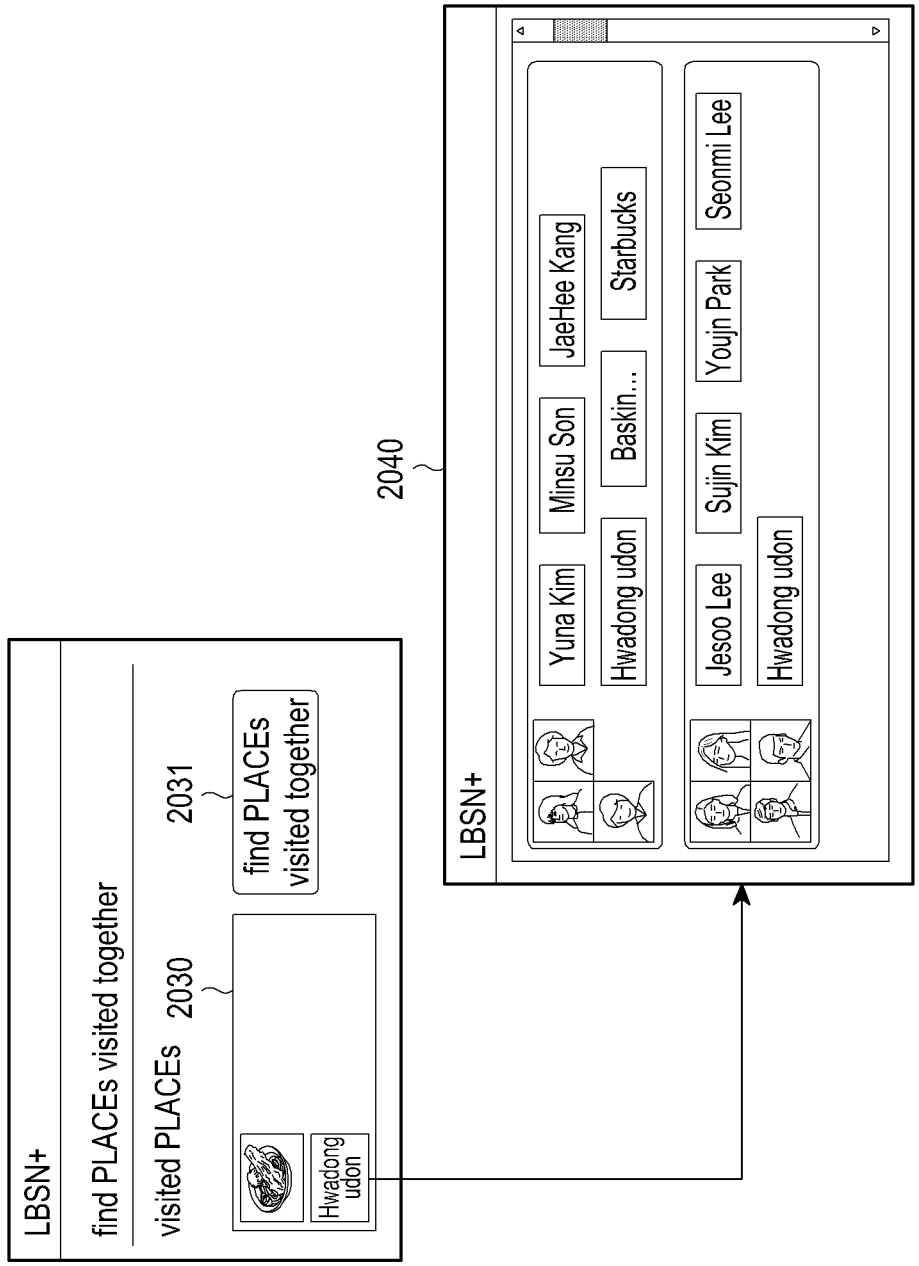

FIGS. 20A and 20B illustrate screens that display a query result according to an embodiment.

The electronic device 101 may acquire a query result that matches the query from the server 800 and display the query result as illustrated in FIGS. 20A and 20B.

FIG. 20A illustrates a query result 2020 that matches a query for a place object 2012 connected to a first person object 2010 of a group object type and a second person object 2011 of a group object type through a "visited" relationship. The electronic device 101 may acquire the query result 2020 that matches the query from the server 800 and display the query result 2020. The query result 2020 may include information on a place which the first person object 2010 and the second person object 2011 have "visited" together.

FIG. 20B illustrates a query result 2040 that matches a query for a person object 2031 of a group object type connected to a place object 2030 of a simple object type through a "visited" relationship. The electronic device 101 may acquire the query result 2040 that matches a second query from the server 800 and display the query result 2040. The query result 2040 may include information on a plurality of people who have "visited" the place object 2030 together.

Figure 21:
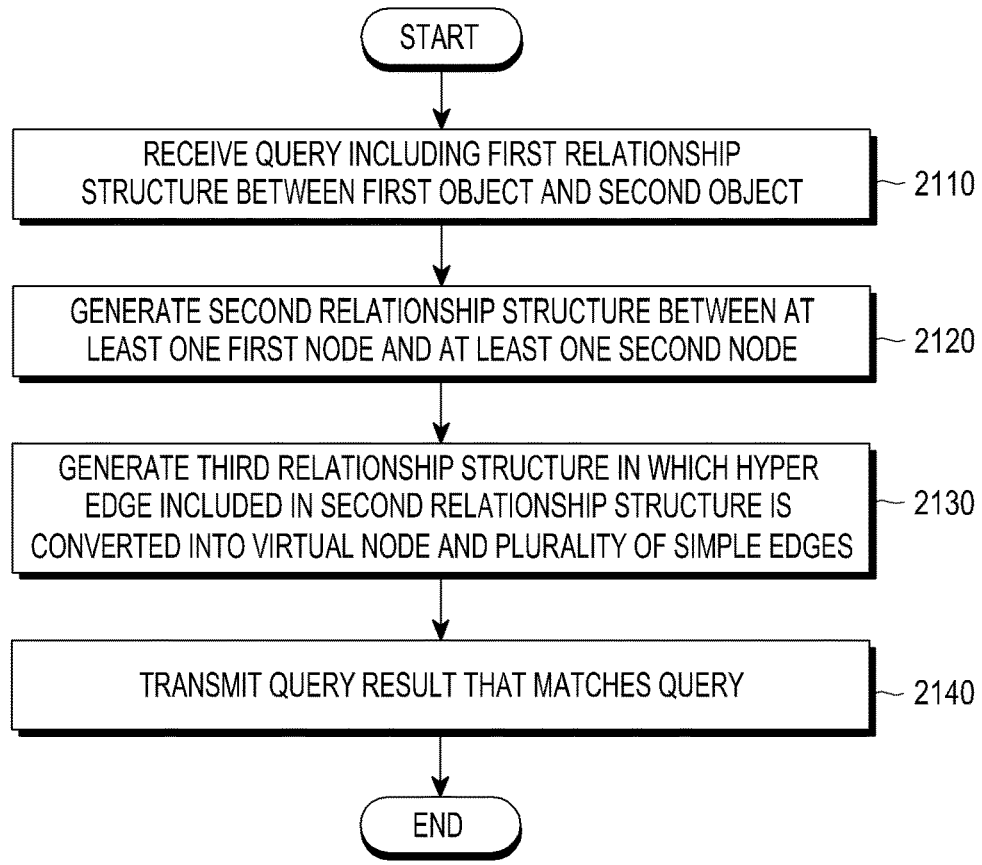
FIG. 21 is a flowchart illustrating an operation method of a server according to various embodiments of the present invention.

FIG. 21 is a flowchart illustrating an operation method of the server according to various embodiments of the present invention.

In process 2110, the server 800 may receive a query including a first relationship structure between a first object and a second object. At least one of the first object and the second object may correspond to a plurality of nodes in a parallel relationship. When a process of converting the first relationship structure into a second relationship structure is performed by the server 800, the server 800 may receive the query including the first relationship structure. In contrast, when the process of converting the first relationship structure into a second relationship structure is performed by the electronic device 101, the server 800 may receive a query including the second relationship structure and may not perform process 2120.

In process 2120, the server 800 may generate the second relationship structure between at least one first node corresponding to the first object and at least one second node corresponding to the second object, the second relationship structure corresponding to the first relationship structure. The second relationship structure may correspond to the type of the relationship structure processed in the graph database.

In process 2130, the server 800 may generate a third relationship structure in which the hyper edge included in the second relationship structure is converted into a virtual node and a plurality of simple edges. When the graph database does not support the hyper edge, a process of modeling the hyper graph may be needed.

In process 2140, the server 800 may transmit a query result that matches the query to the electronic device 101 based on the third relationship structure. The server 800 may transmit the query result to the electronic device 101 by using a graph within the graph database that matches the third relationship structure.

Figure 22:
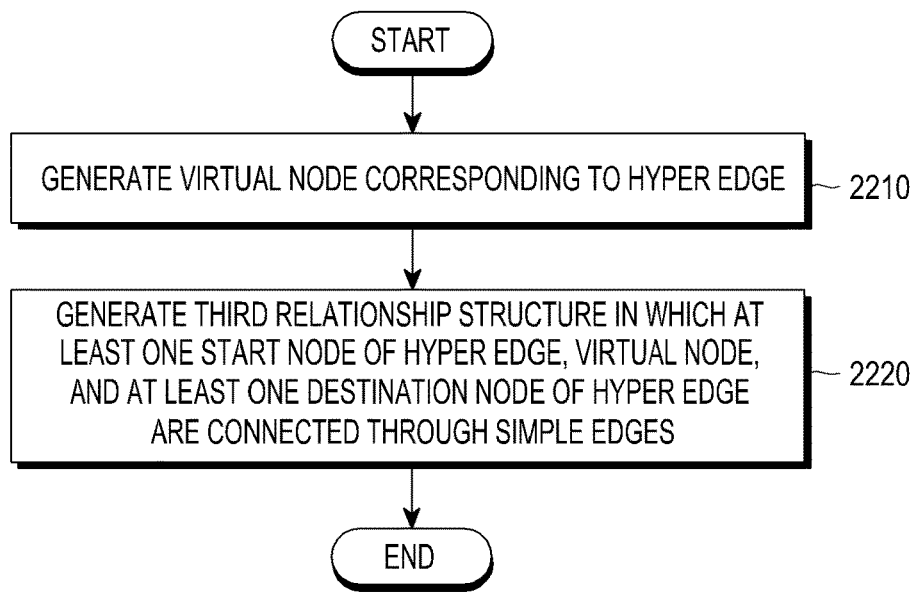
FIG. 22 is a flowchart illustrating a method by which a server generates a third relationship structure including a virtual node according to an embodiment.

FIG. 22 is a flowchart illustrating a method by which the server generates the third relationship structure including the virtual node according to an embodiment.

In process 2210, the server 800 may generate a virtual node corresponding to the hyper edge included in the second relationship structure. When the graph database does not support the relationship structure including the hyper edge, the relationship structure may be converted into a simple edge-based relationship structure to process the relationship structure in the graph database. In order to convert the relationship structure into the simple edge-based relationship structure, the virtual node corresponding to the hyper edge may be generated.

In process 2220, the server 800 may generate the third relationship structure in which at least one start node of the hyper edge, the virtual node, and at least one destination node of the hyper edge are connected through simple edges. The query may be processed in the simple edge-based graph database based on the generated third relationship structure.

FIGS. 23A and 23B illustrate a method by which the server converts the hyper edge according to an embodiment.

FIG. 23A illustrates the second relationship structure including the hyper edge and FIG. 23B illustrates the third relationship structure including the virtual node corresponding to the hyper edge.

In the process of converting the second relationship structure into the third relationship structure, the server 800 may generate virtual nodes H1, H2, and H3 corresponding to hyper edges h1, h2, and h3 included in the second relationship structure. Further, the server 800 may connect start nodes of the hyper edges h1, h2, and h3, the virtual nodes H1, H2, and H3, and destination nodes of the hyper edges h1, h2, and h3 through a plurality of simple edges. In this process, the number of start nodes and the number of destination nodes of the hyper edges h1, h2, and h3 may be converted into an indegree and an outdegree corresponding to attributes of the virtual nodes. Accordingly, the second relationship structure can be converted into the simple edge-based third relationship structure without a loss of information included in the second relationship structure.

FIG. 24 illustrates a part of a schema of the graph database designed using a hyper edge modeling method according to an embodiment.

FIG. 24 illustrates a part of a schema of the graph database designed using a hyper edge modeling method according to the generation of the check-in data illustrated in FIGS. 18A to 18C.

A check-in node 2430 indicating check-in may be modeled to the virtual node, and a user node 2410 and a place node 2420 may be modeled to simple nodes. FIG. 24 may indicate that a plurality of user nodes 2410 are connected to a check-in node 2430 through a "tagged_at" edge and thus a user group has visited together. Further, a plurality of place nodes 2420 are connected to the check-in node 2430 through a "located_at" edge and thus a place group visited with the same intention may be indicated. For efficiency of query processing, a "tag" edge and a "marked by" edge which are edges in an opposite direction of the "tagged_at" edge and the "located_at" edge may be added to the schema of FIG. 24.

Figure 25:
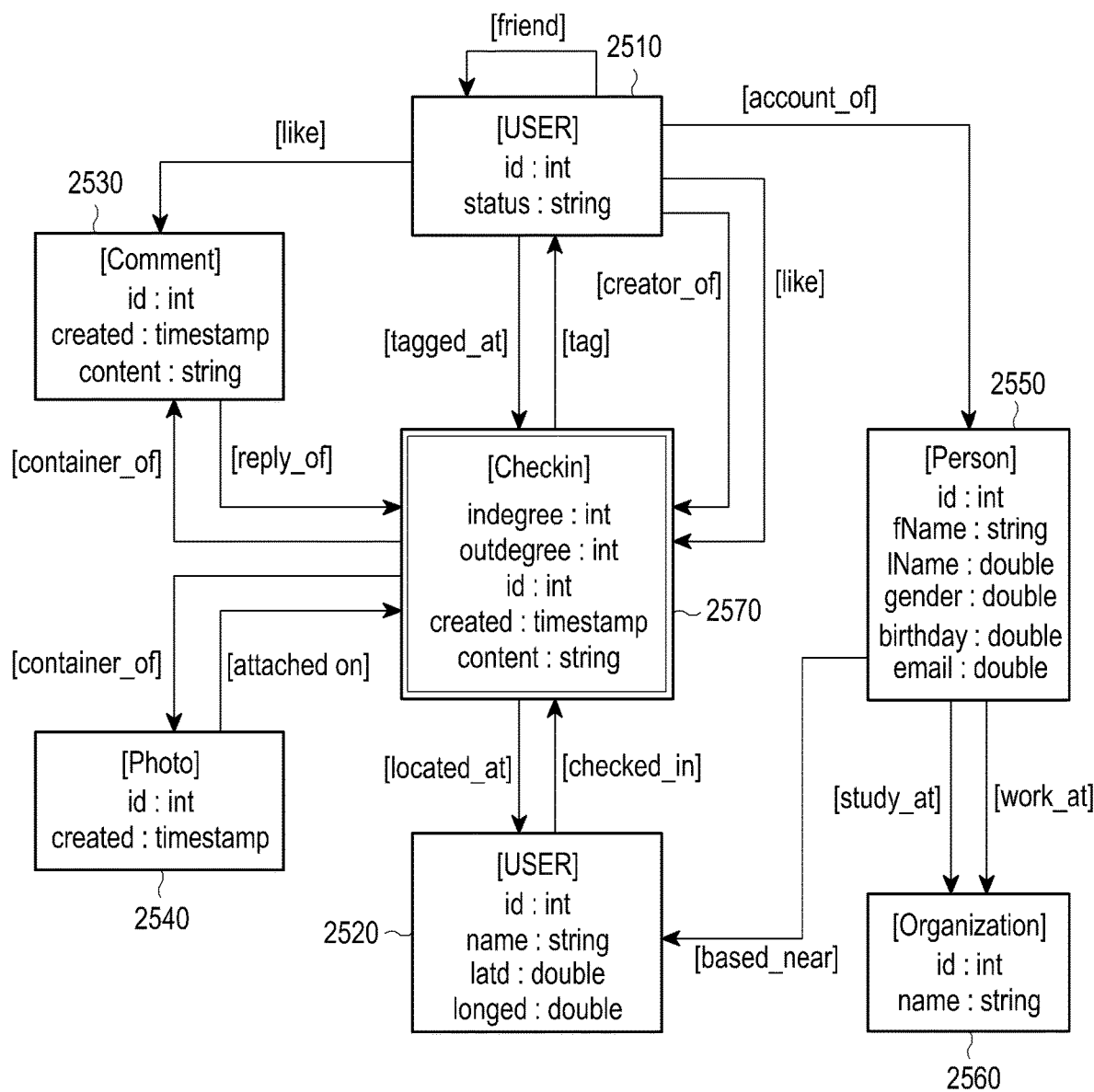
FIG. 25 illustrates a schema of a graph database designed using a hyper edge modeling method according to an embodiment.

FIG. 25 illustrates a schema of a graph database designed using a hyper edge modeling method according to an embodiment.

FIG. 25 illustrates a total schema of the graph database designed using the hyper edge modeling method according to an embodiment. Since an implementation environment is the database, the schema may also be designed through the node and the edge in a graph form. A user node 2510, a place node 2520, a comment node 2530, a photo node 2540, a user information node 2550, and an organization node 2560 may be modeled to simple nodes, and a check-in node 2570 may be modeled to a virtual node. Further, an edge indicating a relationship between nodes may be set in consideration of a type or attribute of each node. Nodes and edges included in the schema illustrated in FIG. 25 may be defined as shown in Table 2.

TABLE 2

| Type | Name | Description |
| --- | --- | --- |
| Node | User | Node indicating user |
| | Checkin | Hyper node indicating visitation records Generated when visitation records are made |
| | Place | Node indicating place |
| | Comment | Node indicating comment for visitation records Generated when comment is written |
| | Person | Node indicating personal information of user |
| | Organization | Node indicating organization such as company or school |
| | Photo | Node indicating photo attached to visitation records |
| Edge | friend | Edge indicating friend relationship between users |
| | tag | Edge indicating user listed in check-in |
| | tagged_at | Edge indicating check-in including user |
| | creator_of | Edge indicating writer of check-in |
| | like | Designate target of check-in/comment which user likes |
| | located_at | Edge indicating place where check-in is performed |
| | checked_in | Edge indicating check-in where corresponding place is mentioned |
| | reply_of | Edge indicating check-in for which comment is made |
| | container_of | Edge indicating attached photo |
| | attached_on | Edge indicating check-in for photo |

The total schema of the graph database is an example for the purpose of the description, and the present invention is not limited thereto. The schema may be differently designed according to a content or attribute of the data stored in the graph database.

FIGS. 26A, 26B, 27A, 27B, 27C, 27D, 28A, 28B, 28C and 28D illustrate a query processing process according to a comparative example.

Hereinafter, a query processing process using the hyper edge will be described. For the description, queries using the hyper edge are divided as shown in Table 3 and a method of processing each query will be described.

TABLE 3

| | | | Returned result | |
| --- | --- | --- | --- | --- |
| | | Query option | Place group | User group |
| Query condition | User group | Exact | Query 1 | — |
| | | Superset | Query 2 | — |
| | Place group | Exact | — | Query 3 |
| | | Superset | — | Query 4 |

In Table 3, the query option designates a relationship between start nodes of the hyper edge and a query condition. In a case of an Exact option, a hyper edge having the same set condition as a start node set is found. In a case of a Superset option, a hyper edge having a condition of a start node set which corresponds to a superset option. Query 1 and query 2 in Table 3 indicate queries for finding visited places based on a condition of a user, and query 3 and query 4 indicate queries for finding users who have visited based on a condition of a place.

Figure 26A:
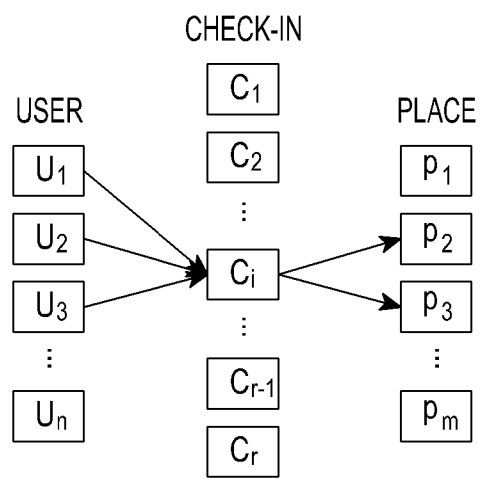
FIGS. 26A, 26B, 27A, 27B, 27C, 27D, 28A, 28B, 28C and 28D illustrate a query processing process according to a comparative example.

According to a comparative example, in order to process query 1 and query 2, the query processing may be performed by a method of finding check-in connected to all user groups and then finding and returning places connected to the check-in as illustrated in FIG. 26A.

Figure 26B:
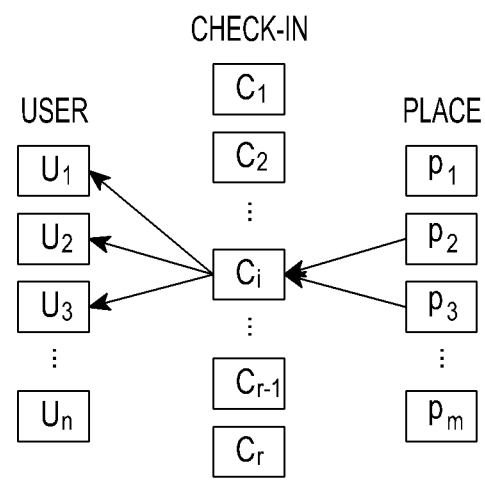

In contrast, in order to process query 3 and query 4, the query processing may be performed by a method of finding a check-in connected to all place groups and then finding and returning users connected to the check-in as illustrated in FIG. 26B.

As described above, the query processing process according to a comparative example may include a process of finding check-ins connected to entities of the group input as the query condition, a process of performing an intersection operation for a check-in set acquired according to each entity, a process of filtering check-ins corresponding to a result of the intersection operation according to the query option, and a process of returning entities connected to the filtered check-in.

The process of performing the filtering may include a process of comparing a size of the group (the number of entities of the group) input as the query condition according to the query option with an indegree and an outdegree of the check-in node.

For example, when the query condition corresponds to the user group and the query option corresponds to Exact, filtering is performed to remove nodes having an indegree of the check-in node which is not the same as the size of the group input as the query condition. When the query condition corresponds to the place group and the query option is Exact, filtering is performed to remove nodes having an outdegree of the check-in node which is not the same as the size of the group input as the query condition.

Figure 27B:
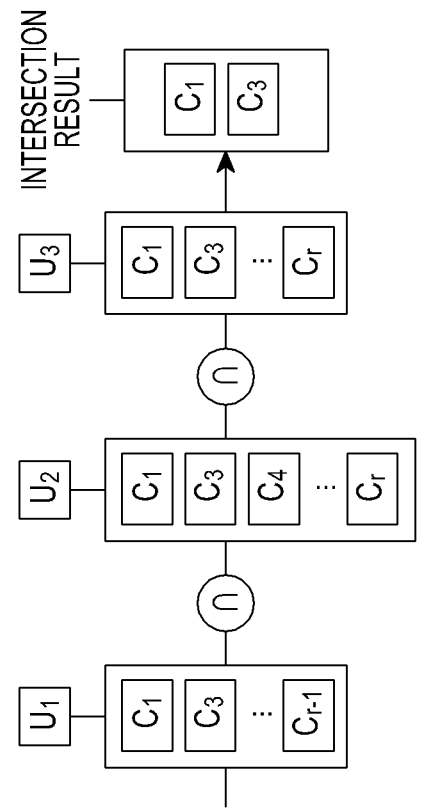
Figure 27A:
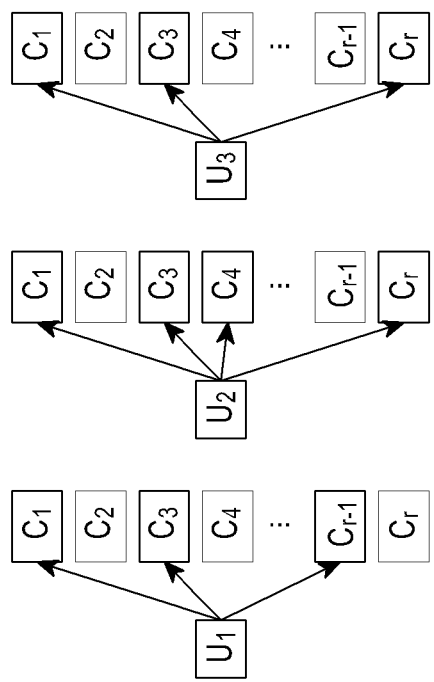
Figure 27D:
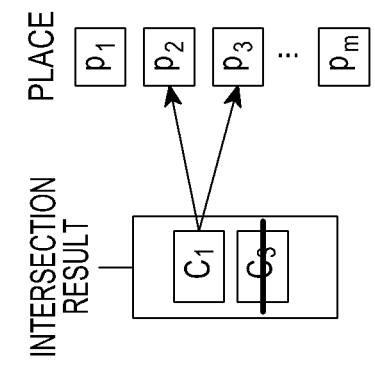
Figure 27C:
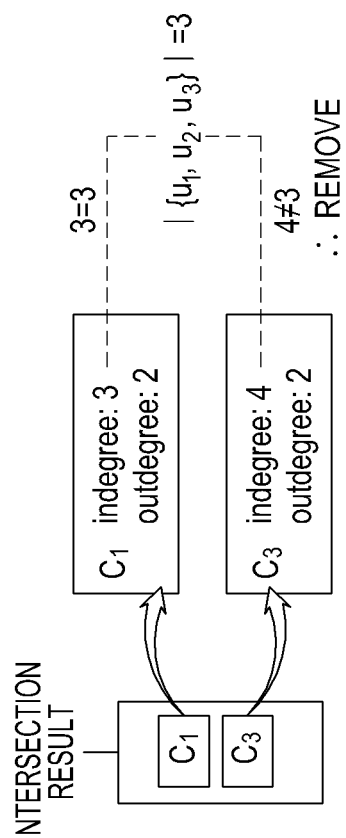

FIGS. 27A to 27D illustrate a process of processing query 1, wherein a query for a place group that users {u1, u2, u3} have visited together is made. FIG. 27A illustrates a process of finding connected check-ins according to each user {u1, u2, u3} input as the query condition, and FIG. 27B illustrates a process of performing an intersection operation for a check-in set acquired according to each user {u1, u2, u3}. FIG. 27C illustrates a process of filtering check-ins corresponding to a result of the intersection according to a query option, and FIG. 27D illustrates a process of returning entities connected to the filtered check-in.

When query 2 is processed, a result may be returned without performing the filtering which occurred in FIG. 27C.

Figure 28B:
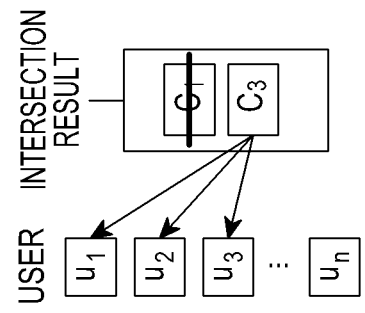
Figure 28D:
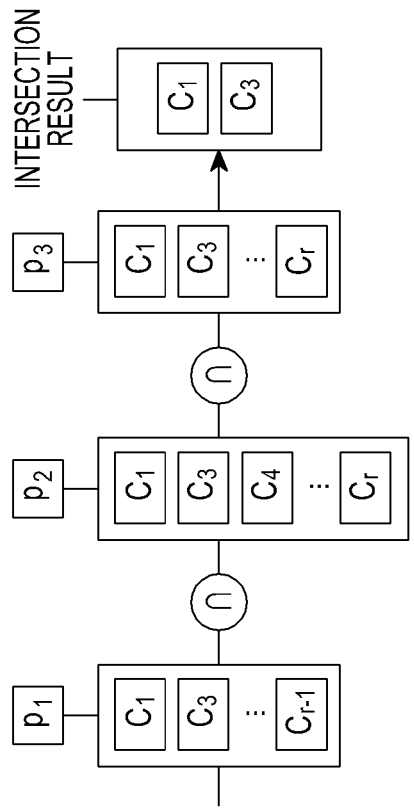
Figure 28A:
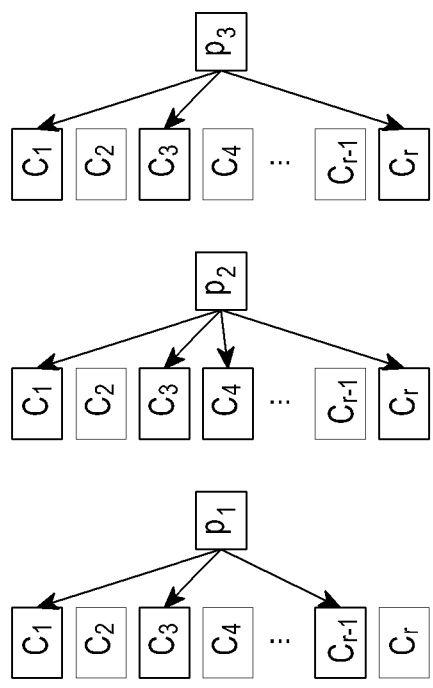
Figure 28C:
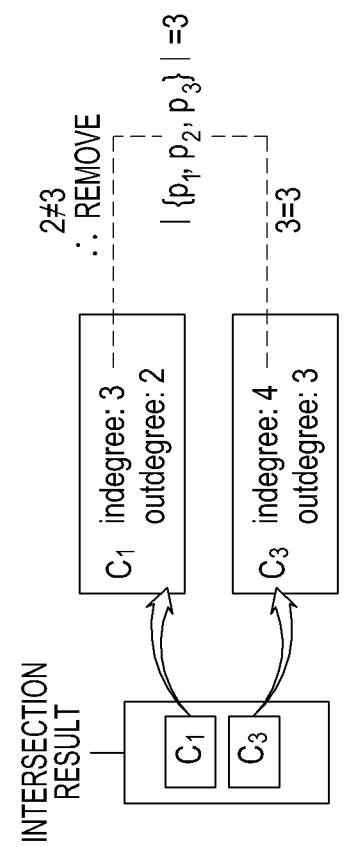

FIGS. 28A to 28D illustrate a processing process of query 3, wherein a query for a user group which has visited places {p1, p2, p3} together is made. FIG. 28A illustrates a process of finding check-ins connected according each of the places {p1, p2, p3} input as the query condition, and FIG. 28B illustrates a process of performing an intersection operation for a check-in set acquired according to each of the places {p1, p2, p3}. FIG. 28C illustrates a process of filtering check-ins corresponding to a result of the intersection according to a query option, and FIG. 28D illustrates a process of returning entities connected to the filtered check-in.

When query 4 is processed, a result may be returned without performing the filtering which occurred in FIG. 28C.

The query processing process according to the comparative example described in FIGS. 26A to 28D may increase a query processing cost as the number of check-ins generated according to each user increases. Since the number of check-ins generated according to each user increases in proportion to a service use time, an efficient query processing method may be required.

Figure 29A:
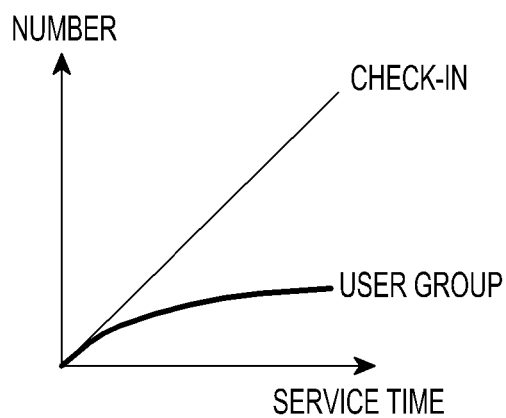
FIGS. 29A and 29B illustrate graphs for comparing check-in with a user group and a place group according to an embodiment.
Figure 29B:
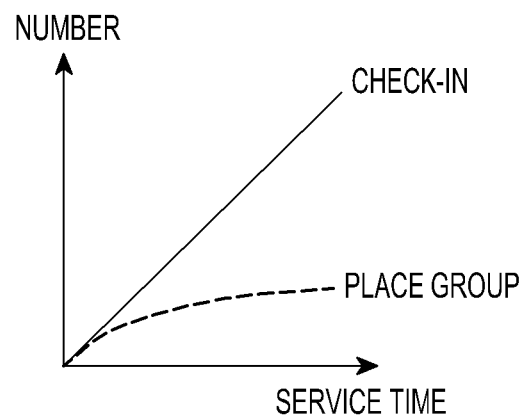

FIGS. 29A and 29B illustrate graphs for comparing check-in with a user group and a place group according to an embodiment.

If people who visit a place along with the user who generates a check-in are referred to as a user group when the check-in is generated, the number of different user groups may be smaller than the number of check-ins in consideration of the fact that the user frequently visits the same place or the user is together with the same people in daily life. Similarly, the number of different place groups may be smaller than the number of check-ins.

FIG. 29A is a graph illustrating the number of check-ins and the number of different user groups that increase as a service time increases, and FIG. 29B is a graph illustrating the number of check-ins and the number of different user groups that increases as a service time increases. When users or places are managed as a group as illustrated in FIGS. 29A and 29B, the number of user groups or the number of place groups may be smaller than the number of increasing check-ins.

Figure 30A:
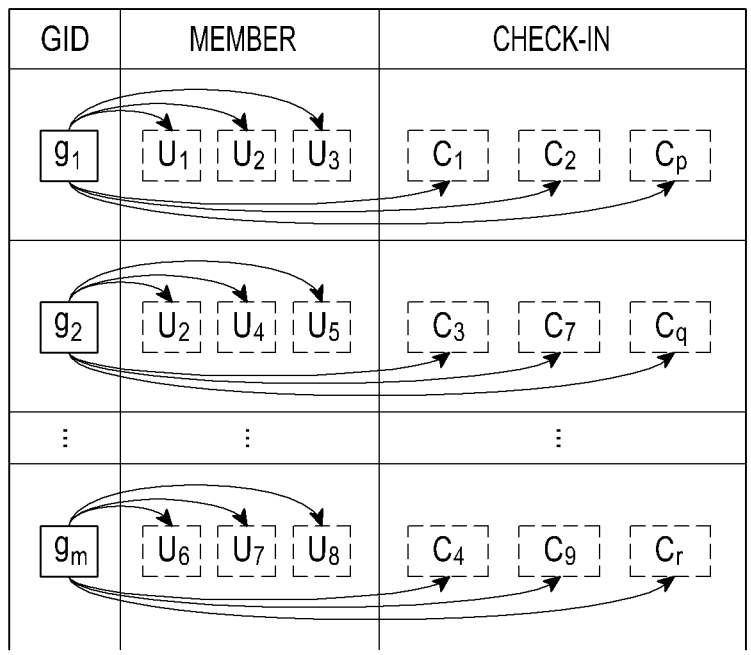
FIGS. 30A and 30B illustrate indexes set to user groups for query processing according to an embodiment.
Figure 30B:
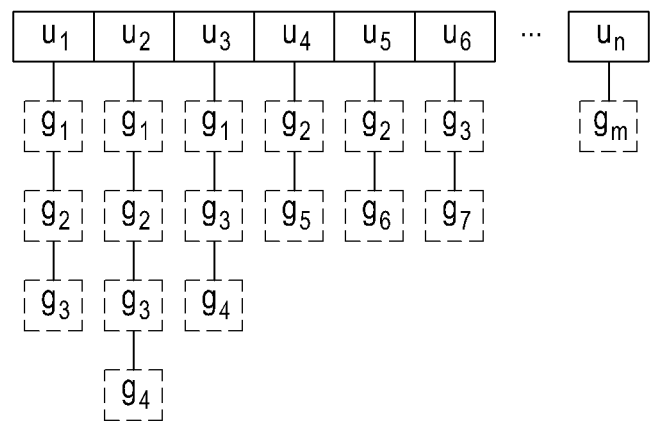

FIGS. 30A and 30B illustrate indexes set to user groups for query processing according to an embodiment.

Based on the description of FIGS. 29A and 29B, efficient query processing can be performed by forming each node as a group and managing the formed group. A query processing method according to an embodiment may manage check-ins generated by a corresponding group according to each of the formed groups and grasp the group to which a query condition belongs in a query processing process, so as to return relevant check-ins.

FIGS. 30A and 30B illustrate two types of indexes for managing user groups g1, g2, . . . , and gm in a query processing method according to an embodiment. FIG. 30A illustrates a first index for a user group to find check-ins generated according to each user group. A user group node includes information on group members u1, u2, . . . , and u8 and edges indicating check-ins c1, c2, . . . , and cr generated by the user group.

FIG. 30B illustrates a second index for a user group to find a user group to which the user belongs. FIG. 30B may include edges indicating user groups to which respective users belong.

Figure 31A:
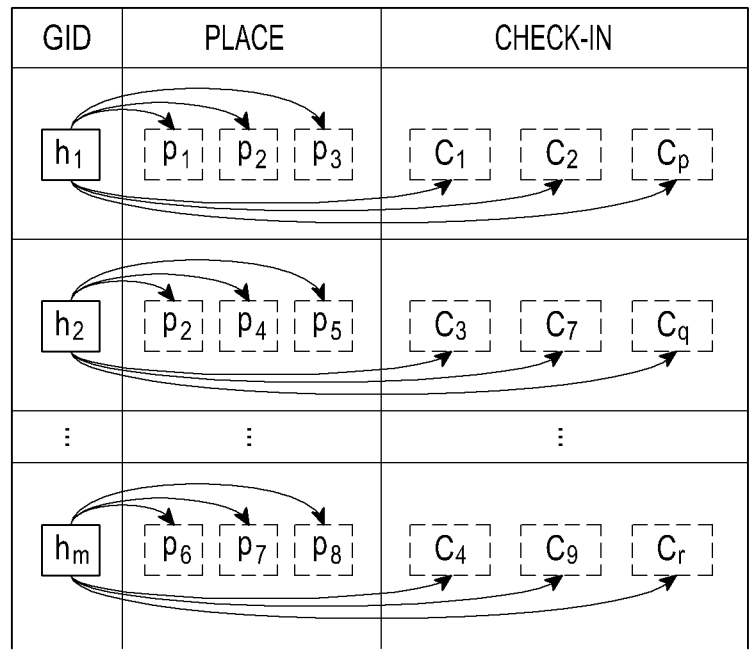
FIGS. 31A and 31B illustrate indexes set to place groups for query processing according to an embodiment.
Figure 31B:
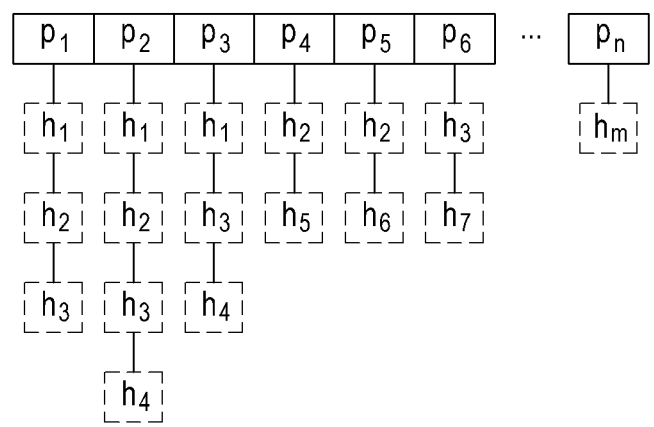

FIGS. 31A and 31B illustrate indexes set to place groups for query processing according to an embodiment.

FIG. 31A illustrates a first index for a place group to find check-ins generated by visiting a corresponding place group according to each place group h1, h2, . . . , or hm. A place group node may include information on places p1, p2, . . . , and p8 included in the groups and edges indicating check-ins c1, c2, . . . , and cr generated in the place group nodes.

FIG. 31B illustrates a second index for a place group to find a place group to which each place belongs. Edges indicating place groups to which respective places belong may be maintained.

FIGS. 32A, 32B, 32C, 32D, 33A, 33B, 33C and 33D illustrate a query processing process according to an embodiment.

The query processing process using the indexes described in FIGS. 31A and 31B according to an embodiment may include a process of acquiring user group nodes (place group nodes) to which respective group members (places) input as a query condition belong through the second index for the user groups (second index for the place groups), a process of performing an intersection operation for the group nodes acquired according to each group member (place), a process of performing filtering according to a query option based on the first index for the user group node (place group node) acquired as an intersection result, and a process of returning the place node (user node) connected to filtered check-in.

The process of performing the filtering may include a process of comparing the query options and the number of group members. When the query option corresponds to Exact, filtering may be performed to remove nodes having the number of group members of the first index for each group that is not the same as the size of the group input as the query condition.

Figure 32A:
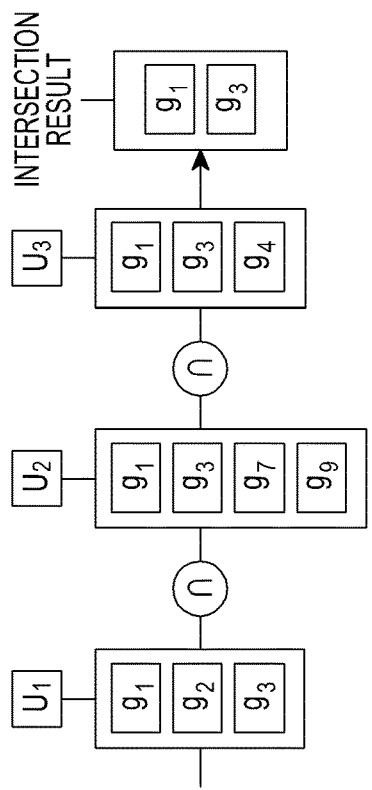
FIGS. 32A, 32B, 32C, 32D, 33A, 33B, 33C and 33D illustrate a query processing process according to an embodiment.
Figure 32B:
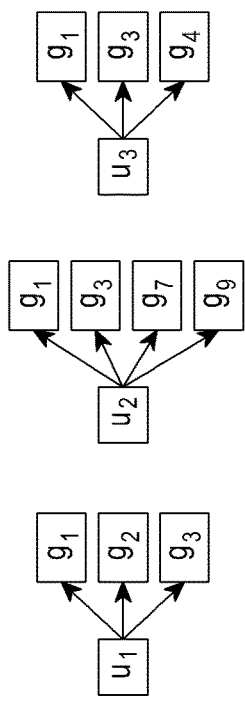
Figure 32C:
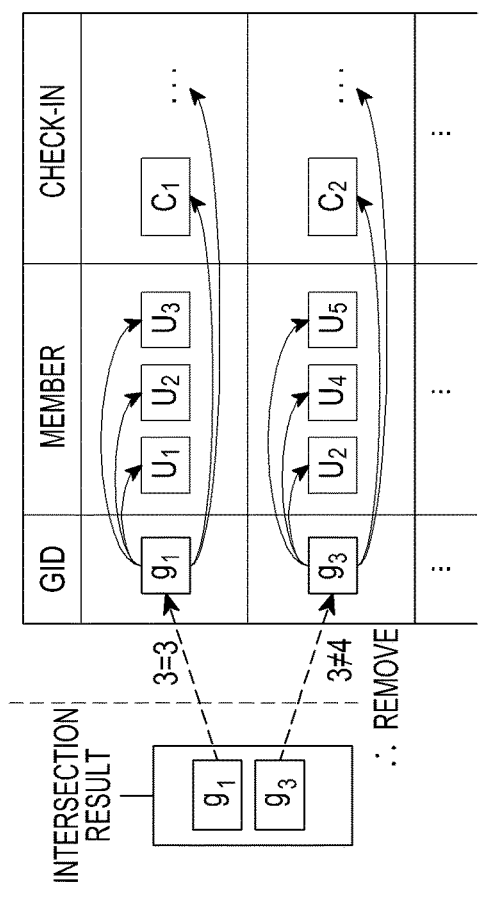
Figure 32D:
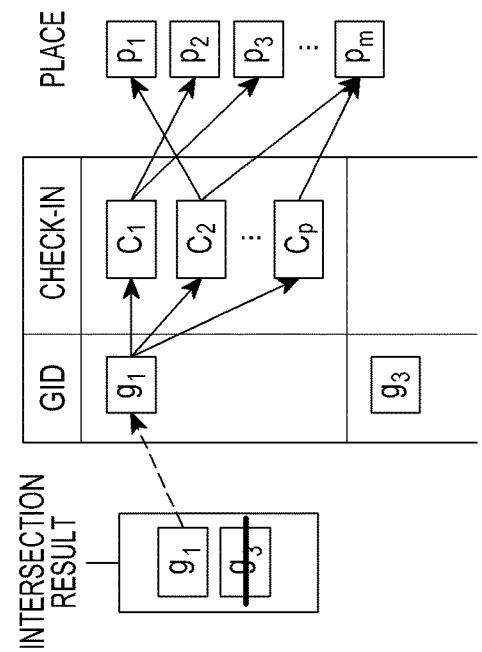

FIGS. 32A to 32D illustrate a processing process of query 1, wherein a query for a place group that users {u1, u2, u3} have visited together is made. FIG. 32A illustrates a process of acquiring user group nodes to which respective users {u1, u2, u3} belong input as the query condition through the second index for the user groups. FIG. 32B illustrates a process of performing an intersection operation for user group nodes to which respective users {u1, u2, u3} belong. FIG. 32C illustrates a process of performing filtering according to the query option based on the first index for the user group node acquired as the intersection result. FIG. 32D illustrates a process of returning a place node connected to filtered check-in.

In the processing of query 2, the result may be returned without the filtering performed in FIG. 32C.

Figure 33A:
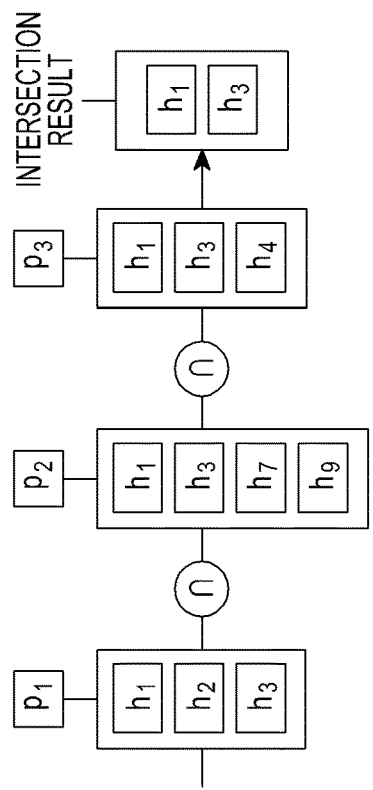
Figure 33B:
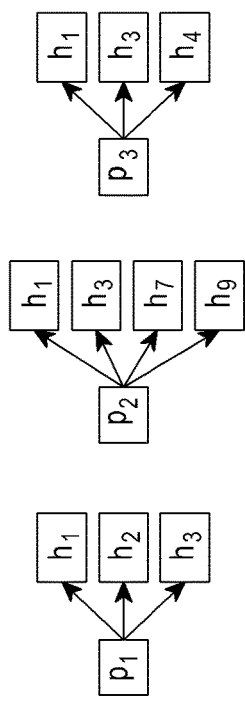
Figure 33C:
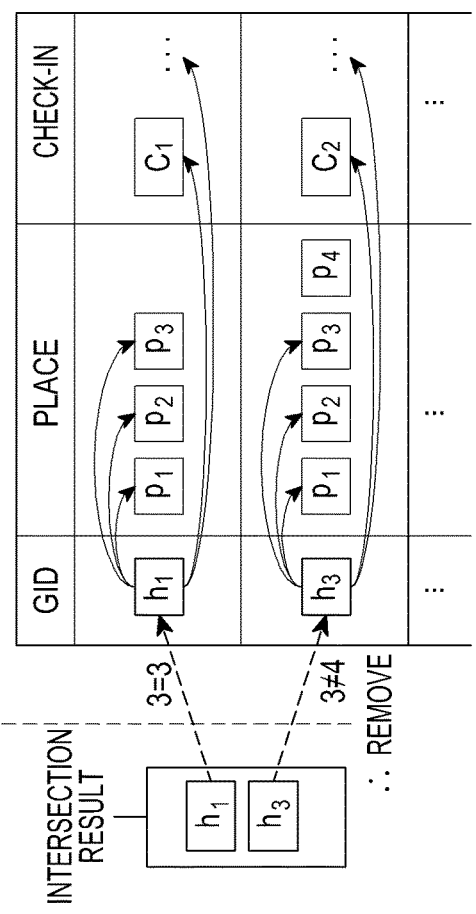
Figure 33D:
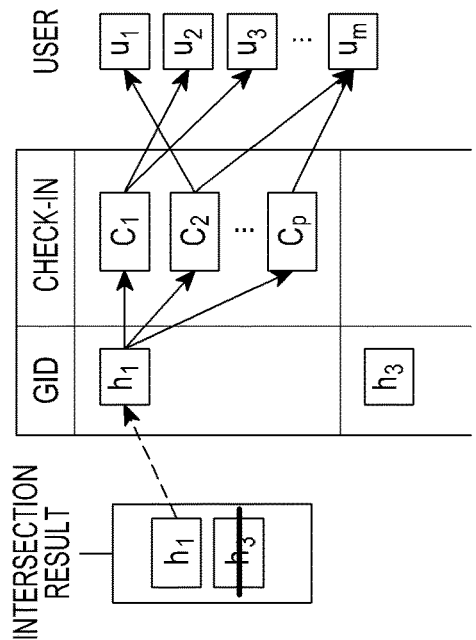

FIGS. 33A to 33D illustrate a processing process of query 3, wherein a query for a user group who have visited places {p1, p2, p3} together is made. FIG. 33A illustrates a process of acquiring place group nodes to which respective places {p1, p2, p3} input as the query condition belong through the second index for the place groups. FIG. 33B illustrates a process of performing an intersection operation for the place group nodes to which the respective places {p1, p2, p3} belong. FIG. 33C illustrates a process of performing filtering according to the query option based on the first index for the place group node acquired as an intersection result. FIG. 33D illustrates a process of returning the user node connected to filtered check-ins.

In the processing of query 4, the result may be returned without performing the filtering which occurred in FIG. 33C.

FIGS. 34A, 34B, 34C, 35A, 35B, 35C, 36A, 36B, 36C, 36D, 36E, 37A, 37B, 37C, 37D and 37E illustrate a query processing process using a frequency pattern according to a comparative example.

According to an embodiment, query processing may be performed using a pattern indicating a frequency of a particular place which a particular user frequently visits or a pattern of places which the user visits after visiting the particular place. As described above, it is possible to offer convenience to the user by providing an analysis query for a frequently generated pattern. For example, a frequently generated frequency pattern may be classified as follows.

Query 1 may refer to a query for finding k places which a particular user frequently visits, query 2 may refer to a query for finding k users who visit a particular place, query 3 may refer to a query for finding k places which the particular user frequently visits next after visiting the particular place, and query 4 may refer to a query for finding k users who the particular user frequently hangs out with.

Additional information such as a query for finding another place, which the particular user who frequently visits the particular place frequently visits, may be acquired through queries 1 to 4.

In order to process query 1, all check-ins connected to a particular user may be found, and numbers of times the user has visited each place may be added up while places connected to each check-in are found. In order to process query 2, all check-ins connected to a particular place may be found, and then numbers of times each user has visited the particular place may be added up while users connected to each check-in are found. The processing processes of query 1 and query 2 may include a process of finding all check-ins connected to the particular user (particular place), a process of counting the number of visitations according to each place (each user) while finding places (users) connected to the check-ins, and a process of arranging the places (users) in an order of the number of visitations and then returning k places (users).

FIGS. 34A to 34C illustrate the processing process of query 1 and corresponds to a processing process of finding two places which user u1 frequently visits. FIG. 34A illustrates a process of finding all check-ins connected to user u1, FIG. 34B illustrates a process of counting the number of visitations according to each place while finding places connected to the check-ins, and FIG. 34C illustrates a process of arranging the places in an order of the number of visitations and then returning the top two places.

Figures 35A, 35B, 35C:
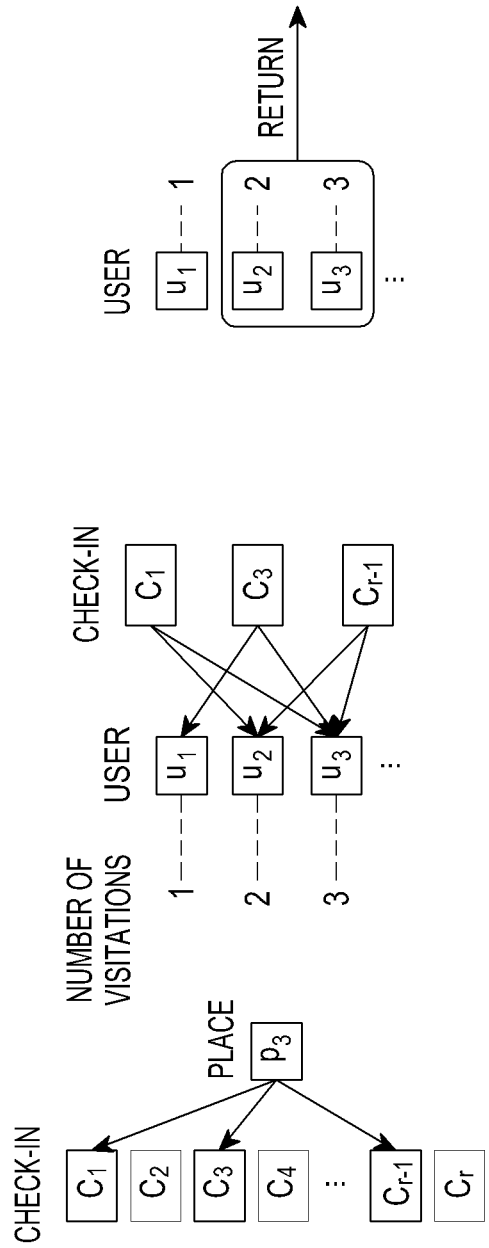

FIGS. 35A to 35C are an example of the processing process of query 2 and illustrates a processing process of finding two users who frequently visit place p3. FIG. 35A illustrates a process of finding all check-ins connected to place p3, FIG. 35B illustrates a process of counting the number of visitations according to each user while finding users connected to the check-ins, and FIG. 35C illustrates a process of arranging the users in an order of the number of visitations and then returning the top two users.

In the query processing result for query 1 and query 2 illustrated in FIGS. 34A to 34C and 35A to 35C, all check-ins connected to the particular user (place) should be acquired and places (users) connected to each check-in should be acquired. Further, the places (users) acquired through the process should be arranged in an order of the number of visitations.

In order to process query 3, check-ins connected to the particular place may be found, numbers of visitations according to each place may be added up while next-visited places connected to each check-in are found, and then frequently visited places after the particular place is visited may be found. The processing process of query 3 may include a process of finding all check-ins connected to particular place p, a process of, when an edge between check-in and place p is s, finding edge t generated after edge s according to each check-in, a process of counting the number of visitations to places connected to edge t, and a process of arranging the places in an order of the number of visitations and then returning the top k places.

FIGS. 36A to 36E are an example of the processing process of query 3 and illustrates a processing process of finding the top one place frequently visited after place p3 is visited. FIG. 36A illustrates a process of finding all check-ins connected to place p3. FIG. 36B illustrates a process of finding edge t2 generated right after edge t1 between place p3 and check-in c1 is generated and a process of counting the number of visitations to place p1 connected to edge t2. FIG. 36C illustrates a process of finding edge t7 generated right after edge t5 between place p3 and check-in c3 is generated and counting the number of visitations to place p2 connected to edge t7. FIG. 36D illustrates a process of finding edge tn generated just after edge tm between place p3 and check-in cr is generated and counting the number of visitations to place p2 connected to edge tn. FIG. 36E illustrates a process of arranging the places in an order of the number of visitations and then returning the top one place.

In order to process query 4, check-ins connected to the particular user may be found, numbers of times the particular user is accompanied by each user are added up while other users connected to each check-in are found, and thus users who frequently accompany the particular user may be found.

The processing process of query 4 may include a process of finding all check-ins connected to particular user u, a process of, when an edge between check-in and user u is s, counting numbers of times user u is accompanied by users connected to edges except for edge s according to each check-in, and a process of arranging the users in an order of the number of accompaniments and then returning top k users.

FIGS. 37A to 37E are an example of the processing process of query 4 and illustrates a processing process of finding the top one user who frequently accompanies user u3. FIG. 37A illustrates a process of finding all check-ins connected to user u3. FIG. 37B illustrates a process of finding users connected through edges except for an edge between users u3 and check-in c1 and counting numbers of times the found users are accompanied by user u3. FIG. 37C illustrates a process of finding users connected through edges except for an edge between user u3 and check-in c3 and counting numbers of times the found users are accompanied by user u3. FIG. 37D illustrates a process of finding users connected through edges except for an edge between user u3 and check-in cr and counting numbers of times the found users are accompanied by user u3. FIG. 37E illustrates a process of arranging the users in an order of the number of accompaniments and then returning the top one user.

In the query processing method for query 3 and query 4 described in FIGS. 36A to 36E and FIGS. 37A to 37E, all check-ins connected to the particular user (place) should be acquired and other users (next visited places) connected to each check-in should be acquired. Further, a process of arranging the other users (next places) acquired through the process in an order of the number of visitations is required.

FIGS. 38A, 38B, 39A and 39B illustrate a query processing process using pre-calculated summary information according to an embodiment.

FIGS. 38A, 38B, 39A and 39B describe a query processing method using pre-calculated summary information according to an embodiment to rapidly process an analysis query according to the frequency pattern. The query processing method using the pre-calculated summary information may be a method of adding the pre-calculated summary information between an object which is a query condition and an object which is a query result. The summary information may be used as an intermediate result required for analysis query processing according to the frequency pattern.

Figure 38A:
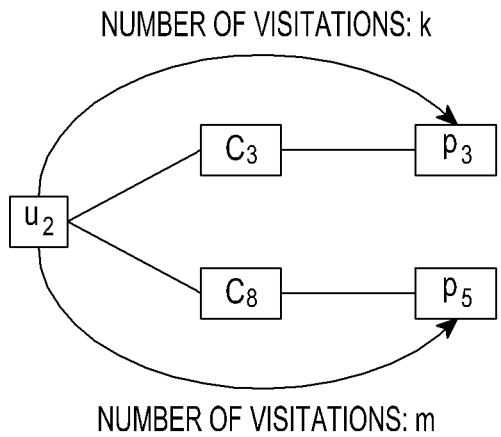
FIGS. 38A, 38B, 39A and 39B illustrate a query processing process using pre-calculated summary information according to an embodiment.

FIG. 38A illustrates a processing process of query 1 according to the query processing method using the pre-calculated summary information. When query 1 is requested with a condition of user 2 as illustrated in FIG. 38A, the top k edges having the large number of visitations may be selected from pre-calculated summary information edges formed between user u2 and places. Places connected to the selected edges may be returned as a result.

Figure 38B:
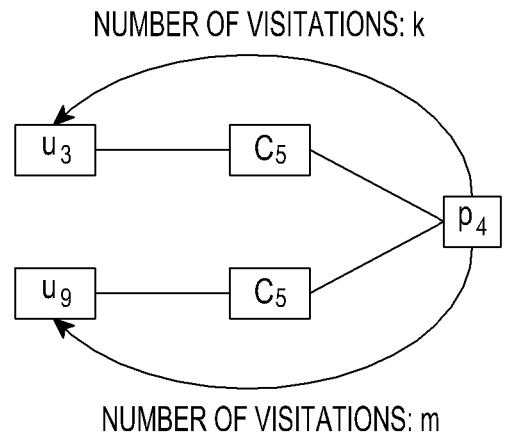

FIG. 38B illustrates a processing process of query 2 according to the query processing method using the pre-calculated summary information. When query 2 is requested with a condition of place 4 as illustrated in FIG. 38B, the top k edges having the large number of visitations may be selected from pre-calculated summary information edges formed between place p4 and users. Users connected to the selected edges may be returned as a result.

Figure 39A:
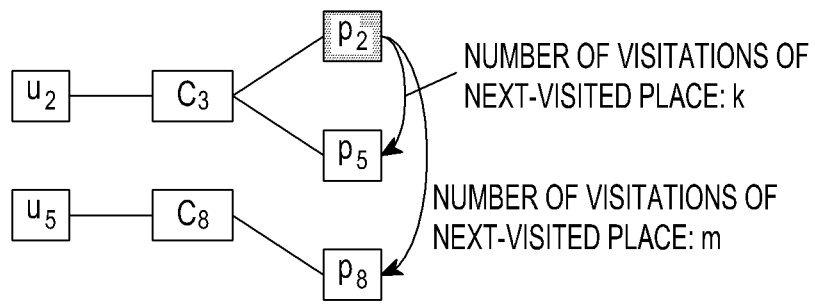

FIG. 39A illustrates a processing process of query 3 according to the query processing method using the pre-calculated summary information. If a place group is generated when visitation records are generated to process query 3, a "next visited place" relationship may be generated between individual places included in the place group according to a visiting time as illustrated in FIG. 39A. In the "next visited place" relationship, numbers of visitations of two target places may be added and used for processing query 3.

When query 3 is requested with a condition of place p2, the top k edges having the large number of visitations may be selected from pre-calculated summary information edges formed between place p2 and places. Places connected to the selected edges may be returned as a result.

Figure 39B:
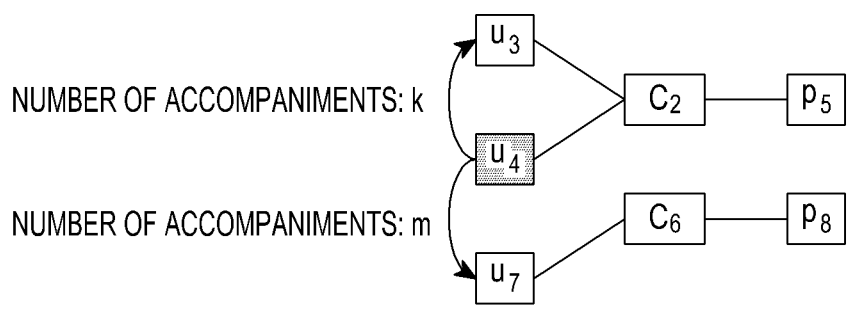

FIG. 39B illustrates a processing process of query 4 according to the query processing method using the pre-calculated summary information. If a user group is generated when visitation records are generated to process query 4, an "accompaniment" relationship may be generated between individual users included in the user group as illustrated in FIG. 39B. In the "accompaniment" relationship, the number of accompaniments between two target users may be added and used for processing query 4.

When query 4 is requested with a condition of user u4, the top k edges having the large number of accompaniments may be selected from pre-calculated summary information edges made between user u4 and other users. Users connected to the selected edges may be returned as a result. The query processing methods using the pre-calculated summary information may maintain only the top k edges having the large number of visitations among all the edges according to an implementation.

Figure 40A:
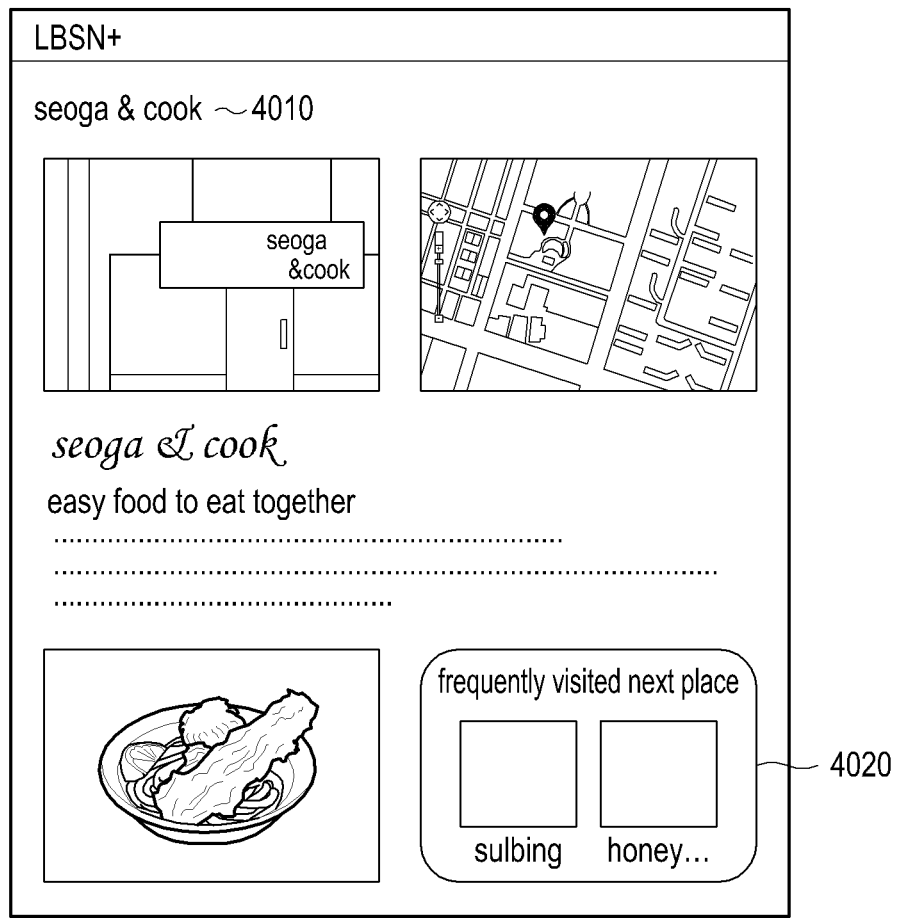
FIGS. 40A and 40B illustrate screens that display a query processing result using a frequency pattern according to an embodiment.
Figure 40B:
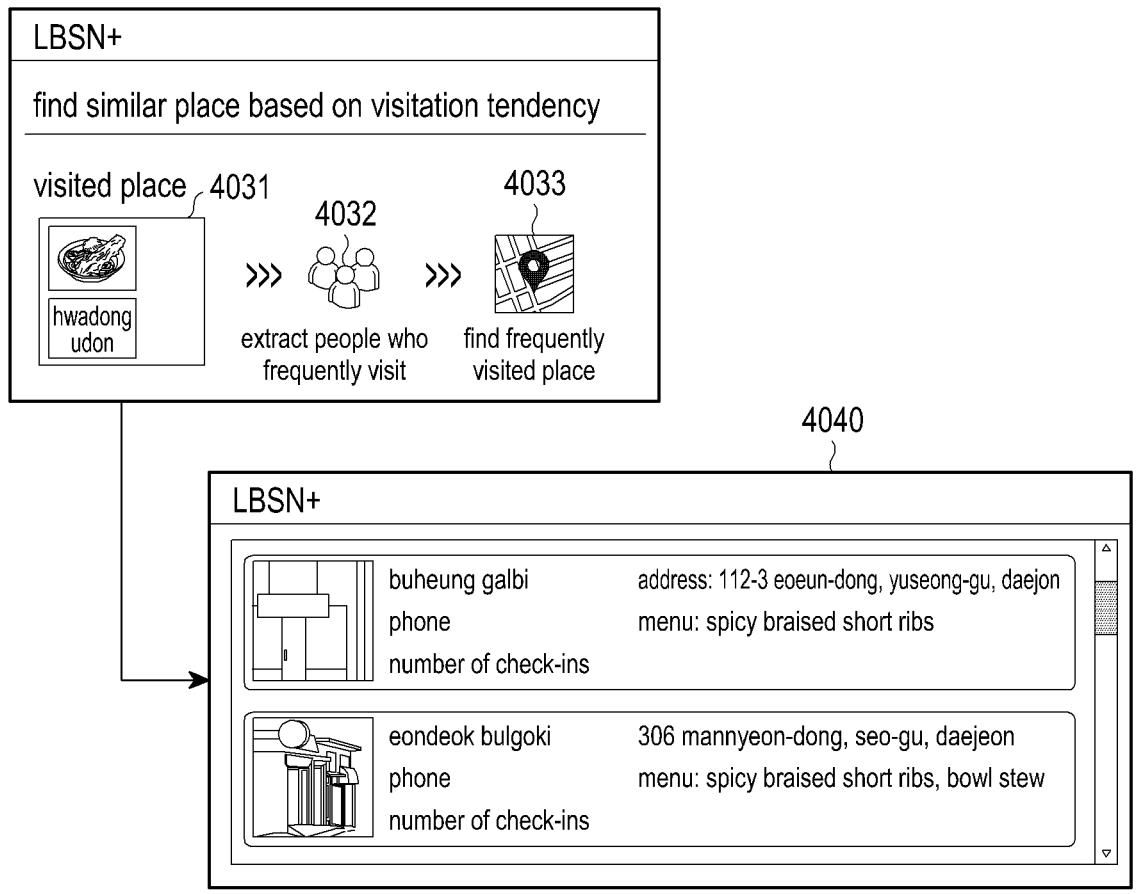

FIGS. 40A and 40B illustrate screens that display a query processing result using a frequency pattern according to an embodiment.

The electronic device 101 may acquire a query result that matches the query from the server 800 and display the query result as illustrated in FIGS. 20A and 20B.

FIG. 40A illustrates a query result 4020 that matches a query for finding a next place which the user frequently visits after visiting a particular place 4010. A relationship which can be established between places may be a "next visited place" relationship. When the user visits place B after visiting place A, the "next visited place" relationship may be generated between place A and place B. Based on the generated "next visited place" between the places, a query result that matches the query for finding the next place which the user frequency visits after visiting the particular place may be acquired.

FIG. 40B illustrates a case where a query for finding a person object 4032 who frequently visits a particular place object 4031 and finding a place object 4033 which the person object 4032 frequency visits is generated. The electronic device 101 may acquire a query result 4040 that matches the query from the server 800 and display the query result 4040.

A relationship which can be established between the place object and the person object may be a "visited" relationship. When user 1 visits place A, the "visited" relationship may be generated between user 1 and place A. The "visited" relationship may be used for finding a person who frequently visits a particular place or a place that a particular user frequently visits. Further, the "visited" relationship may be used for finding another place which people who frequently visit a particular place frequently visit in a more complex type.

Figure 41:
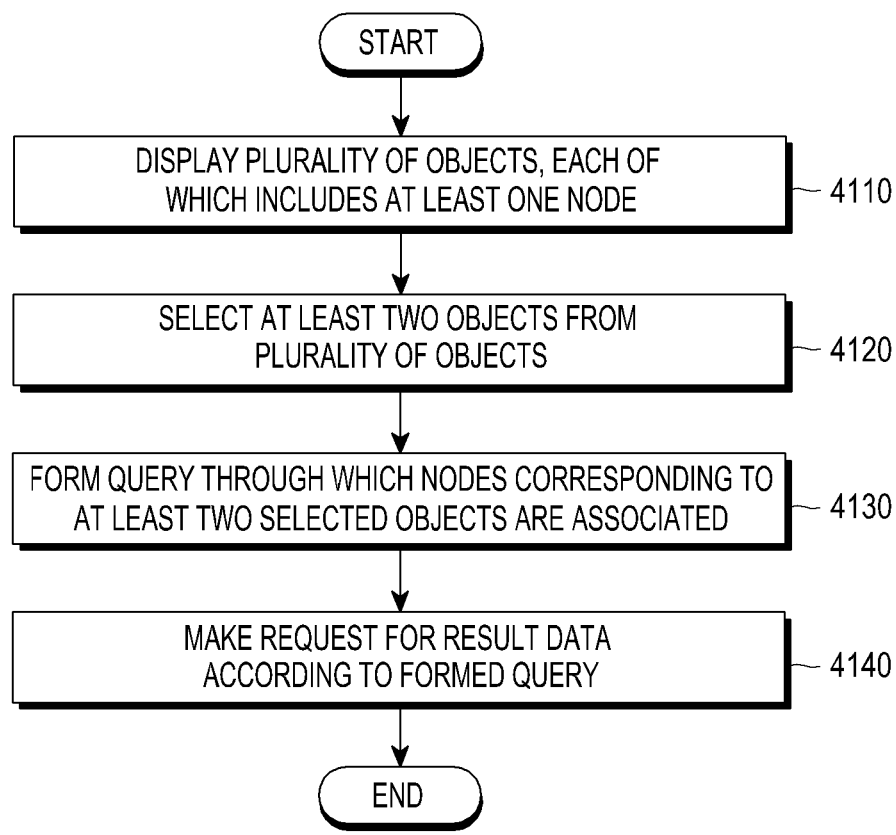
FIG. 41 is a flowchart illustrating a query processing method according to an embodiment.

FIG. 41 is a flowchart illustrating a query processing method according to an embodiment.

In process 4110, the electronic device 101 may display a plurality of objects, each of which includes at least one node. The objects may be for processing different queries.

In process 4120, the electronic device 101 may select at least two objects from the plurality of objects. The electronic device 101 may receive an input for selecting at least two objects from the user and select at least two objects based on the user input.

In process 4130, the electronic device 101 may form a query through which nodes corresponding to at least two selected objects are connected to each other.

In process 4140, the electronic device 101 may make a request for result data according to the formed query to the server 800. The electronic device 101 may receive the result data from the server 800 and display the result data.

According to an embodiment of the present invention, a method of processing a query by an electronic device may include: a process of displaying a first object and a second object; a process of acquiring a user input indicating a relationship between the first object and the second object; a process of displaying a first relationship structure between the first object and the second object based on the user input; and a process of transmitting a query including a second relationship structure between at least one first node corresponding to the first object and at least one second node corresponding to the second object to a server, the second relationship structure corresponding to the first relationship structure.

According to an embodiment of the present invention, the first object and the second object may correspond to one of categories corresponding to a plurality of nodes included in the server.

According to an embodiment of the present invention, the process of displaying the first relationship structure may include: a process of selecting a first relationship between the first object and the second object corresponding to the user input; and a process of connecting the first object and the second object through the first relationship.

According to an embodiment of the present invention, the first relationship may be one of preset relationships between a plurality of nodes included in the server.

According to an embodiment of the present invention, the process of displaying the first relationship structure may further include: a process of setting an object type for each of the first object and the second object; and a process of setting information on each of the at least one first node and the at least one second node for processing the query based on the set object type.

According to an embodiment of the present invention, the object type may include at least one of a single object type corresponding to a single node, a group object type corresponding to a plurality of nodes in a parallel relationship, and a chaining object type corresponding to a plurality of nodes in a serial relationship.

According to an embodiment of the present invention, the process of displaying the first relationship structure may further include a process of forming the first relationship structure by setting an object which is a query processing target between the first object and the second object.

According to an embodiment of the present invention, a number of each of the at least one first node and the at least one second node may be determined based on at least one of the set object type and the information on each of the at least one first node and the at least one second node.

According to an embodiment of the present invention, when at least one object type for each of the first object and the second object corresponds to a group object type, each of the at least one first node and the at least one second node may be connected through a hyper edge.

According to an embodiment of the present invention, the query processing method may further include a process of acquiring a query result that matches the query from the server and displaying the query result.

According to an embodiment of the present invention, an electronic device for processing a query is provided. The electronic device includes: a display that displays a first object and a second object; and a controller that makes a control to acquire a user input indicating a relationship between the first object and the second object, to display a first relationship structure between the first object and the second object based on the user input, and to transmit a query including a second relationship structure between at least one first node corresponding to the first object and at least one second node corresponding to the second object to a server, the second relationship structure corresponding to the first relationship structure.

According to an embodiment of the present invention, the first object and the second object may correspond to one of categories corresponding to a plurality of nodes included in the server.

According to an embodiment of the present invention, the controller may select a first relationship between the first object and the second object corresponding to the user input and connect the first object and the second object through the first relationship.

According to an embodiment of the present invention, the first relationship may be one of preset relationships between a plurality of nodes included in the server.

According to an embodiment of the present invention, the controller may set an object type for each of the first object and the second object and set information on each of the at least one first node and the at least one second node for processing the query based on the set object type.

According to an embodiment of the present invention, the object type may include at least one of a single object type corresponding to a single node, a group object type corresponding to a plurality of nodes in a parallel relationship, and a chaining object type corresponding to a plurality of nodes in a serial relationship.

According to an embodiment of the present invention, the controller may form the first relationship structure by setting an object which is a query processing target between the first object and the second object.

According to an embodiment of the present invention, a number of each of the at least one first node and the at least one second node may be determined based on at least one of the set object type and the information on each of the at least one first node and the at least one second node.

According to an embodiment of the present invention, when at least one object type for each of the first object and the second object corresponds to a group object type, each of the at least one first node and the at least one second node may be connected through a hyper edge.

According to an embodiment of the present invention, the controller may make a control to acquire a query result that matches the query from the server and to display the query result on the display.

According to an embodiment of the present invention, a method of operating a server for processing a query may include; a process of receiving a query including a first relationship structure between a first object and a second object, at least one of the first object and the second object corresponding to a plurality of nodes in a parallel relationship; a process of generating a second relationship structure between at least one first node corresponding to the first object and at least one second node corresponding to the second object to a server, the second relationship structure corresponding to the first relationship structure; a process of generating a third relationship structure in which a hyper edge included in the second relationship structure is converted into a virtual node and a plurality of simple edges; and a process of transmitting a query result that matches the query based on the third relationship structure.

According to an embodiment of the present invention, the process of generating the second relationship structure may include a process of determining a number of each of the at least one first node and the at least one second node based on at least one of an object type for each of the first object and the second object and information on each of the first object and the second object.

According to an embodiment of the present invention, the process of generating the second relationship structure further may include a process of connecting each of the at least one first node and the at least one second node through the hyper edge.

According to an embodiment of the present invention, the process of generating the third relationship structure may include: a process of generating the virtual node corresponding to the hyper edge; and a process of generating the third relationship structure in which at least one start node of the hyper edge, the virtual node, and at least one destination node of the hyper edge are connected through simple edges.

According to an embodiment of the present invention, a server for processing a query is provided. The server includes: a communication module that receives a query including a first relationship structure between a first object and a second object, at least one of the first object and the second object corresponding to a plurality of nodes in a parallel relationship; and a controller that makes a control to generate a second relationship structure between at least one first node corresponding to the first object and at least one second node corresponding to the second object, the second relationship structure corresponding to the first relationship structure, to generate a third relationship structure in which a hyper edge included in the second relationship structure is converted into a virtual node, and a plurality of simple edges, and to transmit a query result that matches the query through the communication module based on the third relationship structure.

According to an embodiment of the present invention, the controller may determine a number of each of the at least one first node and the at least one second node based on at least one of an object type for each of the first object and the second object and information on the first object and the second object.

According to an embodiment of the present invention, the controller may connect each of the at least one first node and the at least one second node through the hyper edge.

According to an embodiment of the present invention, the controller may generate the virtual node corresponding to the hyper edge, and generate the third relationship structure in which at least one start node of the hyper edge, the virtual node, and at least one destination node of the hyper edge are connected through simple edges.

According to an embodiment of the present invention, a method of processing a query by an electronic device may include a process of displaying a plurality of objects, each of which includes at least one node, each object processing a different query; a process of selecting at least two objects among the plurality of objects; a process of forming a query through which nodes corresponding to the at least two selected objects are associated; and a process of making a request for result data according to the formed query.

According to an embodiment of the present invention, a method of processing a query by an electronic device may include: a process of displaying a first object and a second object; a process of acquiring a user input indicating a relationship between the first object and the second object; a process of transmitting a query including a first relationship structure between the first object and the second object to a server based on the user input; and a process of acquiring a query result that matches the query from the server and displaying the query result.

Figure 42:
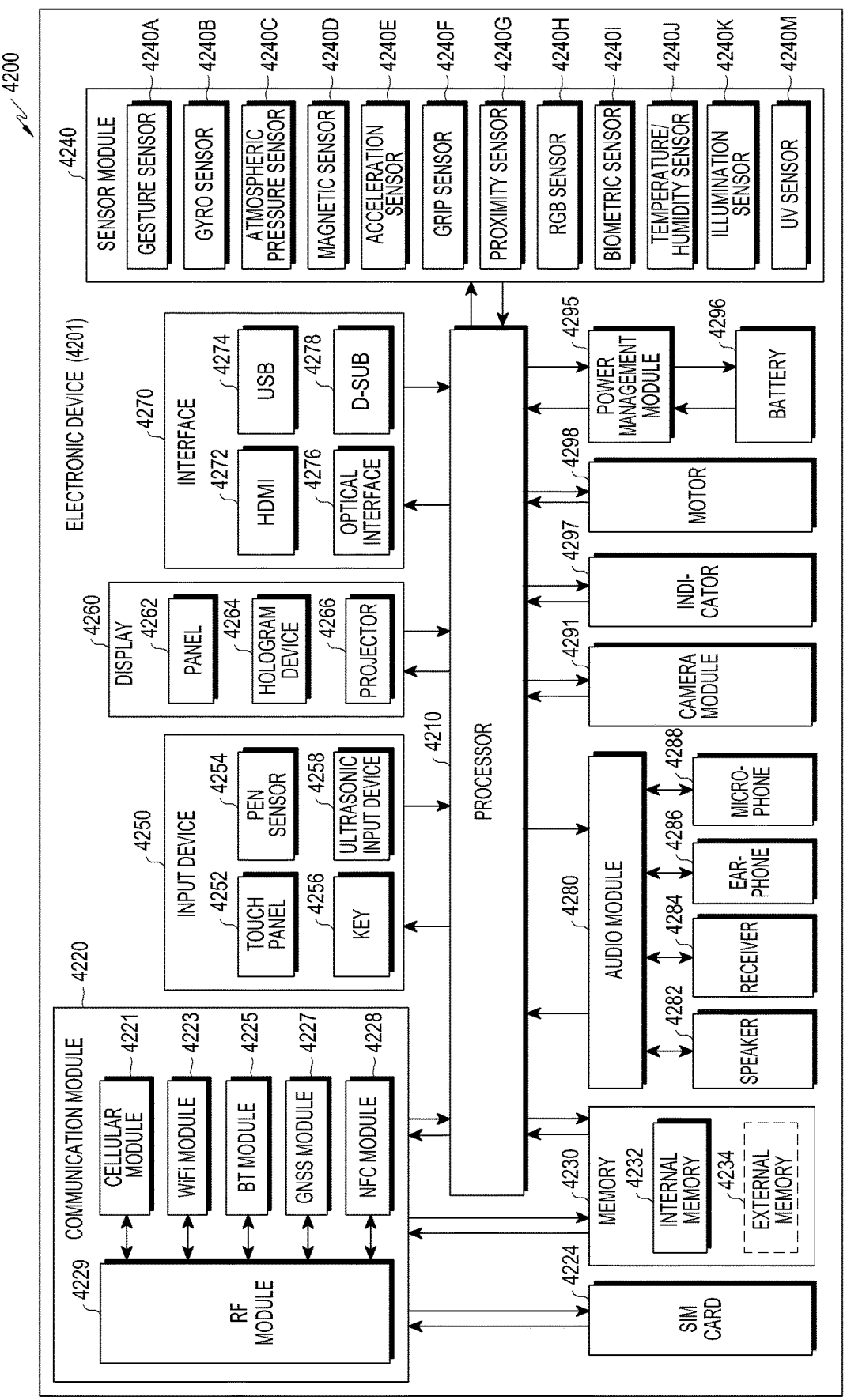
FIG. 42 is a block diagram of an electronic device according to various embodiments of the present invention.

FIG. 42 is a block diagram 4200 of an electronic device 42001 according to various embodiments of the present invention. The electronic device 4201 may include, for example, all or some of the electronic device 101 illustrated in FIG. 1. For example, the electronic device 101 illustrated in FIG. 1 may include all or some of the electronic device 4201 illustrated in FIG. 42. The electronic device 4201 may include at least one Application Processor (AP) 4210, a communication module 4220, a Subscriber Identification Module (SIM) card 4224, a memory 4230, a sensor module 4240, an input device 4250, a display 4260, an interface 4270, an audio module 4280, a camera module 4291, a power management module 4295, a battery 4296, an indicator 4297, and a motor 4298.

The AP 4210 may control a plurality of hardware or software elements connected thereto by driving, for example, an operating system or an application program and may perform a variety of data processing and calculations. The AP 4210 may be implemented by, for example, a System on Chip (SoC). According to an embodiment, the AP 4210 may further include a Graphic Processing Unit (GPU) and/or an image signal processor. The AP 4210 may also include at least some (for example, a cellular module 4221) of the elements illustrated in FIG. 42. The AP 4210 may load instructions or data, received from at least one other element (for example, a non-volatile memory), in a volatile memory to process the loaded instructions or data and may store various types of data in a non-volatile memory.

The communication module 4220 may have a configuration equal or similar to the communication interface 170 of FIG. 1. The communication module 4220 may include, for example, a cellular module 4221, a Wi-Fi module 4223, a BT module 4225, a GPS module 4227, an NFC module 4228, and a Radio Frequency (RF) module 4229.

The cellular module 4221 may provide a voice call, image call, SMS, or Internet service through, for example, a communication network. According to an embodiment, the cellular module 4221 may distinguish and authenticate the electronic device 1401 in the communication network by using a subscriber identification module (for example, the SIM card 4224). According to an embodiment, the cellular module 4221 may perform at least some of functions that the AP 4210 may provide. According to an embodiment, the cellular module 4221 may include a Communication Processor (CP).

Each of the Wi-Fi module 4223, the BT module 4225, the GPS module 4227, and the NFC module 4228 may include, for example, a processor for processing data transmitted/received through the corresponding module. According to some embodiments, at least some (two or more) of the cellular module 4221, the Wi-Fi module 4223, the BT module 4225, the GPS module 4227, and the NFC module 4228 may be included in one Integrated Chip (IC) or IC package.

The RF module 4229 may transmit/receive, for example, a communication signal (for example, an RF signal). The RF module 4229 may include, for example, a transceiver, a power amp module (PAM), a frequency filter, a low noise amplifier (LNA), or an antenna. According to another embodiment, at least one of the cellular module 4221, the Wi-Fi module 4223, the BT module 4225, the GPS module 4227, and the NFC module 4228 may transmit/receive an RF signal through a separate RF module.

The SIM card 4224 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 4230 (for example, the memory 130) may include, for example, an internal memory 4232 or an external memory 4234. The internal memory 4232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard disk drive, or a Solid State Drive (SSD).

The external memory 4234 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 4234 may be functionally and/or physically connected to the electronic device 4201 through various interfaces.

The sensor module 4240 may measure, for example, a physical quantity or detect the operating state of the electronic device 4201 and may convert the measured or detected information to an electrical signal. The sensor module 4240 may include, for example, at least one of a gesture sensor 4240A, a gyro sensor 4240B, an atmospheric pressure sensor 4240C, a magnetic sensor 4240D, an acceleration sensor 4240E, a grip sensor 4240F, a proximity sensor 4240G, a color sensor 4240H (for example, red, green, and blue (RGB) sensor), a biometric sensor 4240I, a temperature/humidity sensor 4240J, an illumination sensor 4240K, and an Ultra Violet (UV) sensor 4240M. Additionally or alternatively, the sensor module 4240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 4240 may further include a control circuit for controlling at least one sensor included therein. According to some embodiments, the electronic device 4201 may further include a processor configured to control the sensor module 4240 as a part of or separately from the AP 4210, and may control the sensor module 4240 while the AP 4210 is in a sleep state.

The input device 4250 may include, for example, a touch panel 4252, a (digital) pen sensor 4254, a key 4256, or an ultrasonic input device 4258. The touch panel 4252 may use at least one of, for example, a capacitive type, a resistive type, an infrared type, and an ultrasonic type. The touch panel 4252 may further include a control circuit. The touch panel 4252 may further include a tactile layer and provide a tactile reaction to the user.

The (digital) pen sensor 4254 may include, for example, a recognition sheet which is a part of the touch panel or a separate recognition sheet. The key 4256 may include, for example, a physical button, an optical key or a keypad. The ultrasonic input device 4258 may identify data by detecting sound waves with a microphone (for example, the microphone 4822) in the electronic device 4201 through an input tool that generates ultrasonic signals.

The display 4260 (for example, the display 160) may include a panel 4262, a hologram device 4264 or a projector 4266. The panel 4262 may include a component equal or similar to the display 160 of FIG. 1. The panel 4262 may be implemented to be, for example, flexible, transparent, or wearable. The panel 4262 may also be integrated with the touch panel 4252 as a single module. The hologram device 4264 may show a stereoscopic image in the air by using interference of light. The projector 4266 may project light onto a screen to display an image. For example, the screen may be located inside or outside the electronic device 4201. According to an embodiment, the display 4260 may further include a control circuit for controlling the panel 4262, the hologram device 4264, or the projector 4266.

The interface 4270 may include, for example, a High-Definition Multimedia Interface (HDMI) 4272, a Universal Serial Bus (USB) 4274, an optical interface 4276, or a D-subminiature (D-sub) 4278. The interface 4270 may be included in, for example, the communication interface 170 illustrated in FIG. 1. Additionally or alternatively, the interface 4270 may include, for example, a Mobile High-definition Link (MHL) interface, a Secure Digital (SD) card/Multi-Media Card (MMC) interface, or an Infrared Data Association (IrDA) standard interface.

The audio module 4280 may bilaterally convert, for example, a sound and an electrical signal. At least some components of the audio module 4280 may be included in, for example, the input/output interface 150 illustrated in FIG. 1. The audio module 4280 may process voice information input or output through, for example, a speaker 4282, a receiver 4284, earphones 4286, or the microphone 4288.

The camera module 4291 is a device which may photograph a still image and a dynamic image. According to an embodiment, the camera module 4291 may include one or more image sensors (for example, a front sensor or a back sensor), a lens, an Image Signal Processor (ISP) or a flash (for example, LED or xenon lamp).

The power management module 4295 may manage, for example, power of the electronic device 4201. According to an embodiment, the power management module 4295 may include a Power Management Integrated Circuit (PMIC), a charger Integrated Circuit (IC), or a battery or fuel gauge. The PMIC may have a wired and/or wireless charging scheme. Examples of the wireless charging method may include a magnetic resonance method, a magnetic induction method, an electromagnetic wave method, etc. Additional circuits (for example, a coil loop, a resonance circuit, a rectifier, and the like) for wireless charging may be further included. The battery gauge may measure, for example, the remaining amount of battery 4296, a charging voltage, current, or temperature. The battery 4296 may include, for example, a rechargeable battery or a solar battery.

The indicator 4297 may indicate a particular status of the electronic device 4201 or a part thereof (for example, the AP 4210), for example, a booting status, a message status, a charging status, or the like. The motor 4298 may convert an electrical signal into mechanical vibrations, and may generate a vibration or haptic effect. Although not illustrated, the electronic device 4201 may include a processing device (for example, a GPU) for supporting a mobile TV. The processing unit for supporting a mobile TV may process media data according to a standard of Digital Multimedia Broadcasting (DMB), Digital Video Broadcasting (DVB), media flow or the like.

Each of the components of the electronic device according to the present invention may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present invention may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present invention may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

According to various embodiments of the present invention, a storage medium storing instructions is provided. The instructions are configured to, when executed by at least one processor, cause the processor to perform at least one process. The at least one process may include: a process of displaying a first object and a second object; a process of acquiring a user input indicating a relationship between the first object and the second object; a process of displaying a first relationship structure between the first object and the second object based on the user input; and a process of transmitting a query including a second relationship structure between at least one first node corresponding to the first object and at least one second node corresponding to the second object to a server, the second relationship structure corresponding to the first relationship structure.

Various embodiments disclosed herein are provided merely to easily describe technical details of the present invention and to help the understanding of the present invention, and are not intended to limit the scope of the present invention. Therefore, it should be construed that all modifications and changes or modified and changed forms based on the technical idea of the present invention fall within the scope of the present invention.

The invention claimed is:

1. A method of operating an apparatus for processing a query, the method comprising:
   receiving, by the apparatus, a query including a first relationship structure between a first object and a second object, wherein the first object corresponds to first nodes and the second object corresponds to second nodes, the first nodes and the second nodes having a parallel relationship;
   generating by the apparatus, a second relationship structure between the first nodes, and the second nodes, wherein the second relationship structure includes a plurality of edges between the first nodes and the second nodes;
   identifying, by the apparatus, at least one hyper edge of the plurality of edges in the second relationship structure;
   obtaining at least one virtual node corresponding to the at least one hyper edge;
   generating, by the apparatus, a third relationship structure among the first nodes, the second nodes, and the at least one virtual node, wherein the third relationship structure includes at least one edge between the first nodes and the at least one virtual node, and at least one edge between the second nodes and the at least one virtual node; and
   transmitting a query result that matches the query based on the third relationship structure.

2. The method of claim 1, wherein the generating of the second relationship structure comprises identifying a number of each of the first nodes and the second nodes based on at least one of an object type for each of the first object and the second object or information on each of the first object and the second object.

3. The method of claim 2, wherein the generating of the second relationship structure further comprises connecting each of the first nodes and the second nodes through the at least one hyper edge.

4. The method of claim 1, wherein the generating of the third relationship structure comprises:
   generating the at least one virtual node corresponding to the at least one hyper edge; and
   generating the third relationship structure in which at least one start node of the at least one hyper edge, the at least one virtual node, and at least one destination node of the at least one hyper edge are connected through simple edges.

5. An apparatus for processing a query, the apparatus comprising:
   a communication module; and
   a processor configured to:
   receive, through the communication module, a query including a first relationship structure between a first object and a second object, wherein the first object corresponds to first nodes and the second object corresponds to second nodes, the first nodes and the second nodes having a parallel relationship;
   generate a second relationship structure between the first nodes, and the second nodes, wherein the second relationship structure includes a plurality of edges between the first nodes and the second nodes;
   identify at least one hyper edge from the plurality of edges in the second relationship structure;
   obtain at least one virtual node corresponding to the at least one hyper edge;
   generate a third relationship structure among the first nodes, the second nodes, and the at least one virtual node, wherein the third relationship structure includes at least one edge between the first nodes and the at least one virtual node, and at least one edge between the second nodes and the at least one virtual node; and
   transmit, through the communication module, a query result that matches the query based on the third relationship structure.

6. The apparatus of claim 5, wherein the processor is configured to identify a number of each of the first nodes and the second nodes based on at least one of an object type for each of the first object or the second object and information on the first object and the second object.

7. The apparatus of claim 6, wherein the processor is configured to connect each of the first nodes and the second nodes through the at least one hyper edge.

8. The apparatus of claim 6, wherein the processor is configured to generate the at least one virtual node corresponding to the at least one hyper edge, and generate the third relationship structure in which at least one start node of the at least one hyper edge, the at least one virtual node, and at least one destination node of the at least one hyper edge are connected through simple edges.

* * * * *